US011337387B2

(12) United States Patent
Adams et al.

(10) Patent No.: US 11,337,387 B2
(45) Date of Patent: May 24, 2022

(54) HYDROPONIC SYSTEM AND APPARATUS HAVING REMOVABLE GROWING STRUCTURES FOR MULTIPLE TYPES OF PLANTS

(71) Applicant: Harvest2o LLC, Skokie, IL (US)

(72) Inventors: Henry W. Adams, Evanston, IL (US);
Sullivan S. Stewart, Chicago, IL (US);
Angelo E. Kelvakis, Chicago, IL (US);
Brandon C. Bay, Chicago, IL (US)

(73) Assignee: Rise Gardens Inc., Skokie, IL (US)

( * ) Notice: Subject to any disclaimer, the term of this patent is extended or adjusted under 35 U.S.C. 154(b) by 145 days.

(21) Appl. No.: 16/705,636

(22) Filed: Dec. 6, 2019

(65) Prior Publication Data

US 2021/0007305 A1 Jan. 14, 2021

Related U.S. Application Data

(60) Provisional application No. 62/873,764, filed on Jul. 12, 2019.

(51) Int. Cl.
*A01G 31/06* (2006.01)
*A01G 7/04* (2006.01)
(Continued)

(52) U.S. Cl.
CPC ............. *A01G 31/06* (2013.01); *A01G 7/045* (2013.01); *A01G 9/02* (2013.01); *A01G 9/247* (2013.01);
(Continued)

(58) Field of Classification Search
CPC .. A01G 31/06; A01G 2031/006; A01G 9/247; A01G 31/00; A01G 31/02;
(Continued)

(56) References Cited

U.S. PATENT DOCUMENTS 4,213,271 A * 7/1980 Petruzzi ................. A01G 9/028
47/79
4,669,217 A * 6/1987 Fraze ..................... A01G 31/02
47/62 A
(Continued)

FOREIGN PATENT DOCUMENTS

KR 2012-0111872 A 10/2012
TW 201340863 A 10/2013
(Continued)

OTHER PUBLICATIONS

International Search Report & The Written Opinion of the International Searching Authority dated Dec. 15, 2020, International Application No. PCT/US2020/041276.

(Continued)

*Primary Examiner* — Joshua D Huson
*Assistant Examiner* — Megan J Moroney
(74) *Attorney, Agent, or Firm* — Vierra Magen Marcus LLP

(57) ABSTRACT

The disclosure relates to technology for hydroponics. An aspect includes a hydroponic system comprising a tray having a drain opening in a bottom of the tray. The hydroponic system comprises a water re-circulation system configured to re-circulate water containing plant nutrients through the hydroponic system. The water re-circulation system is configured to provide the water containing the plant nutrients to the tray. The tray is configured to convey the water along the bottom the tray to the drain opening, the drain opening configured to drain the water from the tray. The hydroponic system comprises different types of removable growing structures that are configured to provide corresponding different vertical distances between a top of a hydroponic growing medium and the bottom of the tray.

19 Claims, 42 Drawing Sheets

(51) Int. Cl.
*A01G 9/02* (2018.01)
*A01G 9/24* (2006.01)
*A01G 31/02* (2006.01)
*G06Q 50/02* (2012.01)
*G06Q 50/06* (2012.01)
*A01G 31/00* (2018.01)

(52) U.S. Cl.
CPC .............. *A01G 31/02* (2013.01); *G06Q 50/02* (2013.01); *G06Q 50/06* (2013.01); *A01G 2031/006* (2013.01)

(58) Field of Classification Search
CPC ........ A01G 9/023; A01G 9/025; A01G 9/028; A01G 9/045; A01G 9/047; A01G 9/0295; A01G 27/04; B65D 52/24; B65D 52/18; B65D 52/16
USPC .... 220/254.2, 254.1, 256.1, 212, 373, 367.1
See application file for complete search history.

(56) References Cited

U.S. PATENT DOCUMENTS

| | | | | |
|---|---|---|---|---|
| 4,685,246 | A * | 8/1987 | Fennell | A01G 9/028 |
| | | | | 47/83 |
| 5,394,647 | A * | 3/1995 | Blackford, Jr. | A01G 31/02 |
| | | | | 47/62 A |
| 5,771,634 | A | 6/1998 | Fudger | |
| 7,069,691 | B2 | 7/2006 | Brooke et al. | |
| 8,261,486 | B2 | 9/2012 | Bissonnette et al. | |
| 9,706,718 | B1 * | 7/2017 | McMillan | A01G 9/086 |
| 2005/0011118 | A1 * | 1/2005 | Umbaugh | A01G 31/02 |
| | | | | 47/61 |
| 2005/0274073 | A1 * | 12/2005 | Brooke | A01G 31/02 |
| | | | | 47/59 R |
| 2006/0272210 | A1 | 12/2006 | Bissonnette et al. | |
| 2009/0293350 | A1 * | 12/2009 | Kania | A01G 9/023 |
| | | | | 47/29.1 |
| 2012/0085026 | A1 | 4/2012 | Morris | |
| 2013/0019524 | A1 * | 1/2013 | Collin | A01G 9/0291 |
| | | | | 47/31 |
| 2014/0144078 | A1 | 5/2014 | Gonyer et al. | |
| 2015/0334996 | A1 | 11/2015 | Licamele | |
| 2016/0212954 | A1 | 7/2016 | Argento | |
| 2017/0035007 | A1 * | 2/2017 | Haberman | A01G 27/04 |
| 2018/0007848 | A1 * | 1/2018 | Hohmann | A01G 27/02 |
| 2019/0069497 | A1 * | 3/2019 | Broutin Farah | A01G 31/02 |
| 2019/0112450 | A1 * | 4/2019 | Ooba | A01G 31/00 |
| 2020/0093080 | A1 * | 3/2020 | Grifa | A01G 31/02 |
| 2020/0154659 | A1 * | 5/2020 | Craig | A01G 27/008 |
| 2020/0253169 | A1 * | 8/2020 | Harris, Sr. | A01K 63/006 |

FOREIGN PATENT DOCUMENTS

| | | |
|---|---|---|
| WO | WO2013/113096 A1 | 8/2013 |
| WO | WO2019/004949 A1 | 1/2019 |
| WO | WO 2019/093410 A1 | 5/2019 |

OTHER PUBLICATIONS

Invitation to Pay Additional Fees dated Oct. 21, 2020, International Application No. PCT/US2020/041276.
English Abstract of KR Publication No. 2012-0111872 published Oct. 11, 2012.
English Abstract of PCT Publication No. WO2019/093410 published May 16, 2019.
English Abstract of TW Publication No. 201340863 published Oct. 16, 2013.

* cited by examiner

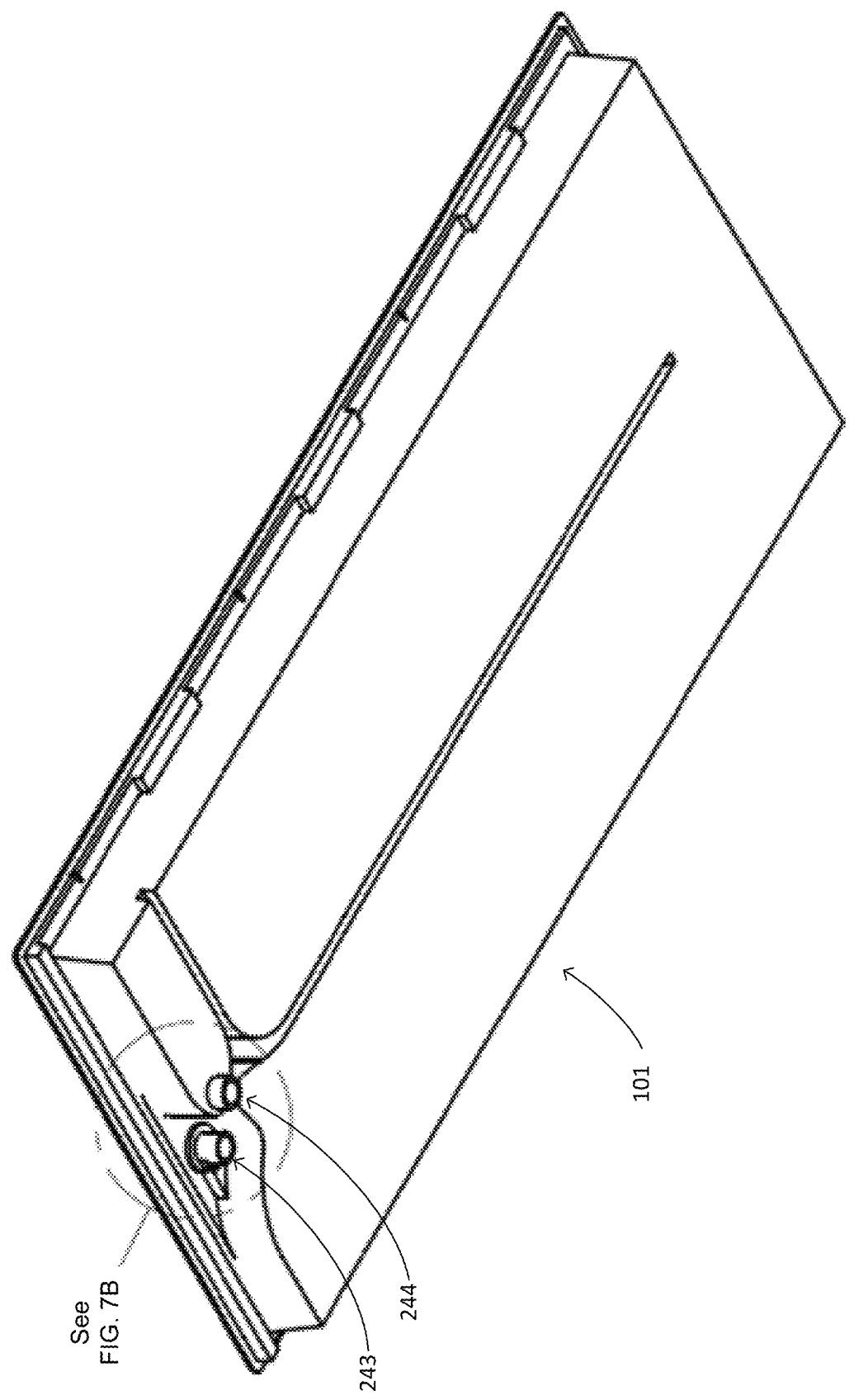

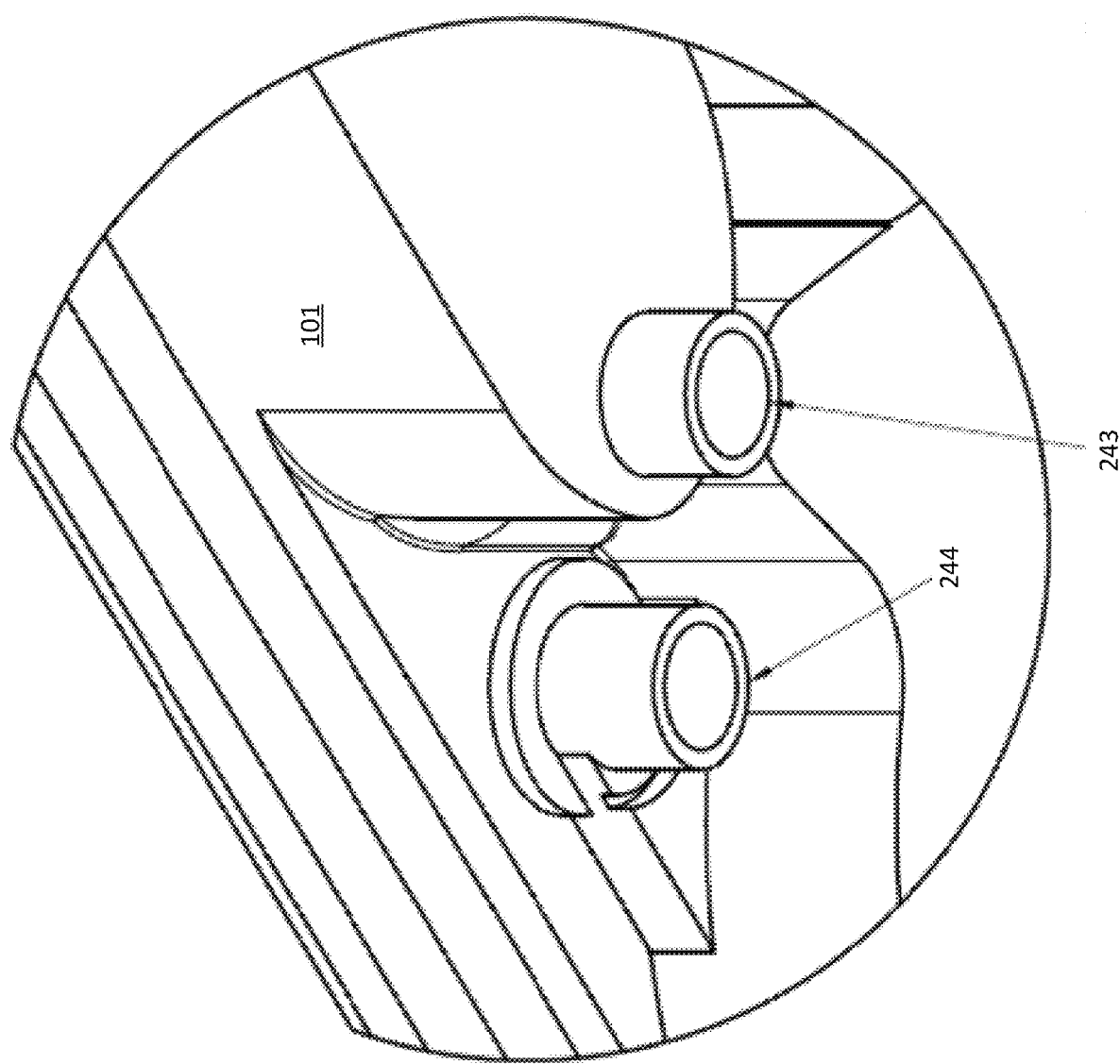

2000

| Crop | Rank Multiplier | pH | EC | A | B | C | Lights |
|---|---|---|---|---|---|---|---|
| Lettuce | 2 | 6 | 1.8 | 1 | 1 | 0 | 18 |
| Kale | 2 | 6 | 1.8 | 1 | 1 | 0 | 18 |
| Chard | 2 | 6 | 1.8 | 1 | 1 | 0 | 18 |
| Arugula | 2 | 6 | 1.8 | 1 | 1 | 0 | 18 |
| Basil | 2 | 6 | 1.6 | 1 | 1 | 0 | 18 |
| Chives | 2 | 6 | 1.8 | 1 | 1 | 0 | 18 |
| Cilantro | 2 | 6 | 1.8 | 1 | 1 | 0 | 18 |
| Parsley | 2 | 6 | 1.8 | 1 | 1 | 0 | 18 |
| Mint | 2 | 6 | 1.6 | 1 | 1 | 0 | 18 |
| Rosemary | 2 | 6 | 1.6 | 1 | 1 | 0 | 18 |
| Oregano | 2 | 6 | 1.6 | 1 | 1 | 0 | 18 |
| Thyme | 2 | 6 | 1.6 | 1 | 1 | 0 | 18 |
| Tomato | 2 | 6 | 2.5 | 0 | 1 | 1 | 16 |
| Bell Pepper | 2 | 6 | 2.2 | 0 | 1 | 1 | 16 |
| Flower | 2 | 6 | 2 | 0 | 1 | 1 | 16 |

```
Receive plant observations from electronic devices over a
network interface, 2102
          │
          ▼
Modify a technique for determining a water profile for a
type of plant based on the collective observations, 2104
          │
          ▼
Provide a water profile for plants grown in a hydroponic
system based on the modified technique, 2106
```

```
Re-circulate aqueous nutrient solution in one or more
trays, 2202
          │
          ▼
Access a list of different plants in the tray(s) having
different water profiles for optimum growth, 2204
          │
          ▼
Determine a single water profile for the different plants,
2206
          │
          ▼
Determine an adjustment to the aqueous nutrient solution
based on the single water profile, 2208
```

FIG. 22

HYDROPONIC SYSTEM AND APPARATUS HAVING REMOVABLE GROWING STRUCTURES FOR MULTIPLE TYPES OF PLANTS

CLAIM OF PRIORITY

This application claims priority to U.S. Provisional Patent Application No. 62/873,764, entitled "HYDROPONIC SYSTEM", filed Jul. 12, 2019 by Adams et al., which is incorporated by reference herein in its entirety.

FIELD

The disclosure generally relates to hydroponics.

BACKGROUND

Plants need certain nutrients in order to grow and be healthy. Plant nutrients typically are divided into macronutrients and micronutrients. The macronutrients are sometimes divided into primary macronutrients and secondary macronutrients. Examples of primary macronutrients include nitrogen, phosphorus, and potassium. Examples of secondary macronutrients include sulfur, calcium, and magnesium. Examples of micronutrients include iron, molybdenum, boron, copper, manganese, sodium, zinc, nickel, chlorine, cobalt, aluminum, silicon, vanadium, and selenium. When plants are grown in soil, the soil provides many, if not all, of the needed nutrients. In some cases, fertilizer may be added to the soil to provide nutrients. Plants also need oxygen and hydrogen, which may be provided by air and/or water.

Hydroponics is a method of growing plants without the use of soil. A hydroponic system may use water containing plant nutrients to facilitate plant growth. Herein, the plants nutrients that are delivered in water may also be referred to as hydroponic nutrients.

BRIEF DESCRIPTION OF THE DRAWINGS

Aspects of the present disclosure are illustrated by way of example and are not limited by the accompanying figures for which like references indicate like elements.

FIGS. 5B and 5C are detail of FIG. 5A.

FIG. 6B is a detail of FIG. 6A.

FIGS. 7A and 7B are bottom views of the tray embodiment of FIG. 6A.

FIG. 18A is an exploded diagram of one embodiment of a removable growing structure that may be used to grow micro-greens or the like.

FIG. 18F is an exploded diagram of one embodiment of a removable growing structure that may be used to grow micro-greens or the like.

FIG. 20 is table that defines example conditions and nutrient needs of various types of plants that might be grown in a hydroponic system.

FIG. 21 is a flowchart of one embodiment of a process of providing a water profile for plants grown in a hydroponic system.

FIG. 22 is a flowchart of one embodiment of a process of providing a water profile for plants grown in a hydroponic system.

DETAILED DESCRIPTION

Figure 1:
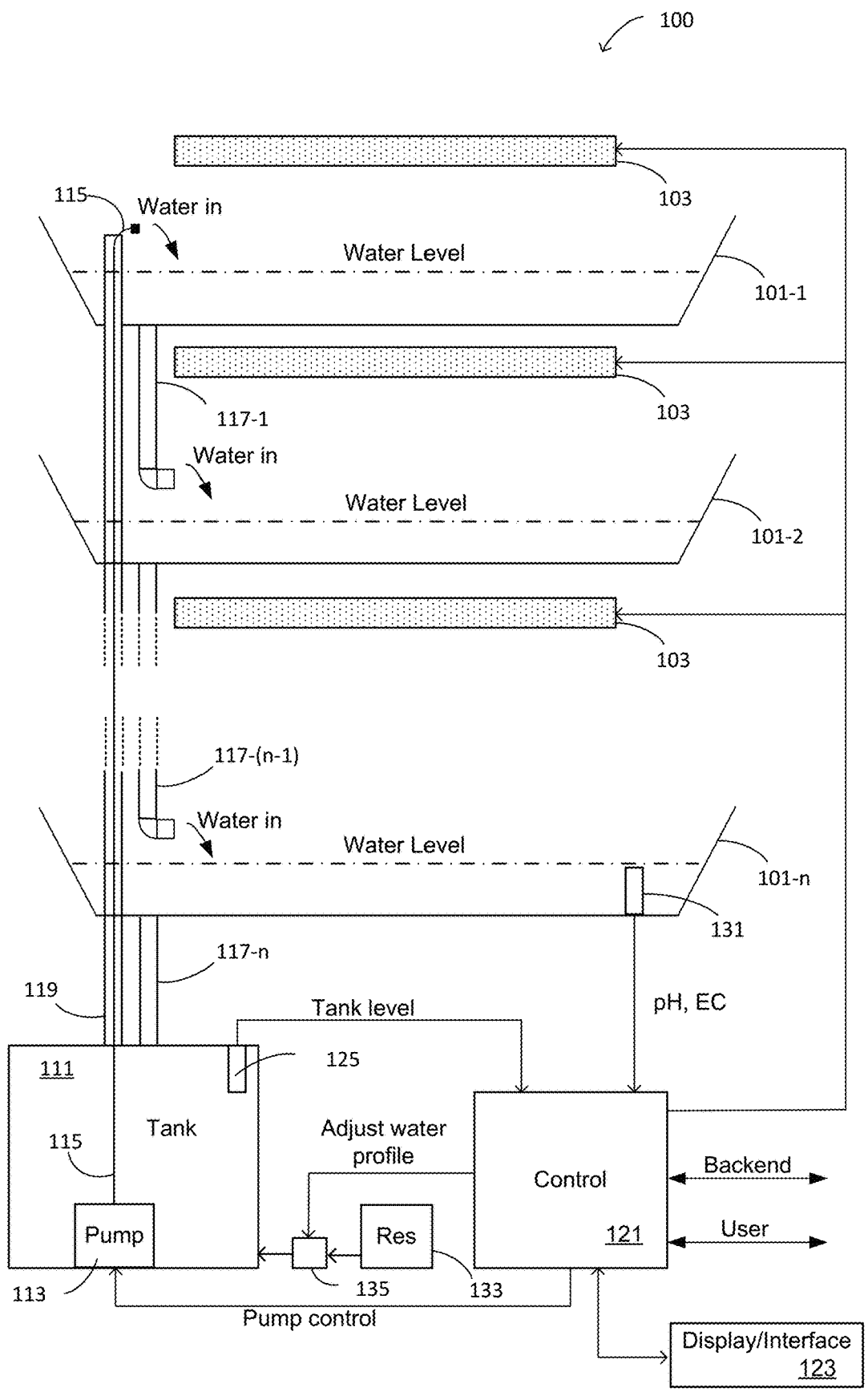
FIG. 1 is a high-level diagram of an embodiment for some of the elements of a hydroponic system.

The present disclosure will now be described with reference to the figures, which in general relate to hydroponics. Some embodiments disclosed herein include or may be part of a continuous flow hydroponic system suitable for the indoor growing multiple crops of different type at the same time. The hydroponic system can include a single layer or multiple layers of growing trays arranged over a pump. The pump directly supplies the top-most tray with water including from a tank, with each of the lower trays being supplied from drainpipe of the tray above, in an embodiment. The bottom tray drains back to the tank, in an embodiment. An auxiliary drainpipe runs to all of the trays to provide overflow protection, where any overflow can run down the auxiliary drainpipe to the tank, in an embodiment. The auxiliary drainpipe can also be used as a conduit for the supply line from the pump to the top-most tray, in an embodiment.

To simplify the plumping arrangements, the drainpipe for each tray and the shared auxiliary drainpipe and supply line conduit are located along the same side of the trays, in an embodiment. The trays have a rectangular shape with the drainpipes located along one of the shorter sides, in an embodiment. The trays have a lateral barrier that separates the tray's water input area from its drain region, where the lateral barrier extends from the side with the drainpipes towards the opposite short side, leaving a gap to allow water to flow from the input to the drain, in an embodiment. The floor of the main region of the tray, over which the plants are held, is flat, with a dam placed between the main region and the drain to maintain a water in the main growing region of the tray, in an embodiment.

The trays can be held in housings and mounted in a vertical arrangement in a support such as a rack, frame or cabinet. The housings can include a light source on its bottom side for an underlying tray. The trays are covered with lids that include openings in which net cups can be placed for holding the plants.

To support vining plants or other plants needing support, the hydroponic system can include a trellis and plant supports. The plant supports can be individual attached to each net cup, which is attached to the cup to provide plant support. This allows for the individual cups to be used either with or without the plant support so that a number of different plants and different plant stages can use the hydroponic system concurrently.

A hydroponic system may re-circulate water that contains plant nutrients. The hydroponic system may contain multiple different types of plants (also referred to a crops), which may need different plant nutrients. The hydroponic system may potentially expose these multiple types of plants to the same water, and hence the same nutrients. It can be difficult for a user to determine suitable nutrients to add to the water in the hydroponic system in view of the wide range of nutrient needs of the various types of plants. This problem is made more difficult due to the possibility that plants may be in different growth stages, thereby affecting the nutrient needs. Embodiments disclosed herein determine suitable nutrients to add to a hydroponic system that re-circulates water that is exposed to multiple types of plants that have different nutrient needs.

One embodiment disclosed herein includes a central controller that may determine suitable plant nutrients to add to a hydroponic system. The central controller may provide this information to numerous remote electronic devices such that a user in control of the remote electronic device may learn what nutrients to add to their hydroponic system. In one embodiment, the central controller collects plant observations from the user of the hydroponic systems. These plant observations may include the amount of time that a certain type of plant to reach a specific growth stage. The central controller uses these plant observations to modify how the central controller determines what plant nutrients that the users should add to their respective hydroponic systems, in an embodiment.

The hydroponic system may contain multiple different types of plants (also referred to a crops), which may need different interactions with respect to the water that flow or re-circulated is in the hydroponic system. For example, some plants may grow well with their roots bathed constantly in the water. Other plants, such as root vegetables, may need room to grow to maturity without their root being in constant contact with the water. Still other plants, such as microgreens may need to develop roots prior to being in contact with the water that contains plant nutrients. Also, microgreens may need special surface, such as a hydroponic mat to grow well.

In some embodiments, the hydroponic system has multiple types of removable growing structures. These growing structures may be added or removed to trays in the hydroponic system to allow different types of plants to be grown. One embodiment includes a removable growing structure that allows plants to be grown with their roots constantly bathed in water that is re-circulated in the hydroponic system. One embodiment includes a removable growing structure that allows root vegetables to be grown to maturity without their roots coming into contact with water that is re-circulated in the hydroponic system. One embodiment includes a removable growing structure that allows microgreens to develop roots prior to coming into contact with the water that is re-circulated in the hydroponic system. The removable growing structure may support a hydroponic mat to allow micro-greens or the like to be grown in the hydroponic system. The removable growing structures provide a user with tremendous flexibility in selecting a wide variety of plants to grow in a hydroponic system.

Hydroponics is a method of growing plants without the use of soil. A hydroponic system may use water containing plant nutrients to facilitate plant growth. Herein, the plants nutrients that are delivered in water may also be referred to as hydroponic nutrients. In some embodiments, the plants nutrients are dissolved in the water. For example, salts may be dissolved into water to provide various ions, which serve as the plants' nutrients. However, it is not required that the plants nutrients be dissolved in the water. For example, some of the plants' nutrients may be particles that are suspended in water.

Herein, an "aqueous hydroponic nutrient" refers to a mixture of water and plant nutrients. The plant nutrients may be dissolved in the water, suspended in the water, or a combination of some nutrients dissolved in the water and some nutrients suspended in the water. Thus, in one embodiment, the aqueous hydroponic nutrient is a solution in which water is the solvent. For example, the plant nutrients may include ions dissolved in water. The aqueous hydroponic nutrient may be made by dissolving salts in water. However, it is not required that the plant nutrients are dissolved in water. In one embodiment, the aqueous hydroponic nutrient is an aqueous suspension. In one embodiment, the aqueous hydroponic nutrient is an aqueous colloidal suspension.

In one embodiment, the aqueous hydroponic nutrient is an inorganic aqueous solution. For example, nitrogen may be provided by $KNO_3$, $NH_4NO_3$, $Ca(NO_3)$, $HNO_3$, $(NH_4)_2SO_4$ or $(NH_4)_2HPO_4$. Other hydroponic nutrients may be provided by other inorganic compounds, as is known in the art. In one embodiment, the aqueous hydroponic nutrient includes organic particles mixed into the water. For example, nitrogen may be provided by mixing bloodmeal, bonemeal, manure, etc. into water. Other hydroponic nutrients may be provided by mixing organic particles into water, as is known in the art. In one embodiment, the water includes both inorganic particles (e.g., $KNO_3$, $NH_4NO_3$, $Ca(NO_3)$, $HNO_3$, $(NH_4)_2SO_4$, $(NH_4)_2HPO_4$) and organic particles (e.g., bloodmeal, bonemeal, manure) mixed into the water.

Herein the term "water profile" is used to refer to the composition of water (e.g., the composition of the aqueous hydroponic nutrient) in the hydroponic system. In one embodiment, the water profile is described by the concentration of various ions in the water that is circulated in the hydroponic system. The water profile may also include the pH of the water that is circulated in the hydroponic system.

Herein, the term aqueous hydroponic nutrient may be used to refer to both the water (containing the plant nutrient) that is circulated within the hydroponic system, as well as a much more concentrated aqueous hydroponic nutrients that are diluted with water to provide the aqueous hydroponic nutrient that is circulated within the hydroponic system.

In some embodiments, the hydroponic system uses a growing medium (also referred to as a "hydroponic growing medium") to support the plants. The hydroponic growing medium typically does not provide plant nutrients, as soil might provide. In some embodiments, the hydroponic growing medium is a soil-less growing medium. A "soil-less growing medium" does not contain soil. A hydroponic growing medium may contain organic and/or inorganic material. Examples of hydroponic growing mediums include, but are not limited to, sphagnum peat moss, coco peat, rice husks, perlite, vermiculite, pumice, sand, gravel, polystyrene, and a hydroponic growing mat. In one embodiment, the hydroponic growing mat is referred to as a microgreen mat. In some cases, the hydroponic growing medium may be placed into a net-cup. A net-cup is a container having an open top, a bottom and a surface between the top and bottom. Both the bottom and the surface between the top and the bottom have holes, slots, openings or the like.

FIG. 1 is a high-level diagram of an embodiment for some of the elements of a hydroponic system 100, where many of the illustrated components are developed in more detail in the following discussion. One or more trays 101 are arranged to each hold one or more plants suspended above a layer of water so that roots of the plants can absorb the water and nutrients in the water. The content of the water and nutrients, or "water profile", can be chosen based upon the plants being grown and their stages of development. Above each tray a light source 103 can be provided over the tray. In an outdoor use, natural lighting can be used, but the light sources 103 can be used to augment or replace natural lighting in situations with insufficient natural lighting. The following will mainly consider embodiments for indoor usage and include a light source 103 above each tray 101.

To provide the water (e.g., aqueous hydroponic nutrient) to the trays, a water re-circulation system is used. The water re-circulation system can include a pump 113 to supply the water and plant nutrients from a water reservoir or tank 111. The pump 113 is connected to the water tank 111 to supply trays 101 and can supply one or more of the trays 101 directly or a tray can be supplied from another tray. In the embodiments mainly presented in the follow discussion, the trays 101 are arranged vertically so that the pump 113 will supply the top-most tray 101 directly, which will in turn supply a lower lying tray 101 in a gravity fed arrangement. For example, as illustrated in FIG. 1, a top-most tray 101-1 is fed directly, that will feed a lower tray 101-2, that will in turn feed a lower lying tray, and so on to the lowest lying tray 101-n. FIG. 1 shows the pump 113 feeding a series of multiple trays, but other embodiment may have only a single tray, in which case the lowest lying tray 101-n will be the only tray and fed directly from the 113. In other embodiments, a single water re-circulation system can feed more than one series of trays, each series having one or more trays and where the number of trays in the different series can differ.

In addition to the pump 113 and tank 111, the water re-circulation system includes the plumbing to deliver the water (e.g., aqueous hydroponic nutrient) from the tank to the trays 101 from the tank 111 and deliver the water back to the tank 111. In the multi-tray, gravity fed series arrangement illustrated in FIG. 1, the pump 113 supplies the top-most tray 101-1 from the tank 111 with a supply tube 115. For example, the supply tube 115 can be plastic or other flexible tubing, or PVC or metal piping. The following embodiments will mainly describe a flexible plastic tubing, as this is often convenient and easy to install. The diameter of the supply tube 115 can be chosen based upon the capability of the pump 113 and height of the tray 101-1 that it is supplying directly.

In the embodiment of FIG. 1, the supply tube 115 runs up though a pipe 119 that extends upward through the vertically arranged trays 101 to the top-most tray 101-1, serving as a conduit for the supply tube 115 and also as an auxiliary or overflow drainpipe. For this purpose, the conduit/auxiliary drainpipe 119 is arranged so that any of the water (e.g., aqueous hydroponic nutrient) that flows into conduit/auxiliary drainpipe 119 will flow back into the water tank 111. When the trays 101 are arranged vertically one over the other, the conduit/auxiliary drainpipe 119 can be a set of straight pipe sections, such as formed of PVC (polyvinyl chloride), stacked one above the other as a vertical column. In other embodiments, the supply tube 115 need not use the auxiliary drainpipe 119 as a conduit, in which case the pipe 119 may be eliminated; or the pipe 119 may serve only as a conduit for the supply tube 115, without serving as an auxiliary drain pipe for overflow protection; however, the following discussion will mainly refer to embodiments using a combined conduit and auxiliary drainpipe function for the pipe 119, as this can provide overflow protection as well as provide a convenient path from the pump 113 to the top-most tray 101-1. In the following, the pipe 119 will mainly be referred to as an auxiliary or overflow drainpipe.

Each tray 101 will have a (primary) drain opening to which is connected a drainpipe 117. For the lower-most tray 101-*n*, the corresponding drainpipe 117-*n* can drain directly back into the tank 111. For the higher trays, the drain pipe of each tray can supply the tray of the next lower level in a gravity fed series arrangement, so that, for example, the drainpipe 117-1 from tray 101-1 supplies tray 101-2 and the lower-most tray 101-1 can be supplied by the drain pipe 117-(n-1) of the preceding tray of the series. The drainpipes can again be made of PVC pipe sections, such as a straight pipe section that ends in an elbow when supplying an underlying tray. In a single layer embodiment with only one tray, the single tray would be supplied directly from supply tube 115 and then its drainpipe would flow directly back to the tank 111.

Embodiments of the hydroponic system 100 can include control circuitry 121 of varying levels of automation. For example, the control circuitry 121 can be connected for controlling the pump 113 and lighting elements 103. The system can also include a water level sensor 125 to monitor the level of water (e.g., aqueous hydroponic nutrient) in the tank 111. The system 100 can include a user display and interface 123 to provide user information, such as the water level in the tank 111, and receive inputs, such as to turn the lighting elements 103 or pump 113 on or off. Depending on the embodiment, the control circuitry can also communicate with a user over a wireless link to a smartphone, for example, or to back-end processing (e.g., central controller 1902) located remotely.

In some embodiments, the hydroponic system 100 can also include sensors 131 to monitor the water profile in one or more of the trays or the tank 111. For example, the sensors 131 can include a pH monitor and an electrical conductivity (EC) monitor in one of the trays that can be used to monitor the water profile by the control circuitry 121. In other embodiments, these values can alternately or additionally be determined manually. Based on the monitoring, the water profile can be adjusted manually or automatically by adding nutrients and pH agents. In some embodiments, based on the monitoring the control circuitry 121 can automatically adjust the water profile by use of pumps 135 connected to supply the tank 111 from reservoirs 133 for nutrients and pH agents. The control systems are discussed in more detail below, including the balancing of the water profile for the concurrently growing multiple crops of different types in the same hydroponic system 100.

FIGS. 2A-2D present views of the hydroponic system 100 of FIG. 1 incorporated into a rack or cabinet for support. More specifically, FIGS. 2A-2D respectively present a front view, a side view, a cut-away rear view, and an oblique view of a 2-level hydroponic system, where the lower level of this double tray embodiment has a tall lower level and a short upper level. Such an arrangement could be used an indoor vegetable smart garden to grow a mixture of crops such as peppers, tomatoes, herbs, spices, and lettuces year-round.

Figure 2B:
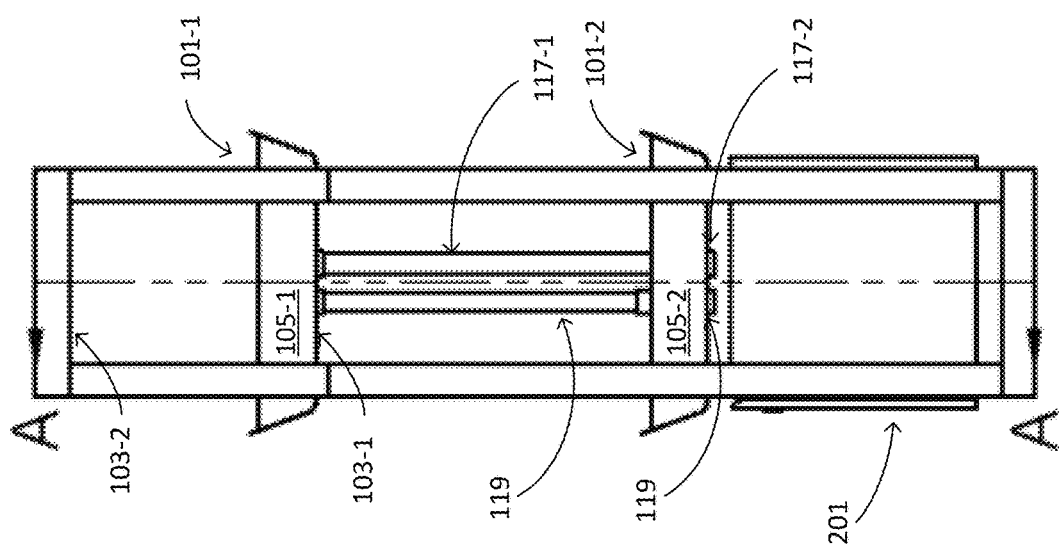
FIGS. 2A-2D present views of the hydroponic system of FIG. 1 incorporated into a rack or cabinet.
Figure 2A:
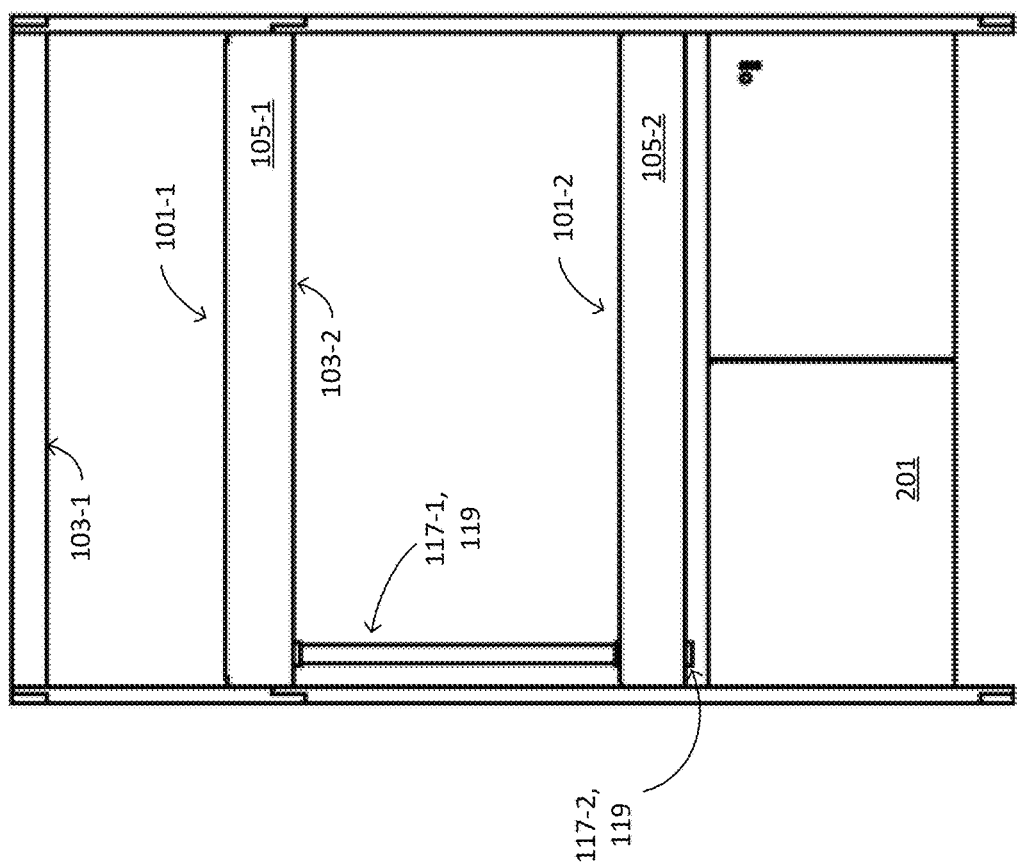

In the front view FIG. 2A, the upper tray 101-1 is held in a housing 105-1 and illuminated from above by a light fixture 103-1. The lower tray 101-2 is held in a housing 105-2 and illuminated by a light fixture 103-2 that can be integrated into the housing 105-1. The power cord for the light 103-1 and 103-2 can run up the back side of the one of the support legs, for example. The upper tray 101-1 can be supplied by the water (e.g., aqueous hydroponic nutrient) by a supply tube running up the auxiliary drainpipe 119 from the water re-circulation system located in the cabinet section 201 of the support structure. The lower tray 101-2 is fed by the upper level drainpipe 117-1 and drains by the lower level drainpipe 117-2 into the tank located in the cabinet 201. The cabinet 201 can include doors for covering the water re-circulation system, control systems, and also be used for storage. In the arrangement of FIGS. 2A-2D, the trays are supplied and drained from the same side, such that in front view of FIG. 2A the one obstructs the other. For example, the drainpipes 117-1, 117-2 may located in front of the auxiliary drainpipe 119, or vice-versa.

By placing the supply and drain for the trays on the same end of the trays, they can both be placed over the tank, so that both the (primary) drainpipes 117-1, 117-2 and supply conduit and auxiliary drainpipe 119 can flow directly down into the supply tank 111 for both normal drainage and overflow drainage. Under this plumbing architecture, the water re-circulation system can be grouped to the one side (the left side in this example) of the cabinet 201, leaving the other side available for control elements and storage. In contrast, if the trays were fed from one end drained from the other, the plumbing components would be less compact and spread across both sides of the structure.

FIG. 2B is side view of the hydroponic system shown from the front in FIG. 2B. From the side view, both of the drainpipes 117-1, 117-2 and supply conduit and auxiliary drainpipe 119 can be seen. FIG. 2B shows a cut line at A-A, where the rear view of FIG. 2C is taken at this cut line.

Figure 2D:
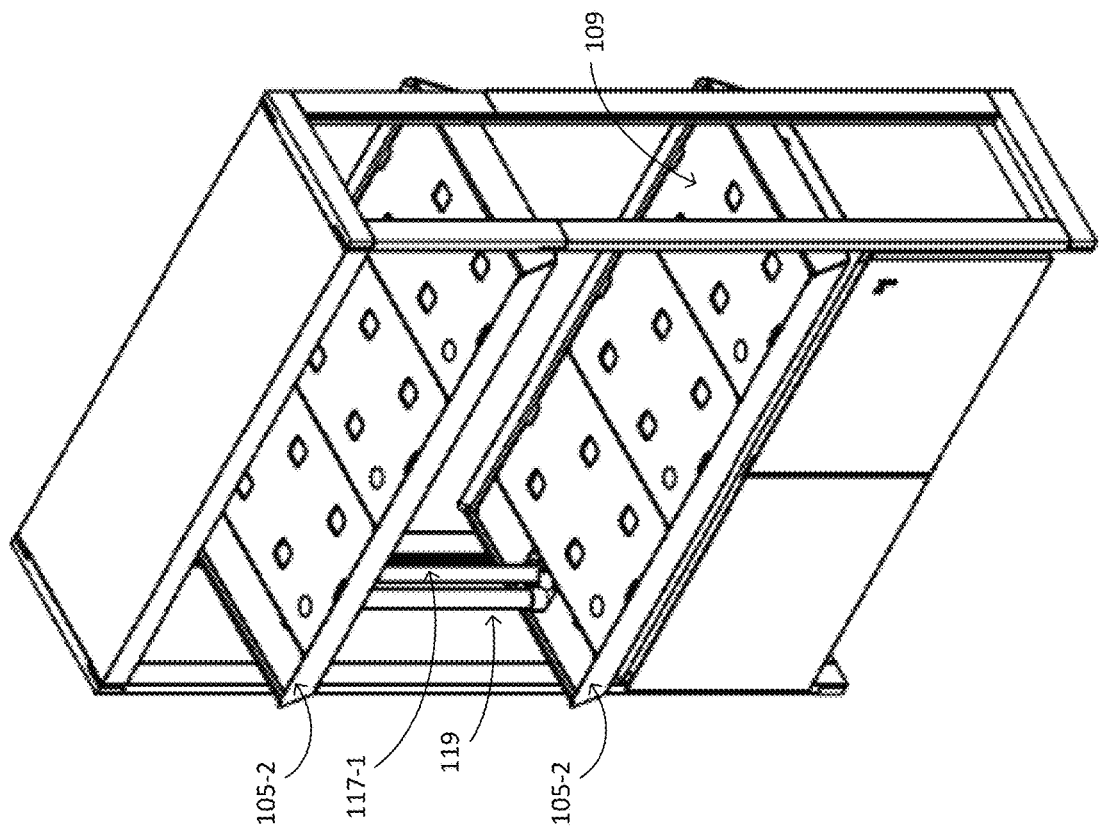
Figure 2C:
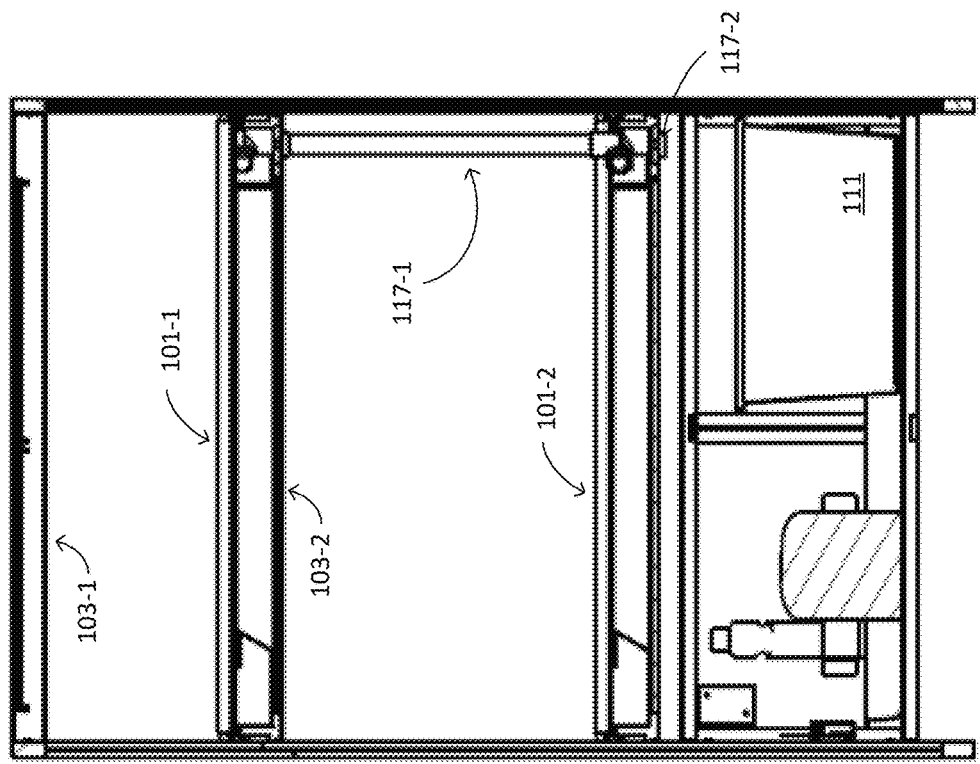

In the cut-away rear view of FIG. 2C, a longitudinal cross-section of the trays 101-1 and 101-2 can be seen, as well as a cross-section of the light fixtures 103-1 and 103-2. In the example here, the drainpipes 117-1 and 117-2 are shown as they are in front of the A-A cut line. Inside of the cabinet is shown the tank 111, where the other objects shown can be various elements of the pump and control systems shown in FIG. 1 or other objects stored there.

FIG. 2D is an oblique view from the front and above of the hydroponic system 100 of FIG. 1 incorporated into a rack or cabinet. From above the top of the trays 101-1 and 101-2 can be seen to be covered by a set of removable lids 109 that can used to hold the plants. A number of different lid configurations can be used, both as far as the number of lids covering a tray and configuration of the lids. In the example of FIG. 2D, each tray is shown to be covered by three lids having cup openings, into which net cups can be placed for holding plants, along with a smaller lid along the left (as represented in the figure) edge that is a separate service cover for the drain and supply regions. As discussed in more detail below, a number of arrangements can be used for the removable lids 109. Although FIG. 2D shows holes for holding net cups that would be used for many crops, arrangements more suitable for root vegetables or microgreens are also discussed below.

The embodiment illustrated in FIGS. 2A-2D has two tray levels, but the hydroponic system of FIG. 1 has a modular structure allowing to the system to be configured, or reconfigured, to a greater or fewer number of number of layers. In multi-layer embodiments, the vertical spacing of the layers can be the same or different.

Figure 3B:
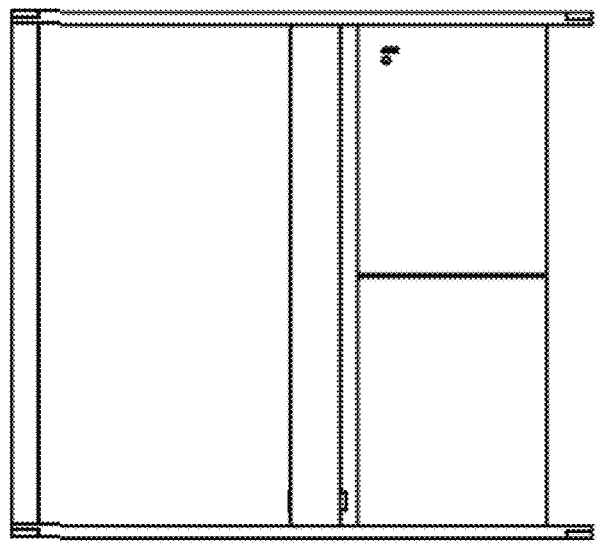
FIGS. 3A and 3B respectively illustrate a 3-level embodiment and a single layer embodiment for a hydroponic system.
Figure 3A:
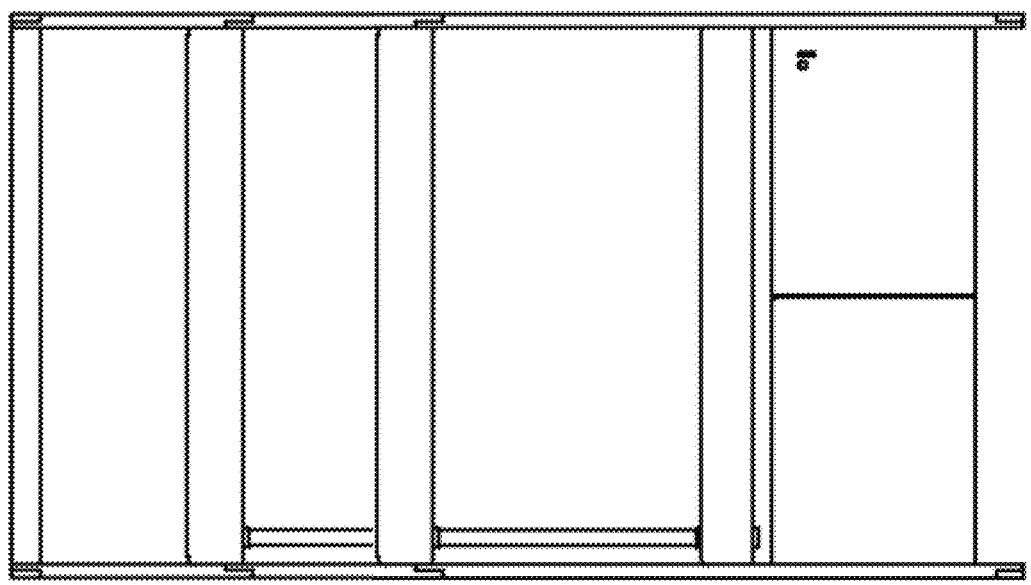

FIGS. 3A and 3B respectively illustrate a 3-level embodiment and a single layer embodiment for a hydroponic system. In the 3-level example of FIG. 3A, two short levels are arranged over a taller bottom layer. In a single layer embodiment such as FIG. 3B, the supply line directly feds the single tray, which can then directly drain back into the supply tank.

Figure 4A:
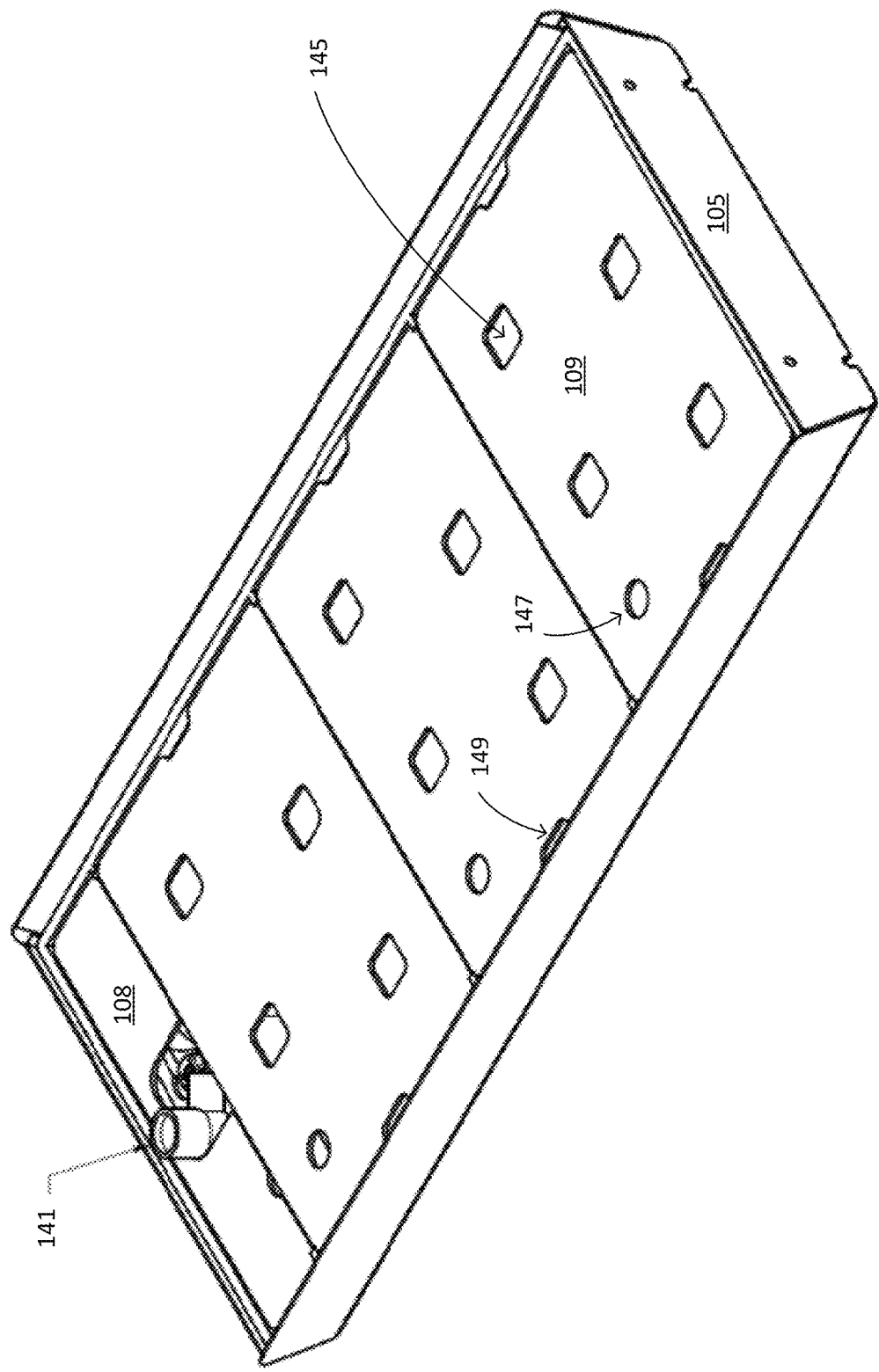
FIGS. 4A and 4B respectively show a top and bottom view of the housing, including the covering lids on top and a light source mounted on the bottom.
Figure 4B:
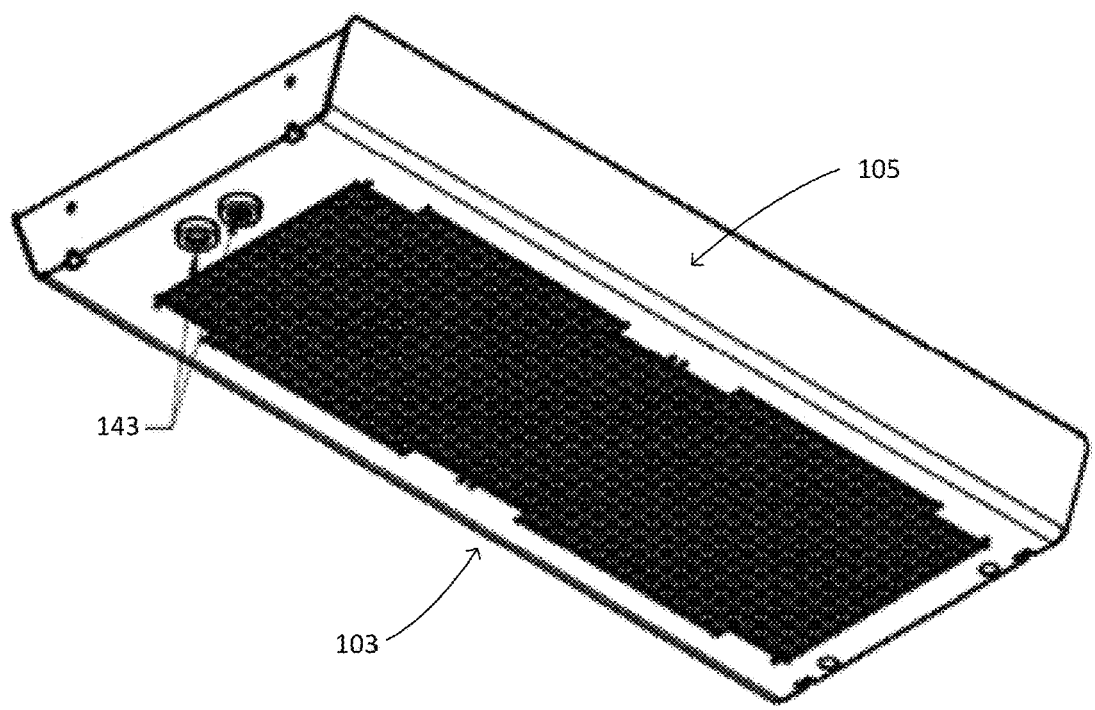
Figure 4C:
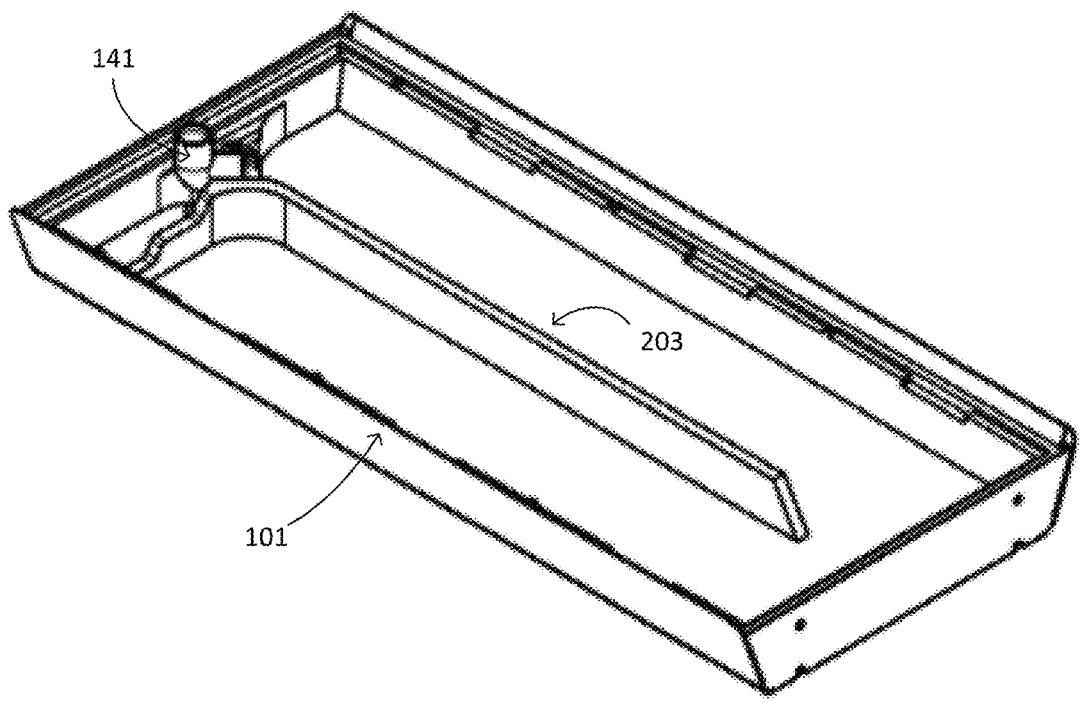
FIG. 4C shows an underlying tray, including an elbow for receiving an upper level's drainpipe.

FIGS. 4A and 4B respectively show a top and bottom view of the housing, including the covering lids on top and a light source mounted on the bottom. FIG. 4C shows an underlying tray, including an elbow for receiving an upper level's drainpipe. The outer housing 105 serves as an external tray to support the tray 101 and attaches to the frame or rack to hold the trays in a vertical arrangement, such as is shown in FIGS. 2A-2D. In FIG. 4A, the underlying tray 101 is largely obscured, being covered by the tray lids 109 and the service lid or door 108. In the shown embodiment, the tray is covered by three lids 109, but other embodiments can use a lesser or greater number of lids 109. In the shown embodiment, each lid has four holes or cup openings, such as illustrated at 145, for holding a net cup that is configured to hold a net cup that can in turn hold a plant suspended above the underlying tray. Depending on the embodiment, differing numbers, arrangements and sizes of the cup openings 145 can be used. For example, the cup openings 145 may be lined up along the back of the tray 101, rather than staggered, to take advantage of a trellis along the back of the structure in the case of vining plants. In other variations, some of the cup openings 145 may be sized to hold a smaller cup for the growing of herbs, for example. One or more of the lids 109 can include an opening 147 for the insertion of a sensor or sensors, where these can be inserted by a user to manually test the pH, electrical conductivity, or other properties of the water profile, or hold sensors connected to the control systems to automatically monitor the water profile. The lids 109 can also include finger holes or openings 149 along the edges to make it easier to remove the lids 109.

Referring now to the bottom view of FIG. 4B, if the tray 101 is to be positioned above another tray 101, the lower surface of the housing 105 can include a light source 103. In one set of embodiments, the light source 103 can include a number of LEDs, such as a mix of white, red, and blue LEDs to provide spectral content suitable for plant growth. The intensity of the light source 103 may be fixed or adjustable in intensity, and the relative intensities of the different LED types may also be adjustable in some embodiments to allow the spectral content to be varied according to the plant selection, for example. The array of LEDs can be covered by a grid of baffles or louvers to direct the light downward and avoid light straying from the underlying tray 101 to where it could shine in the eyes of people or fade furniture and carpets, for example.

As also shown in FIGS. 4B, the underside of the housing 105 has a pair of openings 143 that could each have a female grommet fitting and a male slip fitting for the attachment of the tray's drainpipe 117 and auxiliary drainpipe 119. Referring again to the top view of FIG. 4A, the service door or lid 108 covers the end region of the tray 101 where the tray's drain and auxiliary drain openings are located, leaving an opening where the drainpipe and auxiliary drainpipe from the overlying layer attach. For example, an elbow 141 is shown that can include a female slip fitting to which a drainpipe for the above tray can be connected to supply water (e.g., aqueous hydroponic nutrient) to the tray 101 in the sort of gravity fed series arrangement of trays described above. FIG. 4C illustrates one embodiment for the tray 101 and location of the elbow 141 in the tray 101. The elbow 141 can be a PVC elbow, for example, and is positioned to direct the incoming water to the region above and to the right (as represented in FIG. 4C) of the lateral barrier running lengthwise in the rectangular tray 101. (The structure of the tray 101 is discussed in more detail below.)

Figure 5A:
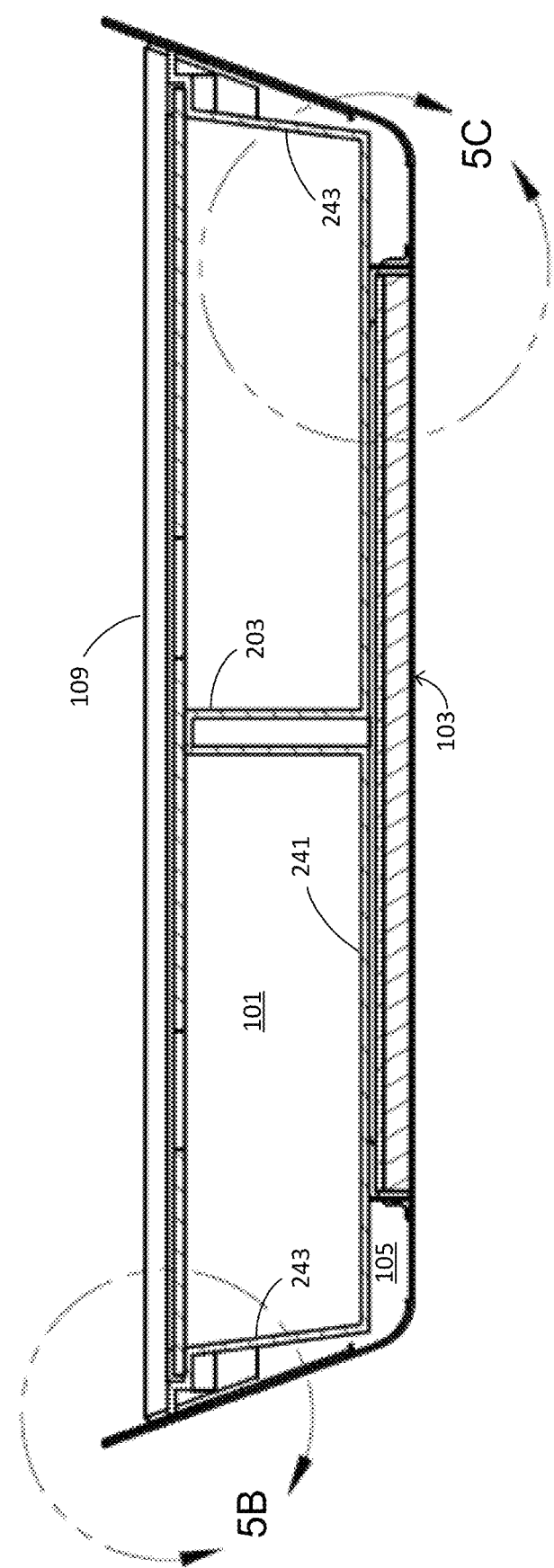
FIGS. 5A-5C show a cross-section taken transversely across FIG. 4A, where
Figure 5C:
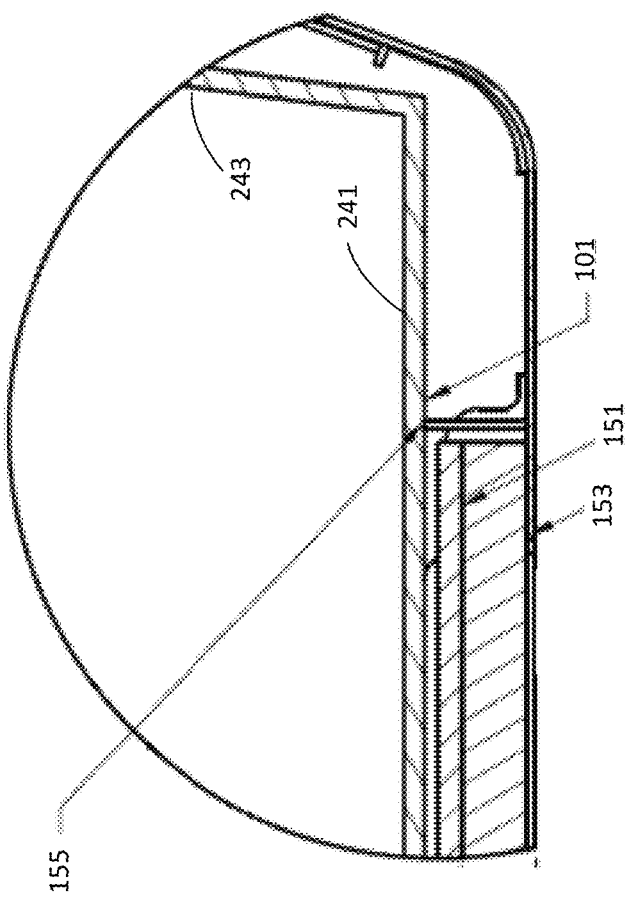
Figure 5B:
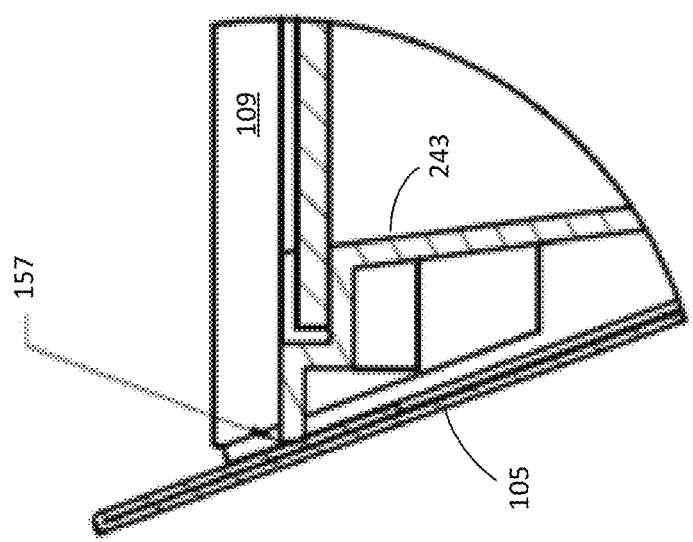

FIGS. 5A-5C show a cross-section taken transversely (the short direction across the rectangular structure) of FIG. 4A, where FIGS. 5B and 5C are detail of FIG. 5A. The housing 105 forms an outer tray to hold the tray 101 for the aqueous hydroponic nutrient. The vertical element at the center is the lateral barrier 203 of the tray 101 and is discussed in more detail below. Over the top of the tray 101 is the lid 109, and recessed into the bottom of the housing 105 is the light source 103. In FIG. 5A the interior floor or bottom of the tray is indicated at 241 and can either be flat or slope from the input towards the drain. In the embodiments primarily discussed here, the floor 241 is flat and at the same level as the drain, so that the floor 241 is at the same height both to the left and to the right of the lateral barrier 203. In a sloping floor embodiment, the floor 241 on the side closer to the input (to the right of the lateral barrier 203 as represented in FIG. 5A) would be higher than the floor on the drain side (to the left). The walls 243 can either be sloped or vertical, depending on the embodiment. For example, in the embodiments illustrated in the figures here, the longer front and back side walls 243 seen in FIG. 5A both slope outwards, while the shorter side walls (not seen in the cross-section of FIG. 5A) are vertical.

The detail of FIG. 5B is an expanded view of the correspondingly marked region of FIG. 5A. The edge or lip of tray 101 is stepped for fitting into the supporting housing 105, being cut to fit closely to the housing, as indicated at 157.

The detail of FIG. 5C is an expanded view of the correspondingly marked region of FIG. 5A. As indicated at 155, the bottom of tray 101 can be supported by resting on vertical flanges of the housing 105. When the housing 105 includes a light fixture 103, the light fixture 103 can be recessed into the bottom of the housing 105. The light panel 151 can be formed of an array of LEDs recessed into the housing 105, which is covered with the louver 153 that can be flush with the bottom of the surrounding housing 105.

Figure 6A:
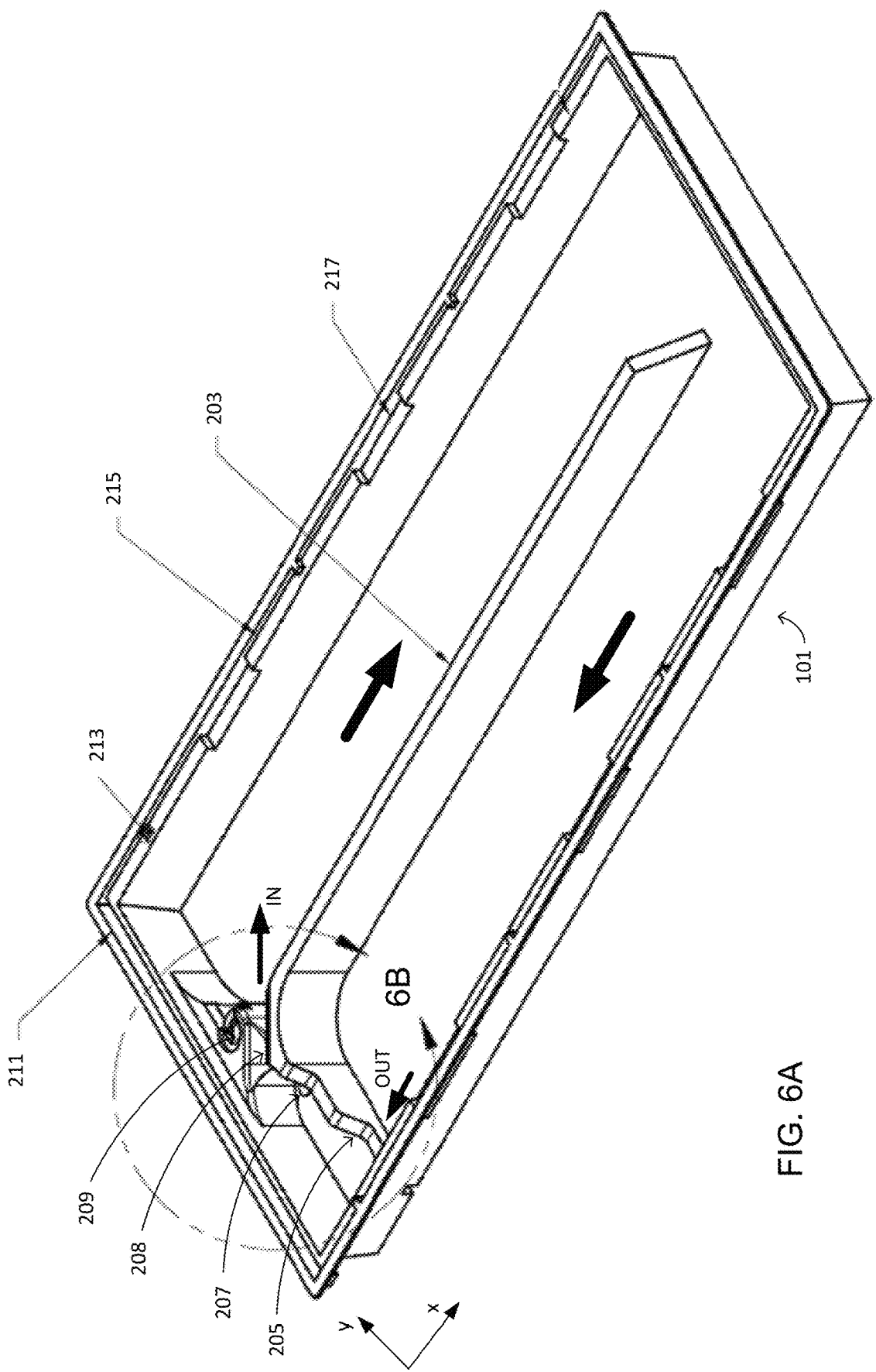
FIGS. 6A and 6B illustrate the structure of an embodiment for the tray, where
Figure 6B:
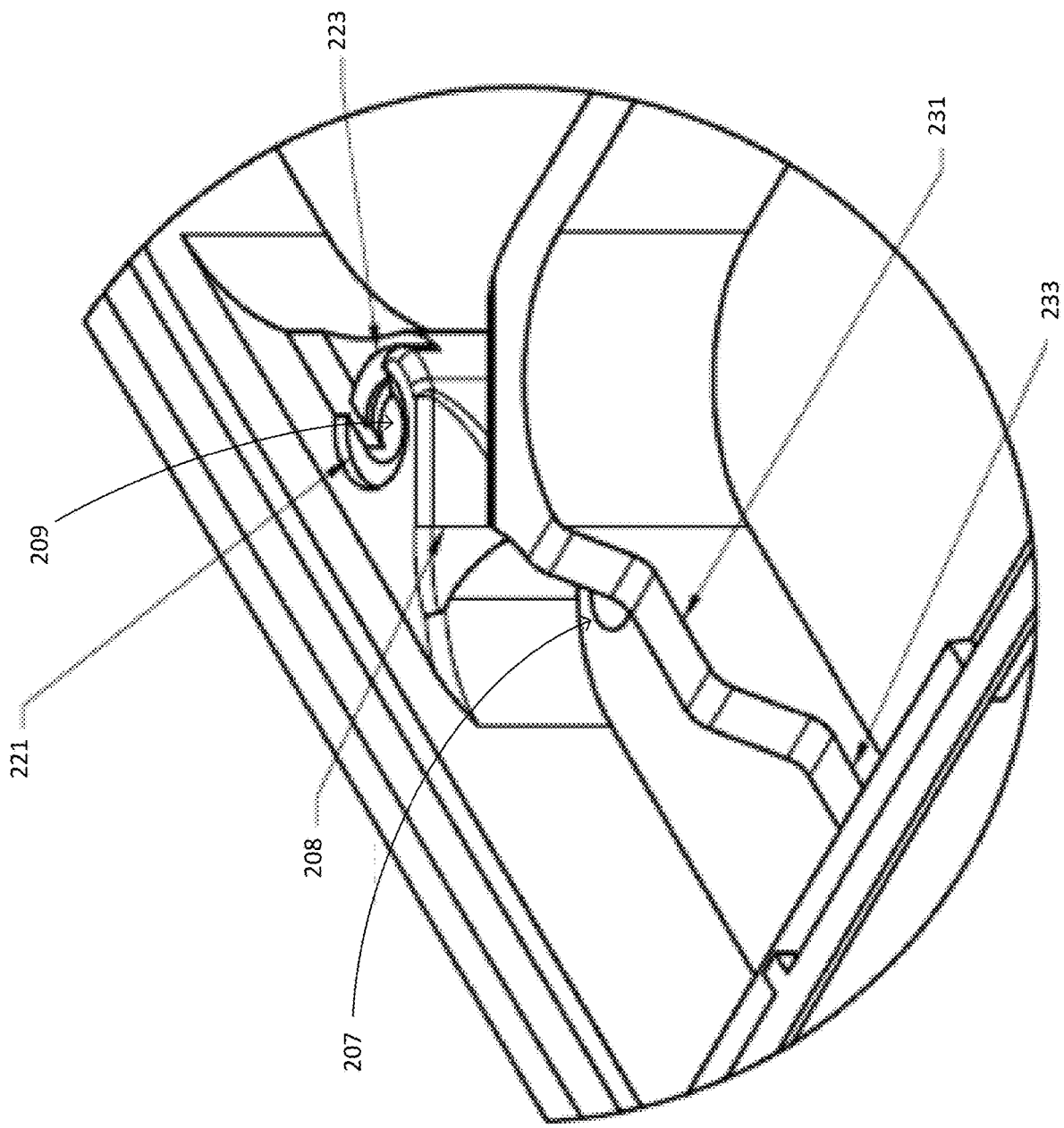

FIGS. 6A and 6B illustrate the structure of an embodiment for the tray 101, where FIG. 6B is a detail of FIG. 6A. In the embodiment of FIG. 6A, the tray 101 is a rectangular shape, extending the x, or lateral, direction for a length of several times the width in the y, or transverse, direction. Other shapes can be used for alternate embodiments, but the configuration of FIG. 6A is suited to the sort of rack or cabinet for indoor use that was described above with respect to FIGS. 2A-2D. The tray can be formed of molded plastic, such as thermoformed high impact polystyrene for example.

The water can be fed in (as marked by the IN arrow) by a supply tube (e.g., 115 of FIG. 1) at opening 209 for a top level, or single level embodiment, tray 101, or from a drainpipe from a higher level that would connect to an elbow (141 of FIG. 4A or 4C) that can rest in the curved recessed region 208 that can be shaped as a "half-pipe" area that is configured to hold the elbow. For either source, the input is provided from an area raised above the tray bottom, from which it will flow to one side of lateral barrier 203 running most of the length of the tray 101 in the x direction. The water will drain from the tray 101 at a drain opening 207 (mostly obscured in the FIG. 6A), flowing toward the drain (as indicated by the OUT arrow).

In the embodiments illustrated here in FIGS. 4C, 5A, 6A and related figures, the tray 101 has a rectangular shape with the longer front and back side walls running in the lateral direction sloping outward, and the shorter front and back side walls being vertical. The interior floor or bottom 241 is flat and at the same level as, or somewhat above, the drain opening 207, with the main portion of the floor (with the lateral barrier 203 and the region over which the plants are placed). The main region or portion of the floor 241, over which the plants are located and suspended in the net cups in the cup openings 145 of the lids 109, is separated from the dam region by the dam 205 with a lower region 233 that is raised relative to the main region or portion of the floor 241, but lower than the opening 209 and region 208 that are used for the input and auxiliary overflow. The opening 209 and region 208 that are used for the input and auxiliary overflow are in turn lower than the lateral barrier 203, so that any input of water from these elements will be directed to the input side. As noted, both of the drain opening 207 and the opening 209 and region 208 are located off to the same side of the tray relative to the main region or portion of the floor 241.

In a top (or single) level tray, the supply tube will enter at opening 209, while for lower levels an auxiliary drainpipe segment will attach at opening 209, extend upward to attach below the overlying tray and act as a conduit for the supply tube. From the drain opening 207, a drainpipe section is connected to return the water to the tank (for the bottom-most tray) or to supply an underlying tray. The drainpipe section extending from the drain hole of the overlying can be aligned with the drain opening 207, but fit into an elbow fitted into the region 208 so that it will be directed to the input side.

In FIG. 6A, both the input and the output for the water are located along the upper left (as represented in the figure) shorter side of the tray 101. As discussed above, this allows for the plumbing of the water re-circulation system to all be arranged along the one side for convenience. This means that the water to flow from the input to the drain opening and, so that all of the plants suspended over the tray 101 to be supplied, to flow across the full surface of the tray bottom. To direct the flow, a lateral barrier 203 can be included to provide the flow as indicated by the arrows. The lateral barrier can also serve a support function for the tray lids. In the embodiment of FIG. 6A, the lateral barrier separates the input region around opening 209 above and to the right (as represented in FIG. 6A from the drain region around opening 207, extending laterally most of the length of the tray 101, but with a gap at the end opposite the input and output regions. This allows the flow from the input to travel toward the far end of the tray 101 on the one end, loop around the end of the lateral barrier and flow back towards drain 207, covering the bottom of the tray. It will be understood that FIG. 6A is just particular embodiment and that, in addition to changes of relative dimensions, left-right, front-back, or both can be swapped around. The lateral barrier 203 can also have other shapes and provide more than two channels: for example, in the case of a square shape for the tray 101, the lateral barrier 203 could be formed of several sections to direct the flow from the input to the far end in a first channel toward the far, redirect the flow back to the input end in a second channel, redirect the flow back again toward the far end in a third channel, before finally directing it back to the dam 205 in a fourth channel.

To affect the flow along the tray 101 as illustrated by the arrows in FIG. 6A, the bottom of the tray 101 can be slopped downwards toward the drain opening 207, use a dam, or a combination of these. The embodiment of FIG. 6A uses a flat bottom and a dam 205. The dam 205 extends from the lateral barrier 203 to the side wall to limit the flow as indicated at the OUT arrow to the drain 207. The height of the dam 205 will set the water level in the tray 101. The use of a dam 205 to maintain a water depth in the tray 101 will make the flow less sensitive to how level the tray is within the supporting structure of a rack or frame for small angles.

FIG. 6B provides detail on the corresponding region circled in FIG. 6A, including the dam 205, drain opening 207, and the auxiliary drainpipe/input opening 209. The dam 205 includes a lower region 233 that acts as a weir and sets the water height in the tray 101, and a raised barrier region 231 that can inhibit root incursion into the area around the drain opening 207. The height of the lower dam region 233 can vary based upon the embodiment to allow for different water heights in the tray and can be of a fixed height, as shown in FIG. 6B, or user adjustable for allow for the water height to be user-set or allow for the tray 101 to be drained without its being removed.

In the embodiment of FIGS. 6A and 6B, the lateral barrier 203 curves around into the dam region 205, but in other examples, these could meet at a right angle or with a diagonal region. The curvature allows space for the "half-pipe" region 208 that is configured to locate the pipe elbow 141 as shown in FIG. 4C where the overlying tray's drainpipe can connect to supply the tray 101. FIG. 6B also shows detail for the opening 209. Around the opening 209, the tray can include an annular region of a recessed step as indicated at 221 that can locate and support an auxiliary drainpipe connected to the bottom of the overlying tray. Relative to the level of the recessed step as indicted at 221, a region 223 can be further stepped down. For the top-most tray, the stepped channel at 223 can hold an elbow or other end of the supply tube 115 so that it can provide the input flow of the water and plant nutrients provided by the water re-circulation system from the tank 111 as illustrated in FIG. 1. For lower level trays, which will have an auxiliary drainpipe mounted into the recessed step 221, this provides an overflow gap into which water can flow down the auxiliary drainpipe 119 to drain off an excessive water level and reduce the likelihood that a tray will overflow.

Considering the relative heights of the lower dam region 233, the raised barrier 231, and stepped channel 223 of the opening 209, the lower dam region 233 is the primary outflow channel from the tray 101 and acts as a weir to set the level of liquid in the tray 101. The stepped channel 223 is set higher than lower dam region 233 and provides overflow if the drain opening 207 becomes blocked or sufficiently obstructed (such as by roots, for example) so that it cannot keep up with the inflow rate, or if the lower dam region 233 is blocked. The raised barrier region 231 can be at an intermediate height between that of the stepped channel 223 and the lower dam region 233 and serve an alternate spillway-like function when the drain opening 207 is still draining, but the lower dam region 233 is obstructed.

Figure 6C:
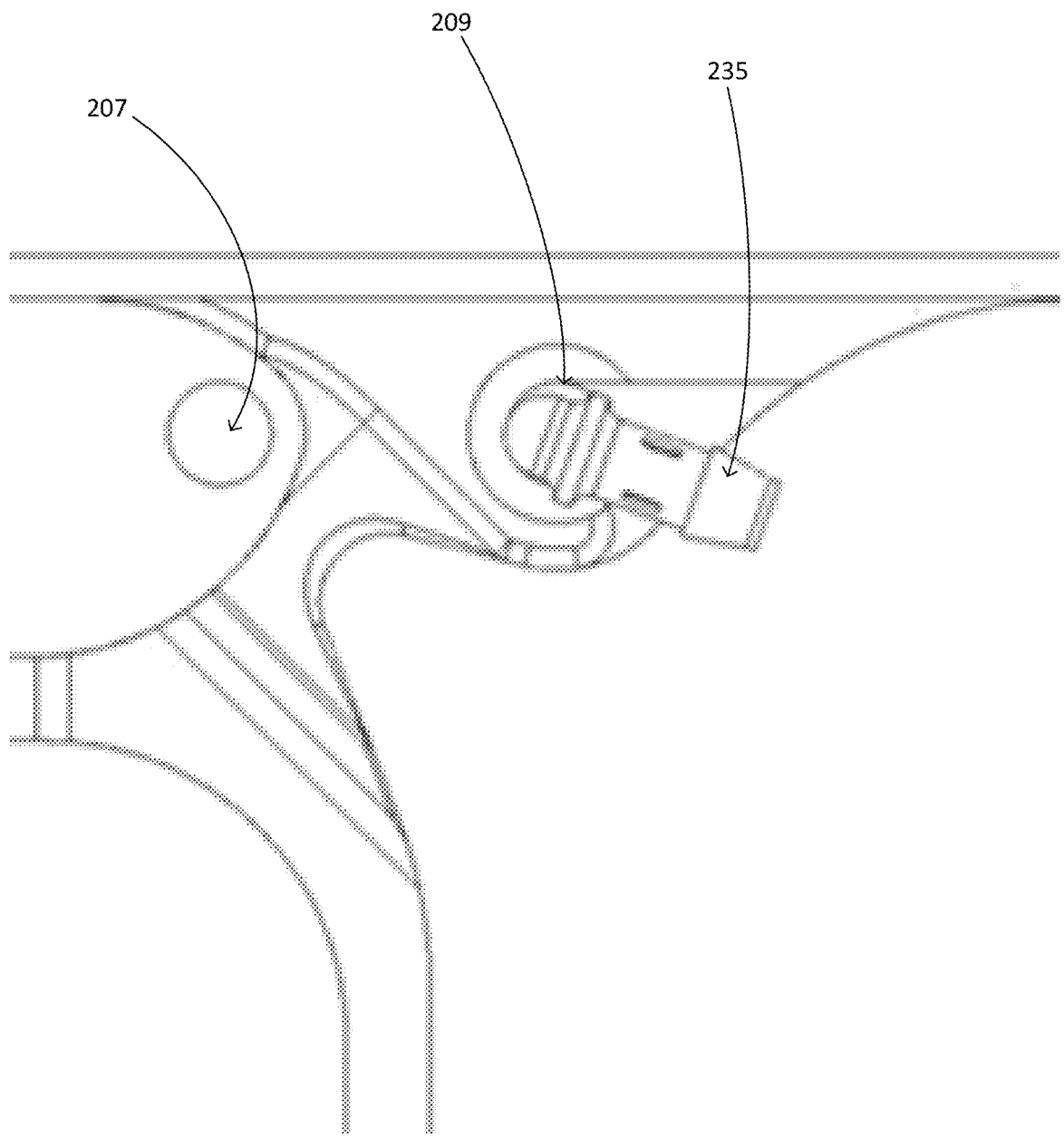
FIGS. 6C and 6D illustrate the use of the region of the conduit and auxiliary drain opening for supplying the tray and providing overflow protection for a top level tray and a lower level tray, respectively.
Figure 6D:
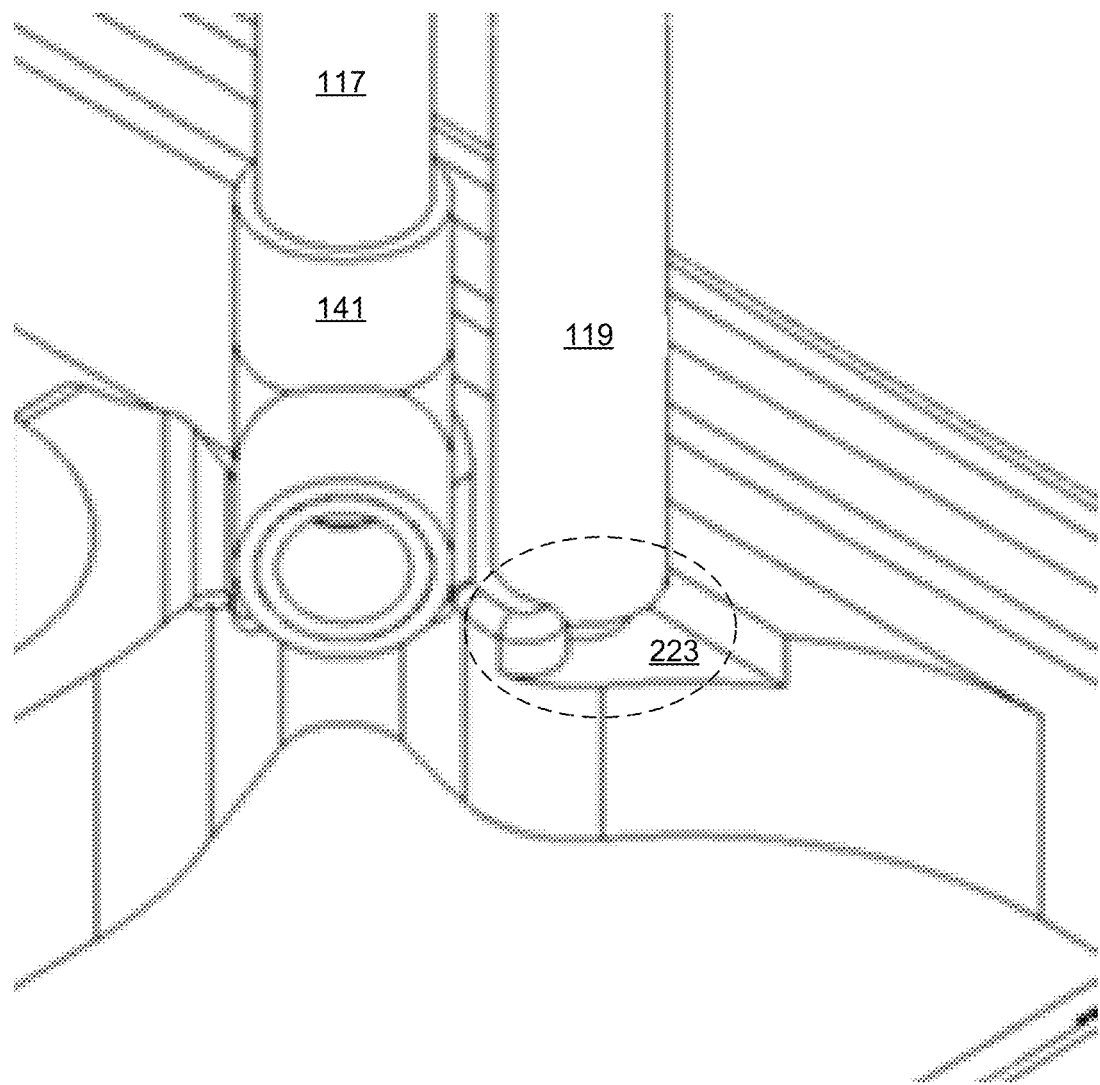

FIGS. 6C and 6D illustrate the use of the region of the opening 209 for supplying the tray 101 and providing overflow protection for a top-level tray and a lower level tray, respectively. In the case of a top-level tray shown in FIG. 6C, the supply tube 115 of FIG. 1 runs up the conduit and auxiliary drainpipe 119 into the opening 209 and ends in an elbow or nozzle fitting 235 to feed the tray 101. The elbow or nozzle fitting 235 can be lodged in the stepped channel 223 to hold it in place, while still leaving room around sides in the opening 209 so that it can provide the overflow function if the drain opening 207 becomes obstructed. FIG. 6D shows the situation for a lower tray that is supplied by the drainpipe 117 from over-lying tray that ends the elbow 141. The auxiliary drainpipe 119 sits in (and obstructs the view of) the annular region of step 221 around the opening 209 of FIG. 6B, providing a conduit for the supply tube 115 going up to, and auxiliary drainage coming down from, the over-lying tray. The stepped channel 223 provides a gap (circled in the figure) for overflow drainage, where the gap provided by the step channel 223 can be augmented or replaced by cutting into the auxiliary drainpipe 119 for this purpose.

Returning to FIG. 6A, the edges of the tray 101 can include features to accommodate tray lids 109 and the service lid 108 as shown in FIG. 4A. A pocket indicated at 211 can allow the service lid 108 to rest vertically over the tray 101. A set of bumps, such as indicated at 213 can locate the tray lids 109 and the service lid 108 on the tray 101. The "shelves" along the side, such as indicated at 215, can support the tray lids 109 and the service lid 108 over the tray 101. In between the "shelf" segments along the edge of the tray 101 can be finger holes, such as indicated at 217 to facilitate lifting of the lids.

FIGS. 7A and 7B are bottom views of the tray embodiment of FIG. 6A. On the underside of tray 101 as shown in FIG. 7A, along the upper left edge, are a downspout 244 for connection of the (primary) drainpipe 117 and the auxiliary drainpipe 119. FIG. 7B is a detail showing the circled region of FIG. 7A.

Figure 8A:
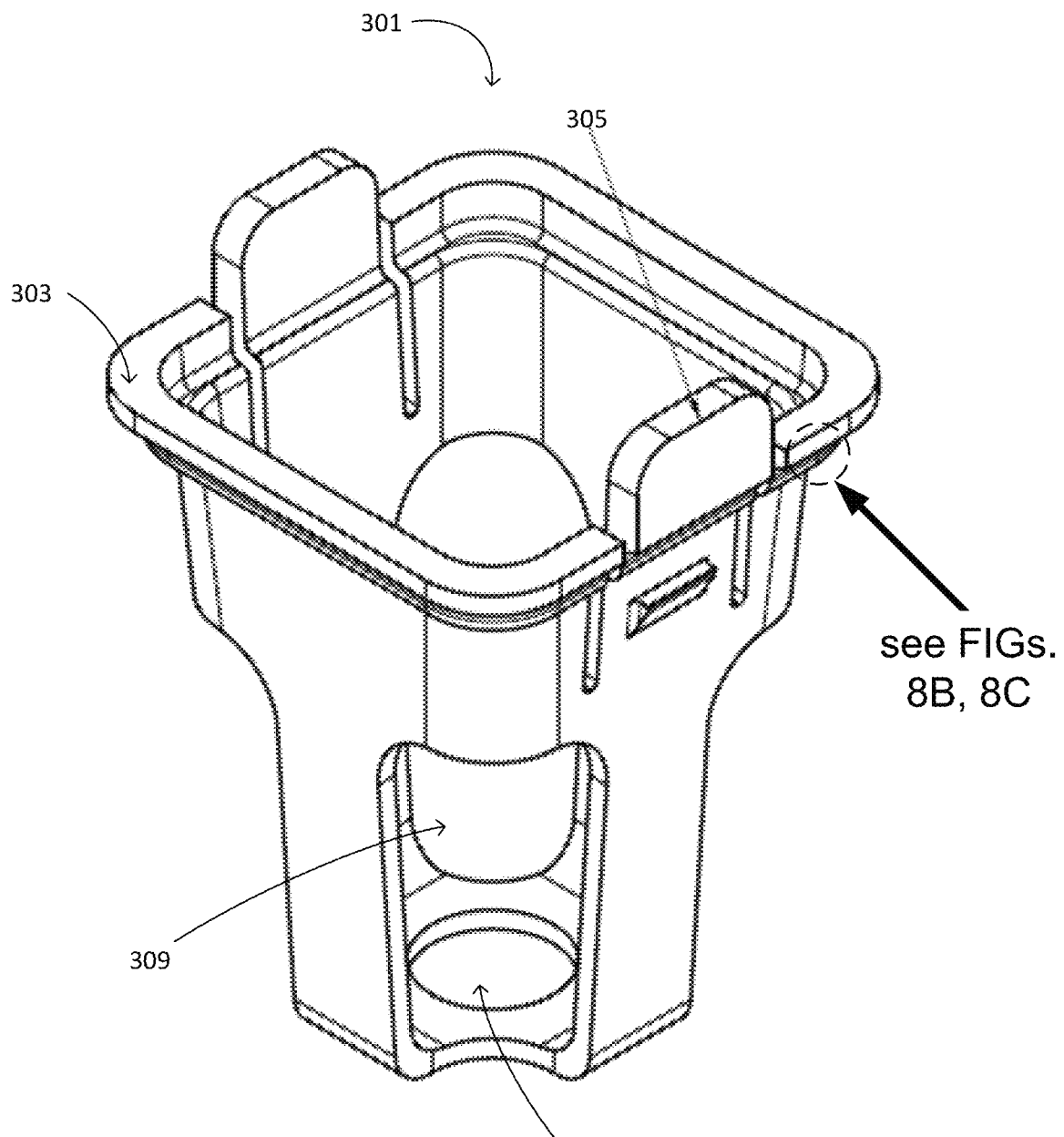
FIGS. 8A-8C illustrates an embodiment of a net cup for holding a plant as part of a hydroponic system.

Referring back to FIGS. 2D and 4A, the trays 101 of the hydroponic system 100 are covered by lids 109 having cup openings 145 that are configured for holding net cups that hold the plants. FIG. 8A shows one example of a net cup.

Figure 8B:
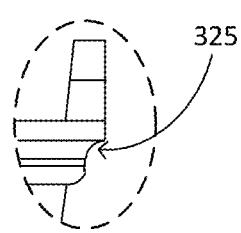
Figure 8C:
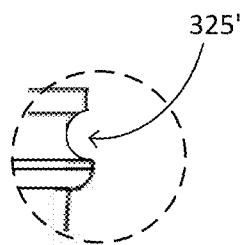

FIG. 8A illustrates an embodiment of a net cup 301 for holding a plant as part of a hydroponic system. The net cup 301 can be made of plastic, such as injection molded acrylonitrile butadiene styrene (ABS), and fits into a cup opening 145 of a lid 109 to suspend a plant over an underlying tray. The net cup 301 is sized to fit the cup opening 145 and can vary depending on the embodiment, but can be 1-3 inches (2.5-7.5 cm) across, for example, to hold a typical plant. The net cup 301 can include a lip 303 to lap over the edge of cup opening 145 and have a set of tabs 305 to allow the net cup 301 to snap in place and be held securely, where the tabs 305 can be pinched in to remove the net cup 301. As shown in the detail of FIG. 8B or 8C, some embodiments of the net cup 301 can also include a side slot or groove 325 or 325' around the edge that can be used to hold a support for plants, as discussed in more detail below. In the embodiment of FIG. 8B, the circular arc of groove 325 is configured to hold a support between the groove and a lid 109 into which it is place. For the embodiment of FIG. 8C, the groove is a side slot 325' is a semi-circular recess to hold the support The net cup 301 is configured to hold soilless growth medium, such as perlite, gravel, peat, coir (coconut fiber) or other inert medium, into which seeds or young plants can be placed. The embodiment of FIG. 8A holds a peat plug 309 extending down into the net cup 301 and having a top that is more or less flush with the top of the cup. The net cup 301 extends downward, so that when placed into a lid 109 over a tray 101 the bottom of the net cup 301 will be above the bottom of the tray 101 but extend into the water (e.g., aqueous hydroponic nutrient) enough so that the peat plug 309 can wick up the water and plant nutrients. The cup 301 has a net section in that it has openings 307 around its sides, bottom, or both to allow the water in and, as the plant grows, the roots out. Variations on the cup's structure for different crops are discussed in more detail below.

Figure 9:
FIG. 9 illustrates an embodiment of the hydroponic system with plants in place.

FIG. 9 illustrates an embodiment of the hydroponic system 100 with plants in place. FIG. 9 shows the same view as FIG. 2A, but with net cups installed and plants growing in the cups. As illustrated, a number of different crops can be grown concurrently, where, as described in more detail below, the water profile of the system can be based on the composition and state of development of the plants. The embodiment of FIG. 9 has a taller lower shelf, that can hold taller plants and an upper shorter shelf. For example, the lower shelf could be used for vining crops, such as tomato plants. For vining plants or other plants that can benefit from support, a trellis or other supports can be introduced to the hydroponic growing system. Depending on the embodiment, a plant can be provided with an individual support, a lattice or other support can be common to several plants, or a combination of these.

Figure 10A:
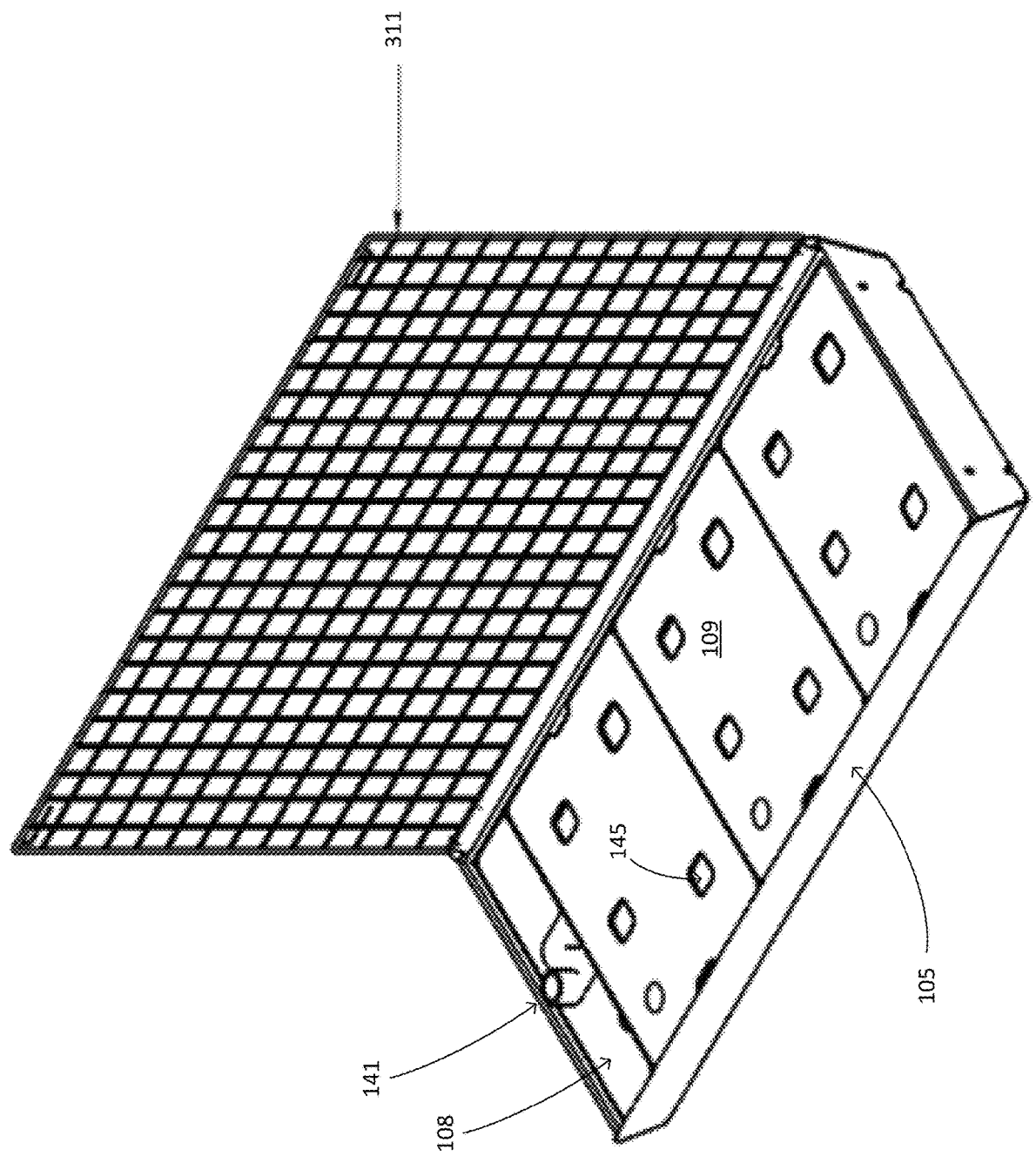
FIGS. 10A-10D illustrate one embodiment of a trellis that can be combined with a tray assembly.

FIGS. 10A-10D illustrate one embodiment of a trellis that can be combined with a tray assembly. FIG. 10A shows a tray includes lids 109 over the housing 105 in the same view as described above in FIG. 4A. Relative to FIG. 4A, FIG. 10A includes a trellis 311 at the rear of the housing 105. In the embodiment of FIG. 10A, the trellis 311 is a full trellis running full width of the tray. In other embodiment the trellis 311 could be across only a portion of the back of the housing 105 or include openings for accessing the plants. Trellises could also be placed on the sides or front, where the trellis could have gaps or openings for access. The trellis 311 can attach to the housing 105, attach to an overlying housing or light structure, the side support members for the overlying layer, or some combination of these.

To better take advantage of the trellis 311, the tray lids 109 can be configured differently than illustrated in FIG. 4A. Rather being offset as is FIG. 4A, in FIG. 10A the cup openings 145 of the back row that were previously set closer to the front are now set back closer to the trellis 311. By having the back row cup openings 145 arranged in a line near to the trellis 311 so that vining plants can take better advantage of the trellis 311.

Figure 10D:
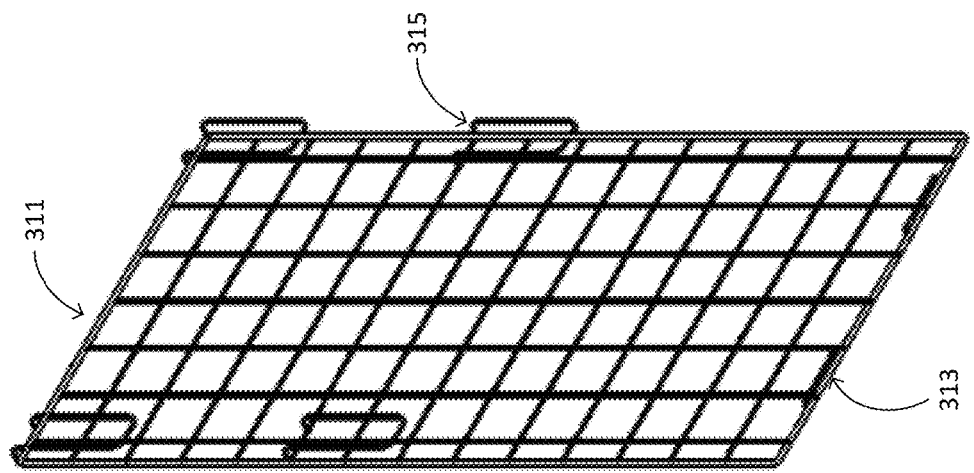
Figure 10C:
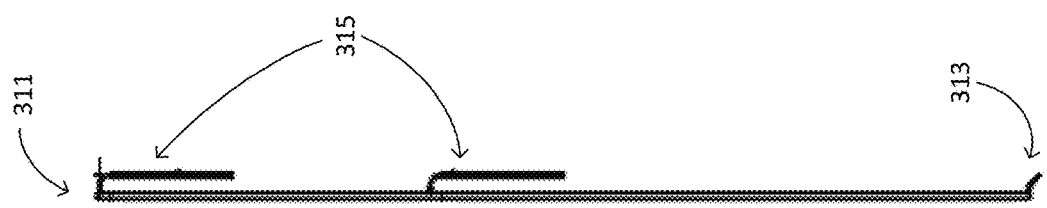
Figure 10B:
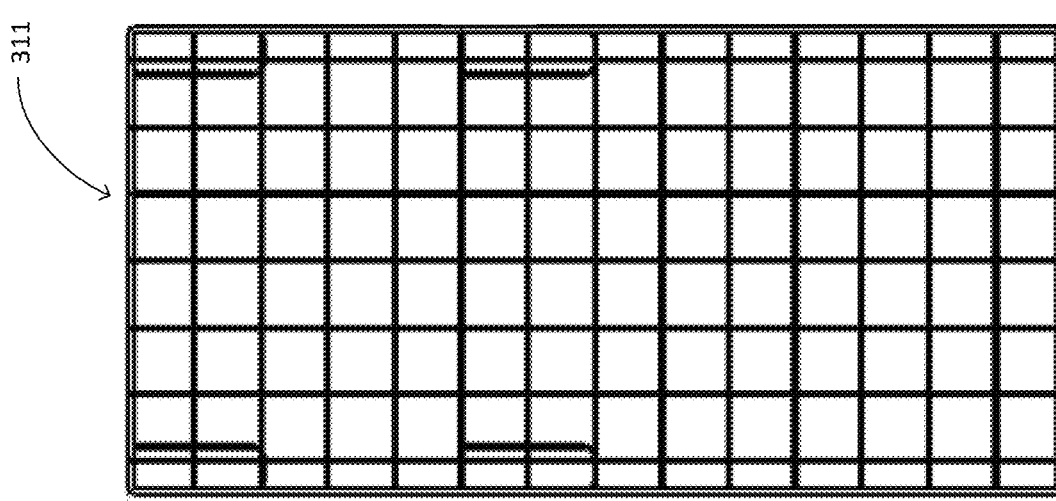

FIGS. 10B-10D show several views (front, side and oblique, respectively) of a trellis 311, where the trellis 311 of FIGS. 10B-10D is of a different aspect ratio than shown in FIG. 10A. Rather than being the full width of the housing 105, the trellis 311 is narrower, such as having the width of a single lid 109. As show in the front view of FIG. 10B, the trellis 311 can have tabs 313 along the bottom for attachment to the housing 105. As shown in the side view of FIG. 10C, the bottom tabs 313 can extend backwards to fit into an opening in the housing 105 or in between the housing 105 and the lid 109. As shown more clearly in the side view 10C and oblique view 10D, tabs 315 can be included on the trellis 311 for attachment to overlying layers, where the tabs can be user bendable to facilitate installation. The trellis 311 can be formed of various material, such as 10 gauge wire, XX gauge wire, stainless steel, or cold rolled steel that can be zinc plated or powder coated.

FIGS. 11A-11E illustrate an embodiment of a plant support 321 attachable to an individual net cup 301. This allows the plant support 321 to attached to all of the net cups 301 of the system, or only to a selected set of net cups 301 holding plants (such as vining crops) a user feels could benefit from vertical support. For example, all of the net cups of the hydroponic system could have a plant support attached or only one or two could have a plant support attached when a variety of the different plants are being grown concurrently.

Figure 11A:
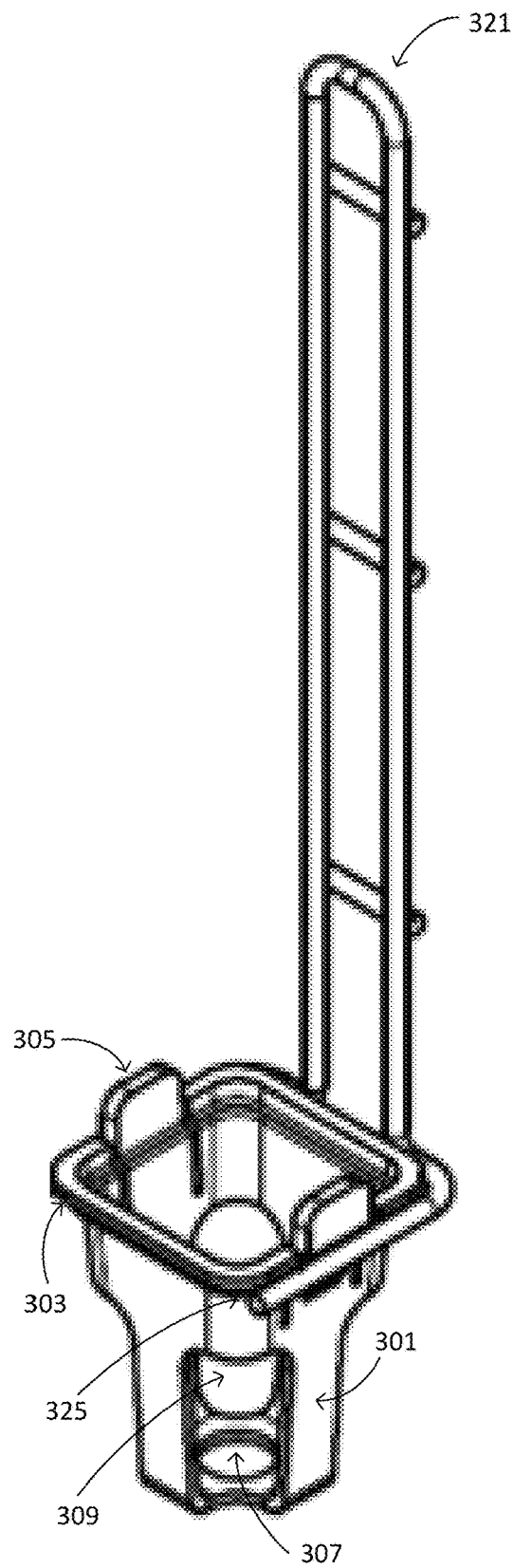
FIGS. 11A-11E illustrate an embodiment of a plant support that can be attached to an individual net cup.
Figure 11C:
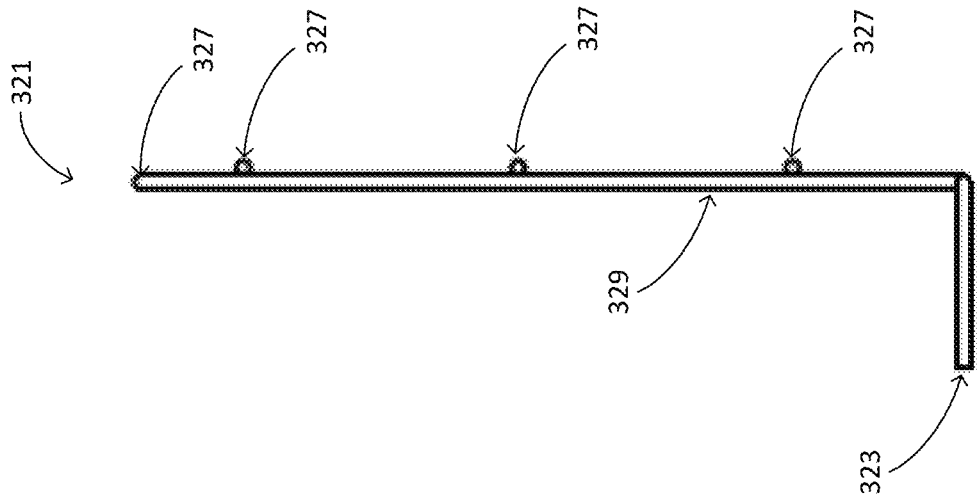

FIG. 11A shows an embodiment of the plant support 321 attached to a net cup 301, with FIGS. 11B-11E respectively showing side, front, and top views of the support. Considering the front view of FIG. 11D, the plant support 321 includes a pair of support rods 329 connected by one of more cross-members or cross-bars 327. In the shown embodiment, the two rods 329 and the top one of the cross members 327 are formed of a single element, while the other cross members of 327 are formed of separate segments attached along the back, as shown in FIG. 11C.

As can also be seen from the side view of FIG. 11C, the plant support 327 has an L shape, with the rods 329 extending vertically and a pair of horizontal connector sections or feet 323. Although shown forming a right-angle, in some embodiments the rods may extend vertically, but not orthogonally, from the tray lid 109, forming an angle other than 90 degrees. The horizontal connector feet 323 can be formed of the same element as the two upright supports 329, such as in the shown embodiment where the horizontal connector feet 323, rods 329, and top one of the cross members 327 are formed of a single element. The plant support 321 can be formed of various material, such as 10 gauge wire, XX gauge wire, stainless steel, or cold rolled steel that can be zinc plated or powder coated, so that horizontal feet 323, rods 329, and top one of the cross members 327 are shaped out of a single wire. In other embodiments, the plant support can be formed out of plastic or other material. Additionally, although the figures show the pieces of the plant support structure are being round in cross-section, and the slot or groove 325, 325' of FIGS. 8B and 8C as having a circular arc or semi-circular shape, other shapes could be used, such as a square cross-section and a correspondingly shaped slot or groove 325 or 325'.

The horizontal connector sections or feet 323 are configured to attach the plant support 321 to a net cup 301 and are spaced for the purpose. As shown in the top view of FIG. 11E, the horizontal feet 323 extend parallel to one another and are spaced to fit onto a net cup 301. In the embodiment illustrated in FIGS. 11A-11E, the horizontal feet 323 forming the foot of the L have a wider spacing than for the rods 329 of the L, but in other embodiments the spacing of the rods 329 can be the same or have a wider spacing than for the horizontal feet 323, which are sized to fit the net cup 301.

The rods 329 and cross-members or cross-bars 327 provide support for a plant growing in the net cup 301, where the plant can be attached with ties, for example, to the plant support 327 as it grows. FIG. 11A illustrates the plant support 321 attached to a net cup 301. A net cup 301 with an attached plant support 321 can be placed into one of the cup openings 145 as shown in FIG. 4A or FIG. 10A. In the case of FIG. 10A, a plant support 321 can be used in conjunction with the trellis 311, where the lower stem of the plant being supported by the plant support 321 and upper vining portions attached to the trellis 311.

Figure 11B:
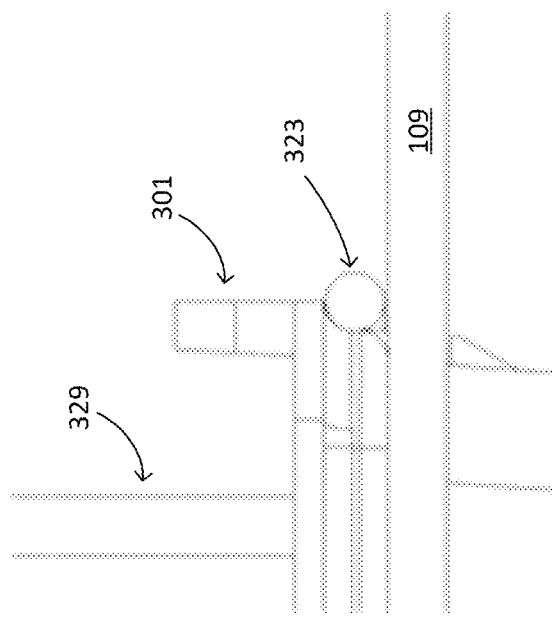
Figure 11E:
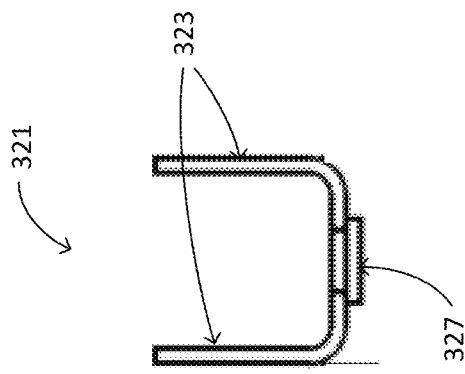
Figure 11D:
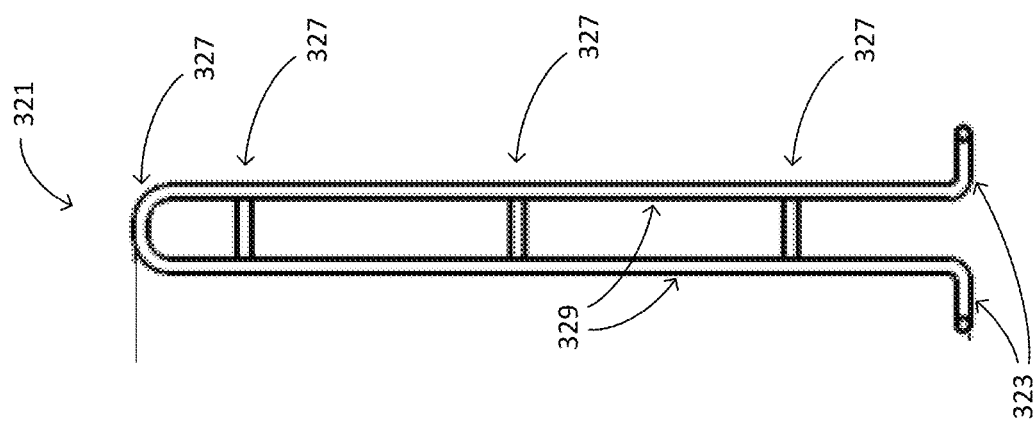

The net cup 301 of FIG. 11A can be largely the same as the embodiment of FIGS. 8A-8C, and can include a slot or groove 325 or 325' around the upper edge to hold horizontal connector sections or feet 323, where the inward pressure of the wire can help to hold the plant support 321 in place. FIG. 11B illustrates the cup 301 placed into the lid 109 for the embodiment of FIG. 8B. In the embodiment, the horizontal feet 323 are held in place between the groove 325 of FIG. 8B and the lid 109. For the embodiment of FIG. 8B, a position of the feet 323 would also be held underneath by the groove of a semi-circular slot 325'to hold the support structure 321 to the cup 301. Other embodiments can be used for affixing the plant support 321 to the net cup 301. For example, the net cup 301 could have horizontal holes into which the horizontal feet 323 can be inserted, or the horizontal feet 323 just be held in place between the lip 303 of the net cup 301 and the lid 109 when the net cup 301 is inserted into a cup opening 145.

Figure 12A:
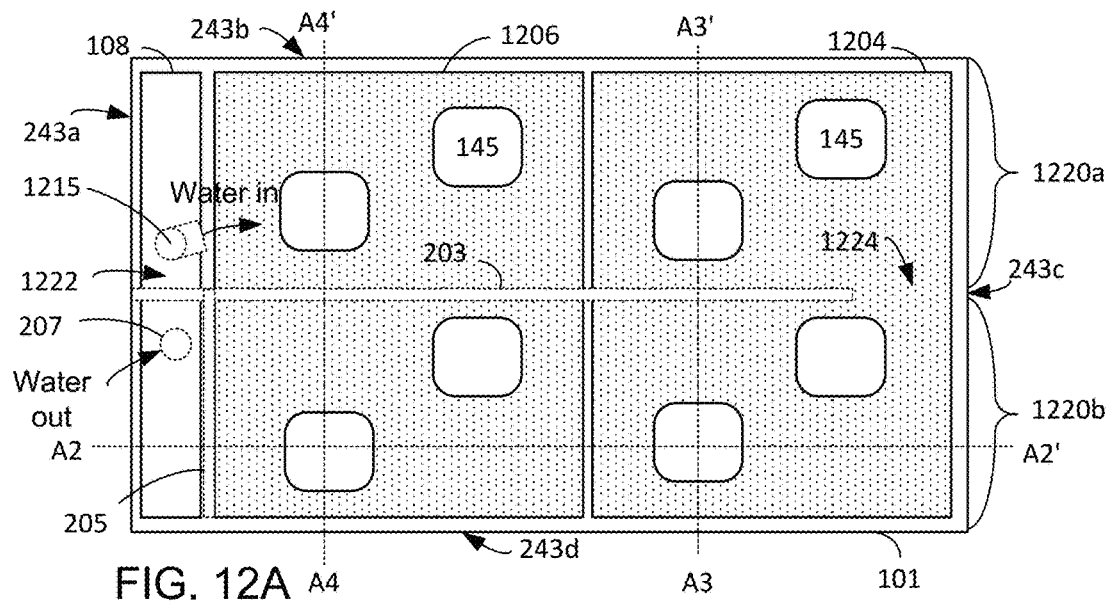
FIGS. 12A-12D depict two different types of removable growing structures that may be used to grow plants that have different requirements with respect to interaction with water on the bottom of the tray, one of which may be used to grow root vegetables.
Figure 12B:
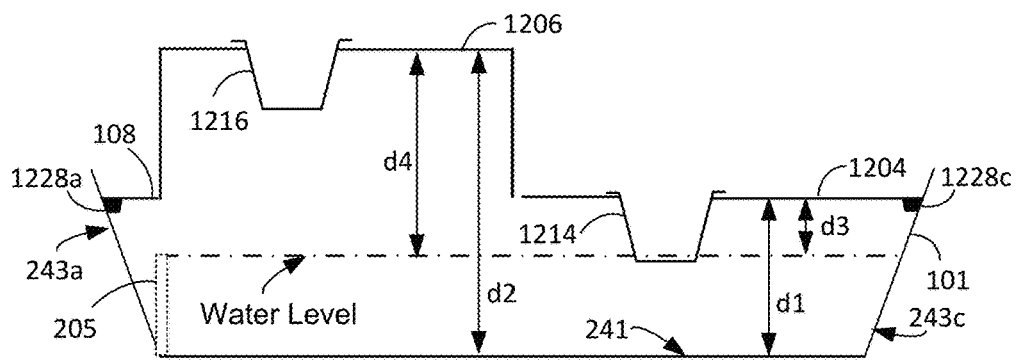
Figure 12C:
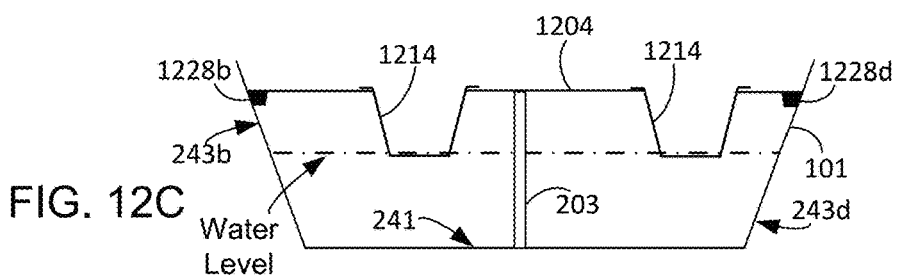
Figure 12D:
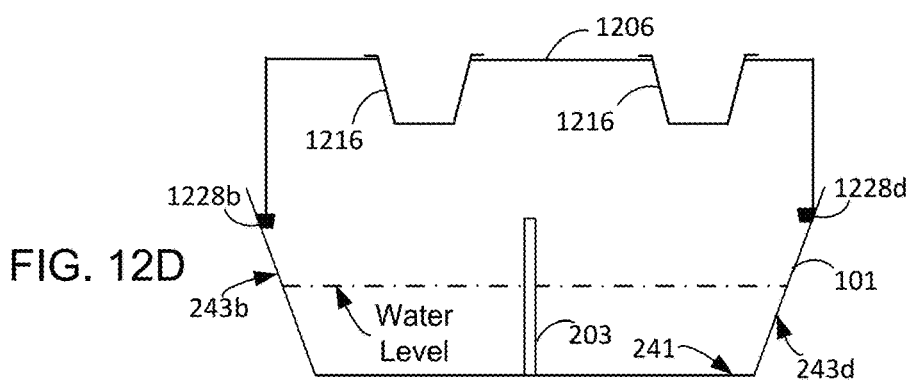

FIG. 12A is a top view of one embodiment of hydroponic apparatus, which may be used in one level of a hydroponic system 100. FIG. 12B depicts a cross-sectional view along line A2-A2' in FIG. 12A. FIG. 12C depicts a cross-sectional view along line A3-A3' in FIG. 12A. FIG. 12D depicts a cross-sectional view along line A4-A4' in FIG. 12A. FIGS. 12A-12D depict two different types of removable growing structures that may be used to grow plants that have different requirements with respect to interaction with water on the bottom of the tray 101. For example, one of the removable growing structures may be used to grow plants in which the roots are bathed in the water that flows along the bottom of the tray 101. Another of the removable growing structures may be used to grow plants (e.g., root vegetables) to maturity in which the roots are not bathed to the water that flows along the bottom of the tray 101. The tray 101 may also be referred to herein as a base tray.

One of the removable growing structures includes lid 1204. Another of the removable growing structures includes lid 1206. Each lid 1204, 1216 has several net cup openings 145, each of which may be used to hold a net cup 1214, 1216 (net cups not depicted in FIG. 12A). In one embodiment, lid 1206 is used to grow rooted vegetables. In general, there may be one or more such lids in the tray 101. The net cups 1214, 1216 may be used to contain a hydroponic growing medium (not depicted in FIGS. 12A-12D). In one embodiment, the hydroponic growing medium is a soil-less growing medium.

The tray 101 has an outer wall 243, which is labeled as 243a, 243b, 243c, 243d to indicate four sections of the wall 243. The tray 101 also has a bottom 241, a dam structure 205, and lateral barrier 203. The outer wall 243 and the bottom 241 hold the water within the tray 101. FIGS. 12A, 12C, and 12D show the lateral barrier 203. The lateral barrier 203 is shown in dashed lines in FIG. 12A to indicate that the lids 1204, 1206 are above the lateral barrier 203 in the top view. FIGS. 12A and 12B show the dam structure 205. FIG. 12B shows that the water level may be dictated by the height of the dam structure 205. The height of the dam structure 205 is not required to be uniform, in which case the lowest height of the dam may dictate the water height. The term "water" in this context is being used to refer to the water that contains plant nutrient. In other words, the term "water" in this context is being used to refer to the aqueous hydroponic nutrient that is re-circulated through the hydroponic system 100.

The water may be provided to the tray 101 by the pipe 1215. The pipe 1215 may be the supply tube 115 (see FIG. 1) if this is a top-level tray. The pipe 1215 may be a drainpipe 117 (see FIG. 1) if this is a lower level tray 101. The tray 101 may be used as the top tray in a hydroponic system 100, in which case the water may be pumped through the pipe 1215 by pump 113 (see FIG. 1). The tray 101 may be used on a level other than the top level, in which case the pipe 1215 may be connected to a tray at the next level above in order to receive water that is drained from a tray 101 above (see drainpipe 117, FIG. 1). The water leaves the tray 101 by the drain opening 207. The drain opening 207 may be connected to a pipe 117 (see FIG. 1) in order to provide water to a tray below, or to a water reservoir, such as tank 111 (see FIG. 1). The water in the water reservoir may be returned to a top-level tray by a pump 113 in the water re-circulation system. The water re-circulation system includes the pump 113 and various plumbing (e.g., drainpipes 117, hoses, etc.), in one embodiment.

The lateral barrier 203 extends across a majority of the tray 101 to divide the tray 101 into a first half 1220a and a second half 1220b, in an embodiment. In one embodiment, the lateral barrier 203 extends from outer wall 243a to an opening 1224 adjacent to outer wall 243c. The tray 101 is configured to route (or convey) aqueous hydroponic nutrient that enters the first end 1222 of the tray 101 along the bottom surface 241 to a second end of the tray 101 and back to the drain opening 207. In one embodiment, the lateral barrier 203 is configured to route (or convey) water (e.g., aqueous hydroponic nutrient) that enters the first half 1220a at a first end 1222 of the tray 101 in a first direction through the first half 1220a, route the water from the first half 1220a to the second half 1220b at a second end of the tray 101, and route the water through the second half 1220b in a second direction that is opposite the first direction to the drain opening 207. The water flows from the second half 1220b over the dam structure 205 to the drain opening 207. The drain opening 207 is configured to drain the water from the second half 1220b of the tray 101. The lateral barrier 203 can also have other shapes and provide more than two channels. For example, the lateral barrier 203 could be formed of several sections to direct the flow from the input to the far end in a first channel toward the far end 1224, redirect the flow back to the input end 1222 in a second channel, redirect the flow back again toward the far end 1224 in a third channel, before finally directing it back to the dam 205 in a fourth channel.

The outer wall 243 has one or more ridges 1228a, 1228b 1228c, 1228d to support the lids. Specifically, outer wall 243a has ridge 1228a, outer wall 243b has ridge 1228b, outer wall 243c has ridge 1228c, and outer wall 243d has ridge 1228d. The ridges may be any shape that is capable of supporting a lid. In one embodiment, the ridges 1228 are provided by "shelf segments" (see FIG. 6A, 215).

The lateral barrier 203 may also provide support for a lid. Each of the lids 1204, 1206 is planar (e.g., flat) in shape, in one embodiment. The plane of each of the lids 1204, 1206 is parallel to the bottom surface 241 of the tray 101, in one embodiment. The plane of each of the lids 1204, 1206 is parallel to the water that flows in the tray 101, in one embodiment. A service lid 108 is also depicted.

With reference to FIG. 12B, the first lid 1204 has a first gap d1 between a top surface of the first lid 1204 and the bottom surface 241 of the tray 101. The second lid 1206 has a second gap d2 between a top surface of the second lid 1206 and the bottom surface 241 of the tray 101. The first gap d2 is larger than the first gap d1. Similarly, the first lid 1204 has a third gap d3 between a top surface of the first lid 1204 and the water level in the tray 101. The second lid 1206 has a fourth gap d4 between a top surface of the second lid 1206 and the water level in the tray 101. The fourth gap d4 is larger than the third gap d3. Given the planar shape of the lids 1204, 1206, the foregoing statements about the gaps between the top surfaces of the respective lids 1204, 1206 and either the bottom surface 241 of the tray 101 or the water level also applies to the openings 1209 in the respective lids 1204, 1206.

Thus, each lid configured to fit within the tray 101 to allow the plants to have a different vertical distances between the lid (or the openings 145 in the lids) and the water in the tray 101. In one embodiment, the first lid 1214 is configured to house plants in which roots of the plants are constantly bathed by the water (e.g., aqueous hydroponic nutrient) in the tray 101. In one embodiment, the second lid 1206 is configured to house plants that can be grown to a harvest stage without the roots of the plants touching the water (e.g., aqueous hydroponic nutrient) in the tray 101. For example, an opening in the second lid 1206 could house a plant growing receptacle (e.g., net cup) that allows a carrot to be grown to maturity (e.g., a harvest stage) without the carrot touching the water in the tray 101.

Figure 13A:
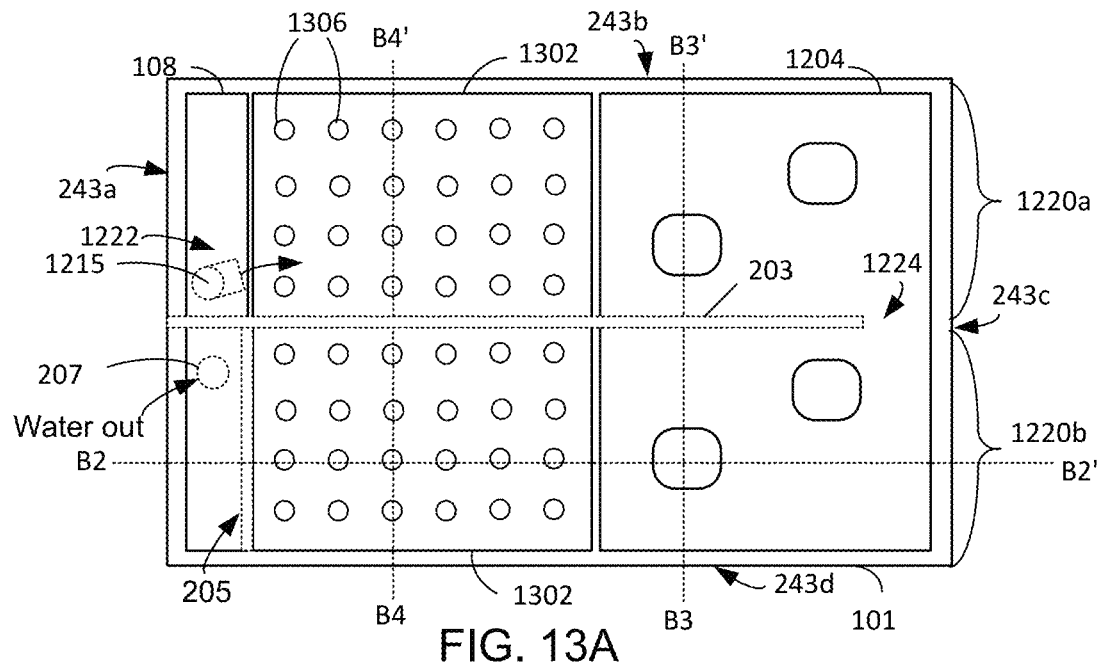
FIGS. 13A-13D depict two different types of removable growing structures that may be used to grow plants that have different requirements with respect to interaction with the water on the bottom of the tray, one of which may be used to grow microgreens.
Figure 13B:
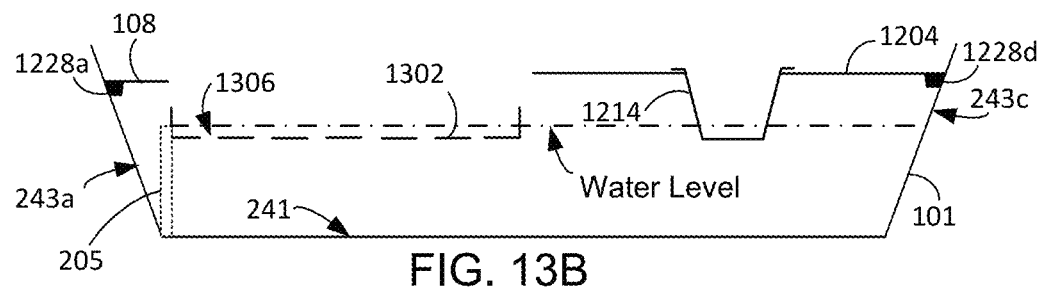
Figure 13C:
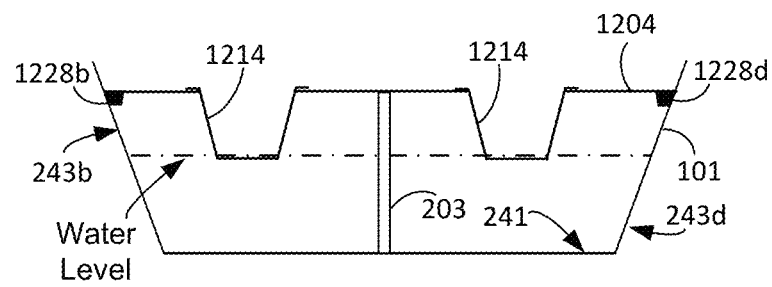
Figure 13D:
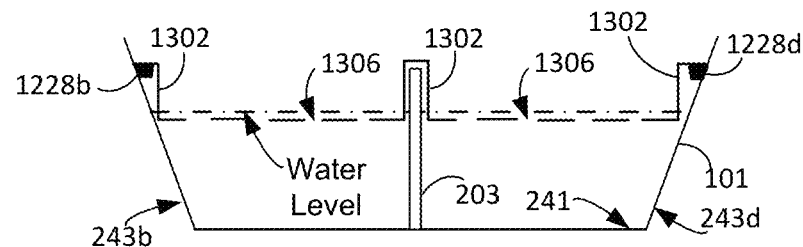

FIGS. 13A-13D depict two different types of removable growing structures that may be used to grow plants that have different requirements with respect to interaction with the water on the bottom of the tray 101. One of the removable growing structures includes lid 1204, which has been discussed in connection with FIGS. 12A-12C. Another removable growing structure includes an inner tray 1302. This second removable growing structure may be used to grow micro-greens or the like, for example. FIG. 13A is a top view of one embodiment of hydroponic apparatus, which may be used in one level of a hydroponic system 100. FIG. 13B depicts a cross-sectional view along line B2-B2' in FIG. 13A. FIG. 13C depicts a cross-sectional view along line B3-B3' in FIG. 13A. FIG. 13D depicts a cross-sectional view along line B4-B4' in FIG. 13A.

FIGS. 13A-13D show the outer wall 243, bottom 241, the lateral barrier 203, the dam structure 205, the drain opening 207, and the pipe 1215. These elements will not be discussed in detail, as they have already been discussed in connection with FIGS. 12A-12D. Note that the tray 101 may be used at any level of the system 100. The water may be provided to the tray 101 by the pipe 1215. The pipe 1215 may be the supply tube 115 (see FIG. 1) if this is a top-level tray. The pipe 1215 may be a drainpipe 117 (see FIG. 1) if this is a lower level tray 101. The tray 101 may be used as the top tray in a hydroponic system 100, in which case the water may be pumped through the pipe 1215 by pump 113 (see FIG. 1). The tray 101 may be used on a level other than the top level, in which case the pipe 1215 may be connected to a tray at the next level above in order to receive water that is drained from a tray 101 above (see drainpipe 117, FIG. 1). The water leaves the tray 101 by the drain opening 207. The drain opening 207 may be connected to a pipe 117 (see FIG. 1) in order to provide water to a tray below, or to a water reservoir, such as tank 111 (see FIG. 1).

With reference to FIGS. 13B and 13D, a top surface of the inner tray 1302 is below the water level, which allows the water to enter the inner tray 1302 by way of openings 1306. With reference to FIG. 13D, the inner tray 1302 has a portion that fits over the lateral barrier 203. Outer portions of the inner tray 1302 may be supported by ridges 1228b, 1228d. In one embodiment, the inner tray 1302 is configured to house microgreens. One or more hydroponic mats (not depicted in FIGS. 13A-13D) may be placed within the inner tray 1302. A hydroponic mat is one example of a soil-less growing medium. In some embodiments, an additional tray (referred to below as outer box 1304) is used to house the inner tray 1302 for initial growth of the microgreens. The outer box may be filled with tap water. After the microgreens have established roots, the outer box is no longer used. Thus, the configuration depicted in FIGS. 13A-13D is used to grow microgreens that have already established roots, in one embodiment. The configuration allows the roots of the microgreens to interact with the water that re-circulates in the hydroponic system 100.

Figure 13E:
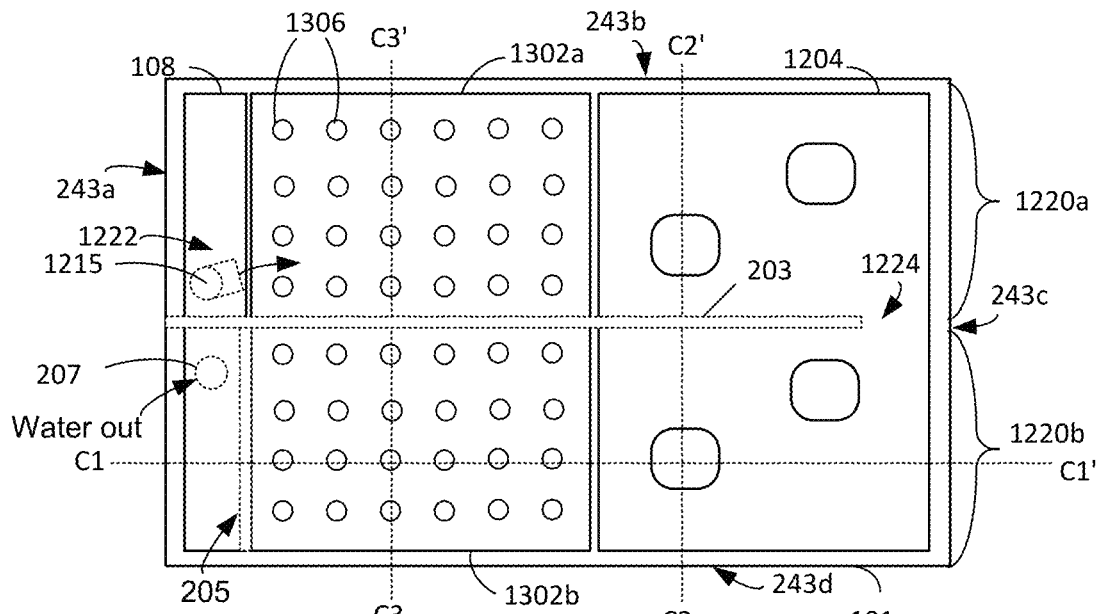
FIGS. 13E-13H depict an embodiment of removable growing structures that is an alternative way to allow growing microgreens.
Figure 13F:
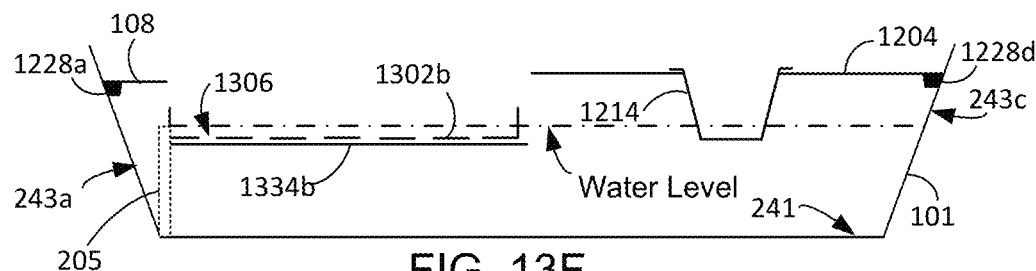
Figure 13G:
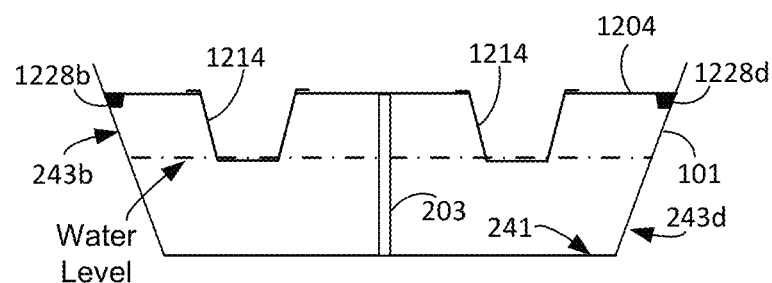
Figure 13H:
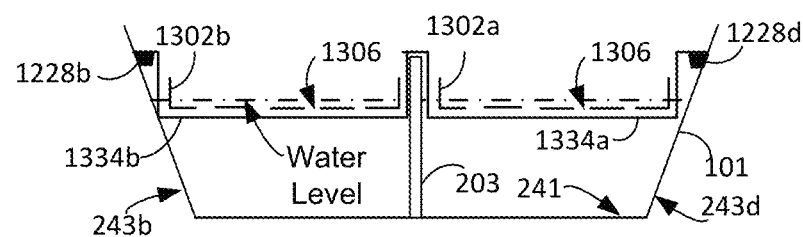

FIGS. 13E-13H depict an embodiment that is an alternative way to allow growing microgreens. FIG. 13E is a top view of one embodiment of hydroponic apparatus, which may be used in one level of a hydroponic system 100. FIG. 13F depicts a cross-sectional view along line C1-C1' in FIG. 13E. FIG. 13G depicts a cross-sectional view along line C2-C2' in FIG. 13E. FIG. 13H depicts a cross-sectional view along line C3-C3' in FIG. 13E.

FIGS. 13E-13H depict two different types of removable growing structures that may be used to grow plants that have different requirements with respect to interaction with the water on the bottom of the tray 101. One of the removable growing structures includes lid 1204, which has been discussed in connection with FIGS. 12A-12C. Another removable growing structure includes an inner tray 1302 (two of which are depicted in FIG. 13E, 1302a, 1302b) and an outer tray 1334. This second removable growing structure may be used to grow micro-greens or the like, for example.

FIGS. 13E-13H show the outer wall 243, bottom 241, the lateral barrier 203, the dam structure 205, the drain opening 207, and the pipe 116. These elements will not be discussed in detail, as they have already been discussed in connection with FIGS. 12A-12D.

With reference to FIGS. 13F and 13H, a top surface of each of outer trays 1334a, 1334b are below the water level, which allows the water to enter the outer trays 1334. The inner trays 1302a, 1302b may also be below the water level. The openings 1306 in the inner trays 1302 allow the water to enter the inner trays 1302. In one embodiment, the inner trays 1302 are configured to house microgreens. A hydroponic mat (not depicted in FIGS. 13E-13H) may be placed within each inner tray 1302. A hydroponic mat is one example of a soil-less growing medium.

Numerous variants of the embodiments depicted in FIGS. 12A-12D, FIGS. 13A-13D, and FIGS. 13E-13H are possible. In one embodiment, the tray 101 is configured to fit three different types of removable growing structures. For example, first lid 1204, second lid 1206, and the structure having inner tray 1302 could all fit into the tray 101 at the same time. The tray 101 may contain two or more of the same type of growing structures. Note that with respect to the tray depicted in FIG. 4A, first lid 1204 is one example of lids 109. Any of the lids 109 may be removed and replaced with a growing structure such as second lid 1206, or inner tray 1302.

As noted, the various growing structures are removable to allow the user to select numerous configurations. For example, the first lid 1204 in FIGS. 12A-12D can be removed and replaced with the structure having inner tray 1302. As another example, the first lid 1204 in FIGS. 13A-13D can be removed and replaced second lid 1206. The hydroponic system 100 may have multiple trays 101, such that at one point in time a certain tray 101 might contain only one type of lid (e.g., lid 1204), but at another point in time can contain a only a different type of lid (e.g., lid 1206).

Figure 14A:
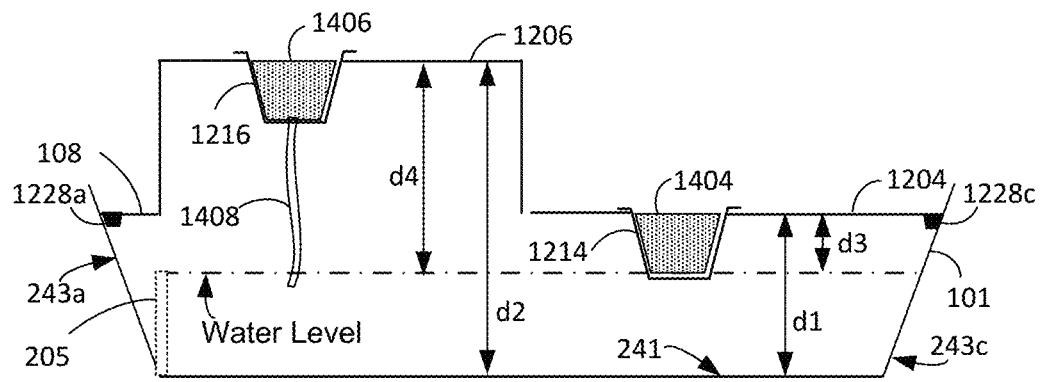
FIGS. 14A and 14B depict further details of one embodiment having two different types of removable growing structures, one of which includes a wick.
Figure 14B:
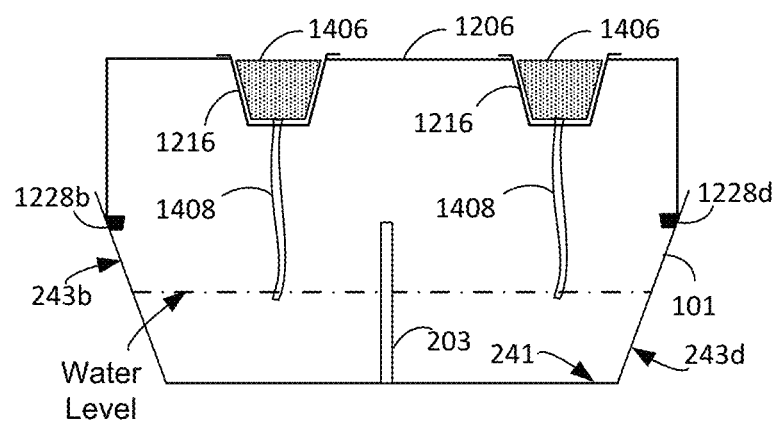

FIGS. 14A and 14B depict further details of one embodiment of a hydroponic apparatus, having two different types of removable growing structures that may be used to grow plants that have different requirements with respect to interaction with the water on the bottom of the tray 101. FIG. 14A is consistent with FIG. 12B, and FIG. 14B is consistent with FIG. 12D; however, each depict some additional elements. FIGS. 14A and 14B depict hydroponic growing medium 1406 in net cup 1216. A wick 1408 is depicted hanging from net cup 1216 in lid 1206 down to the water. The wick 1408 draws water from the tray 101 up to the hydroponic growing medium 1406 in net cup 1216. FIG. 14A depicts hydroponic growing medium 1404 in net cup 1214.

Figure 15A:
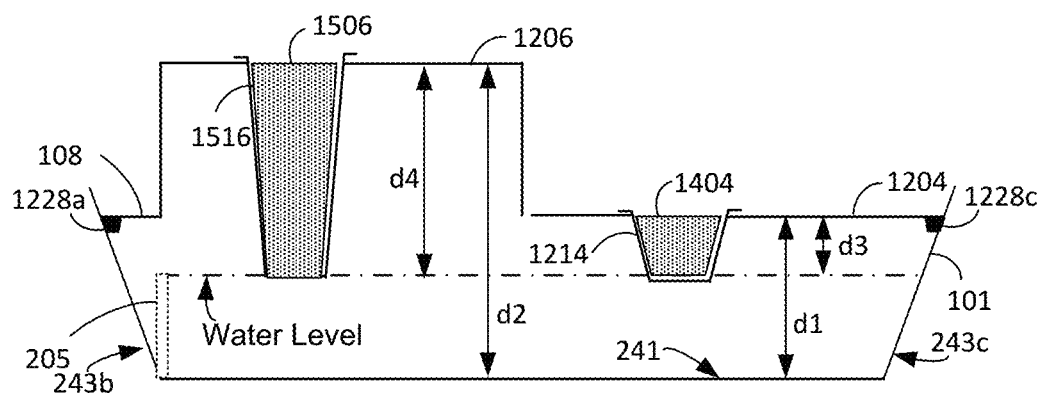
FIGS. 15A and 15B depict further details of one embodiment having two different types of removable growing structures that allow for different vertical lengths of hydroponic growing medium.
Figure 15B:
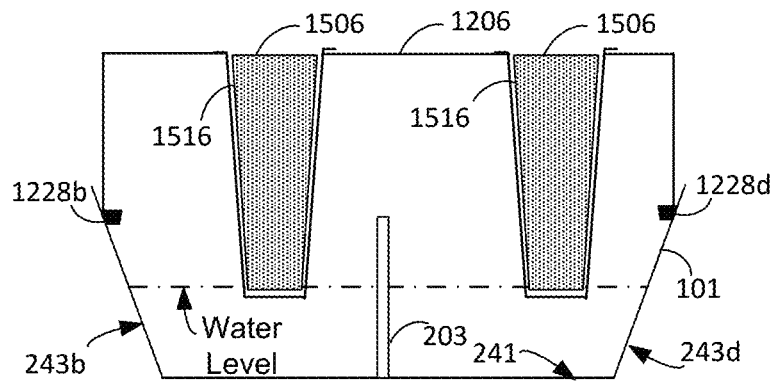

FIGS. 15A and 15B depict further details of one embodiment of of a hydroponic apparatus having two different types of removable growing structures that may be used to grow plants that have different requirements with respect to interaction with the water on the bottom of the tray 101. FIG. 15A is consistent with FIG. 12B and FIG. 15B is consistent with FIG. 12D, but each depict some additional elements. FIGS. 15A and 15B depict hydroponic growing medium 1506 in net cup 1516. A net cup 1516 in lid 1206 extends down to the water to allow the hydroponic growing medium 1506 to contact the water.

Figure 16A:
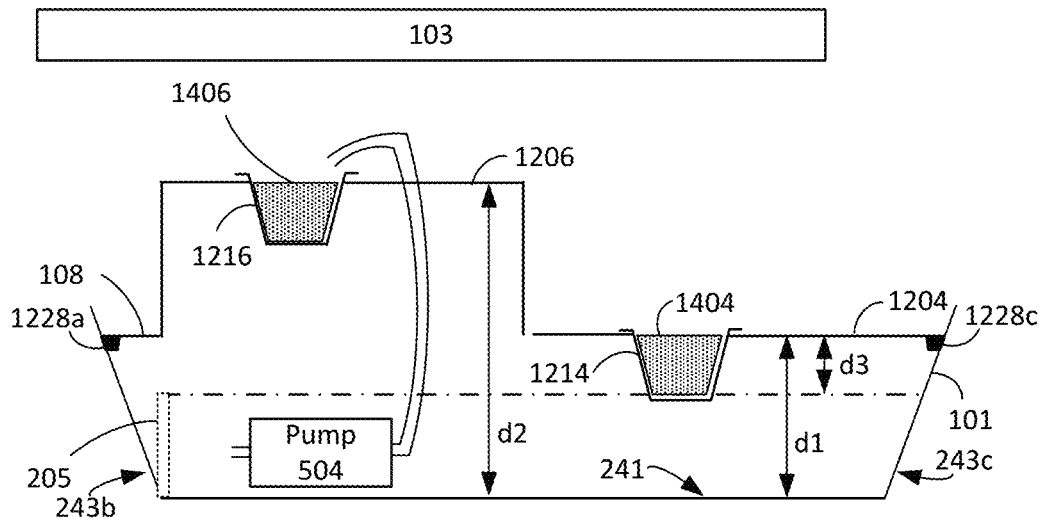
FIGS. 16A and 16B depict further details of one embodiment having two different types of removable growing structures that may be used to grow plants, one of which includes a pump.
Figure 16B:
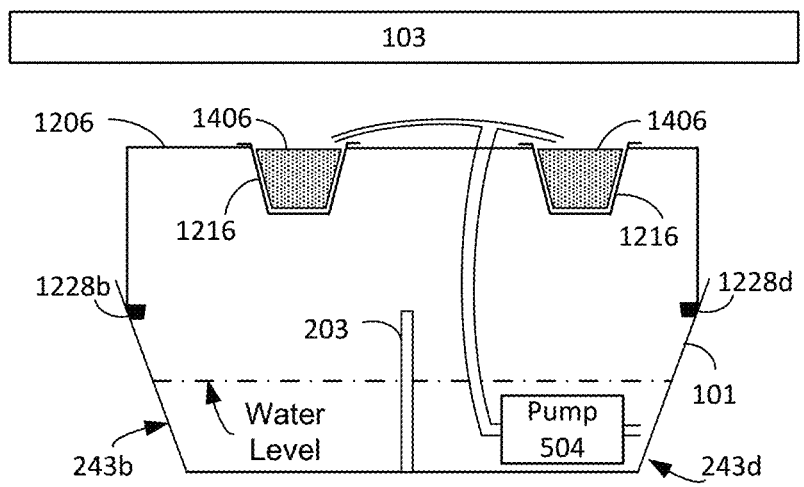

FIGS. 16A and 16B depict further details of one embodiment of a hydroponic apparatus having two different types of removable growing structures that may be used to grow plants that have different requirements with respect to interaction with the water on the bottom of the tray 101. FIG. 16A is consistent with FIG. 12B and FIG. 16B is consistent with FIG. 12D, but each depict some additional elements. FIGS. 16A and 16B depict hydroponic growing medium 1406 in net cup 1216. A pump 504 is used to pump some of the water from the tray 101 up to the hydroponic growing medium 1406 in the net cups 1216 that are in lid 1206. In this manner the crops in the net cups 1216 may be top-watered. For example, a root vegetable may be top-watered. One or more pumps 504 may be used. For example, the same pump 504 could be used to supply the water to one or more net cups 1216. In one embodiment, the pump 504 is a peristaltic pump. In one embodiment, the pump 504 is a submersible. Hence, the pump 504 may be placed within the tray 101.

In one embodiment, the pump 504 is powered by the light source 103 (e.g., light emitting diodes (LEDs)). The pump 504 contains one or more photovoltaic cells in order to convert light from the light source 103 (e.g., LEDs) to an electrical current. In this manner, the pump 504 may be powered by the light source 103 (e.g., LEDs). The light source 103 (e.g., LEDs) is also used to provide the light for the plants to grow. In one embodiment, the LEDs include one or more white LEDs, one or more red LEDs, and one or more blue LEDs.

Figure 17A:
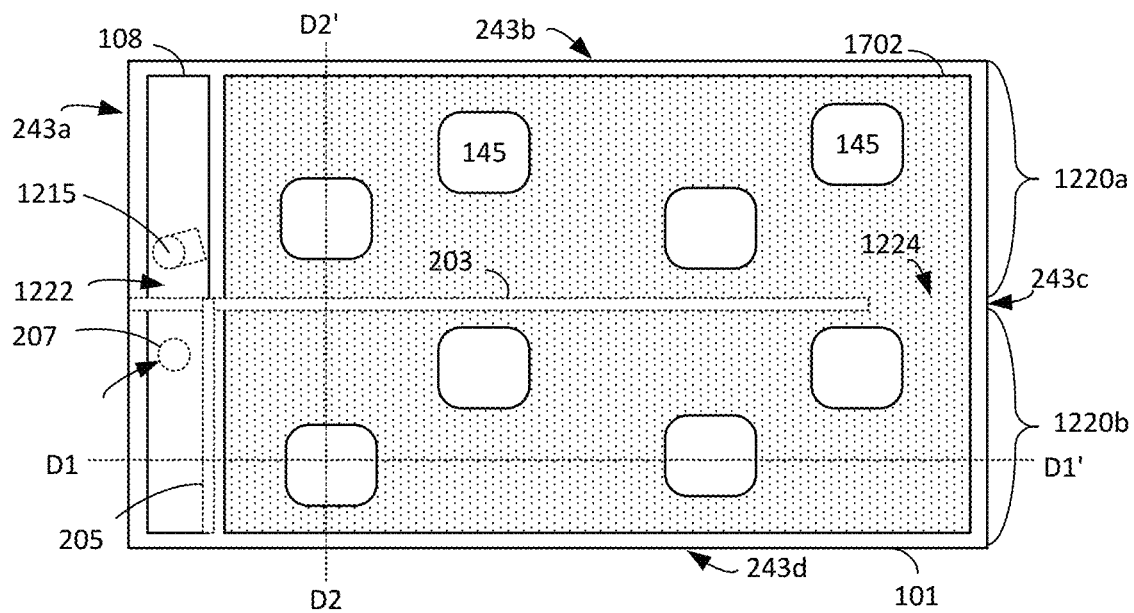
FIGS. 17A-17C depict two different types of removable growing structures that may be used to grow plants that allow for different vertical lengths of hydroponic growing medium.

FIG. 17A is a top view of one embodiment of a hydroponic apparatus, which may be used in one level of a hydroponic system 100. Note that the tray 101 may be used at any level of the system 100. The water may be provided to the tray 101 by the pipe 1215. The pipe 1215 may be the supply tube 115 (see FIG. 1) if this is a top-level tray. The pipe 1215 may be a drainpipe 117 (see FIG. 1) if this is a lower level tray 101. The tray 101 may be used as the top tray in a hydroponic system 100, in which case the water may be pumped through the pipe 1215 by pump 113 (see FIG. 1). The tray 101 may be used on a level other than the top level, in which case the pipe 1215 may be connected to a tray at the next level above in order to receive water that is drained from a tray 101 above (see drainpipe 117, FIG. 1). The water leaves the tray 101 by the drain opening 207. The drain opening 207 may be connected to a pipe 117 (see FIG. 1) in order to provide water to a tray below, or to a water reservoir, such as tank 111 (see FIG. 1).

Figure 17B:
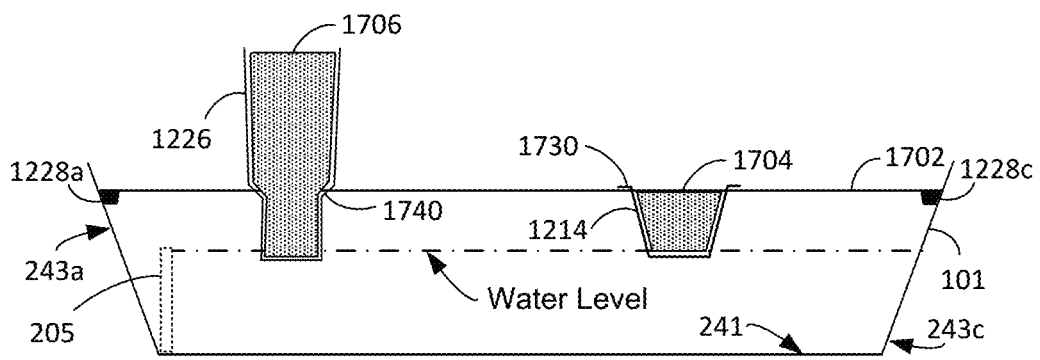
Figure 17C:
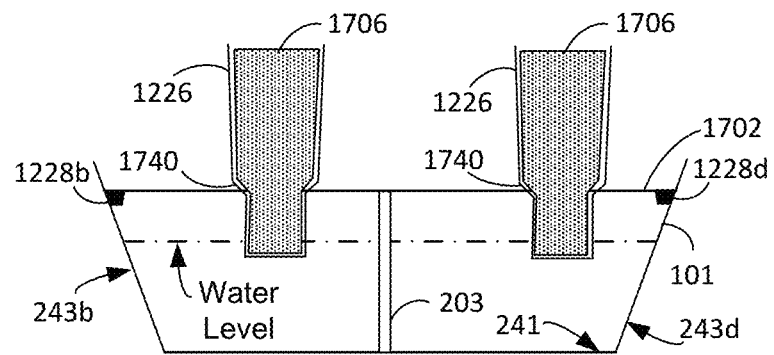

FIG. 17B depicts a cross-sectional view along line D 1-D1' in FIG. 17A. FIG. 17C depicts a cross-sectional view along line D2-D2' in FIG. 17A. FIGS. 17A-17C depict two different types of removable growing structures that may be used to grow plants that have different requirements with respect to interaction with water on the bottom of the tray 101. For example, one of the removable growing structures may be used to grow plants in which the roots are bathed in the water that flows along the bottom of the tray 101. Another of the removable growing structures may be used to grow rooted vegetables. The rooted vegetables may be grown to maturity without the roots coming into contact with the water that flows along the bottom of the tray 101.

In this example, there is a lid 1702. In general, there may be one or more lids in the tray 101. The lid 1702 has several net cup openings 145, each of which may be used to hold a net cup (net cups not depicted in FIG. 17A). The net cups may be used to contain a hydroponic growing medium. In one embodiment, the hydroponic growing medium is a soil-less growing medium. FIG. 17B shows net cup 1214 containing hydroponic growing medium 1704. FIG. 17B shows net cup 1226 containing hydroponic growing medium 1706. FIG. 17C shows two net cups 1226 containing hydroponic growing medium 1706.

The outer wall 243, bottom 241, lateral barrier 203, pipe 1215, drain opening 207, and dam structure 205 will not be described in detail, as those elements have already been described with respect to FIGS. 12A-12D. As with that example, the water may be provided to the tray 101 by the pipe 1215. The water leaves the tray 101 by the drain opening 207.

Since there is a single lid 1702, the gap between the top surface of the lid 1702 and the bottom of the tray 101 is the same in the regions that contain net cups 1214 and 1216. There could be two or more lids, with net cup 1214 in one lid and net cup 1216 in another lid. In this case, the gap between the top surface of each lid and the bottom of the tray 101 is the same in the regions that contain net cups 1214 and 1216.

With reference to FIG. 17B, net cup 1214 has a first ridge 1730 configured to secure the net cup into the opening in lid 1702. Net cup 1226 has a second ridge (or lip) 1740 configured to secure the net cup 1226 into the opening in lid 1702. The bottom of each net cup 1214, 1226 is at the same level with respect to the water level (or with the bottom of tray 101). However, net cup 1226 extends upwards much further than net cup 1214. This upward extension allows net cup 1226 to contain a much larger vertical length of hydroponic growing medium than net cup 1214. This allows net cup 1226 to be used to grow root vegetables to maturity without the root vegetables contacting the water in the tray 101. Moreover, the root vegetables may be grown in the same lid as plants whose roots are bathed in the water in the tray 101. Thus, in one embodiment, the lid 1702 is configured to house plants in which roots of the plants are constantly bathed by the water (e.g., aqueous hydroponic nutrient) in the tray 101, as well as plants that can be grown to a harvest stage without the roots of the plants touching the water (e.g., aqueous hydroponic nutrient) in the tray 101.

Figure 18A:
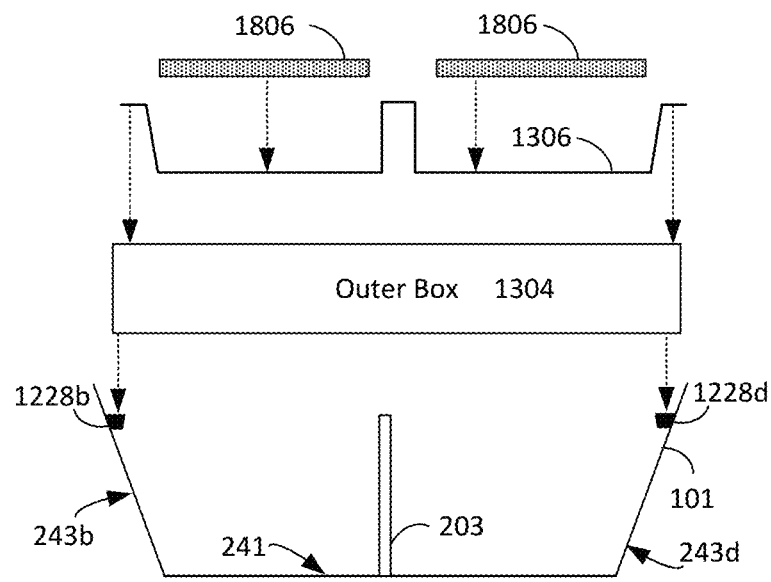
Figure 18B:
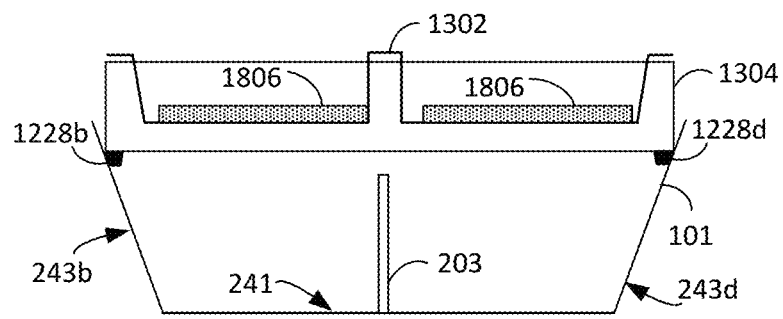
FIG. 18B shows that the components of FIG. 18A in an assembly.

FIG. 18A is an exploded diagram of one embodiment of hydroponic apparatus that includes a removable growing structure that may be used to grow micro-greens or the like. The diagram depicts further details of one embodiment of the inner tray 1302 and an outer box 1304. Two hydroponic growing mats 1816 are also depicted. FIG. 18B shows the elements in FIG. 18A in place in the tray 101. FIG. 18A and FIG. 18B show cross sectional views that are consistent with line A2-A2' in FIG. 12A. FIG. 18B shows that the outer box 1304 is supported by ridges 1228b and 1228d. The inner tray 1302 fits within the outer box 1304. Hydroponic mats 1816 are placed within the inner tray 1302. Water may be added to the outer box 1304 to allow microgreens or the like to grow roots. In one embodiment, tap water is added to outer box 1304. Note that the water that is re-circulated through the hydroponic system 100 is not re-circulated through the outer box 1304, in one embodiment. In one embodiment, the configuration of FIG. 18B is used when the microgreens are just starting to grow, and have not yet grown roots. After the microgreens have grown roots, the configuration of FIG. 18C may be used, in one embodiment.

Figure 18C:
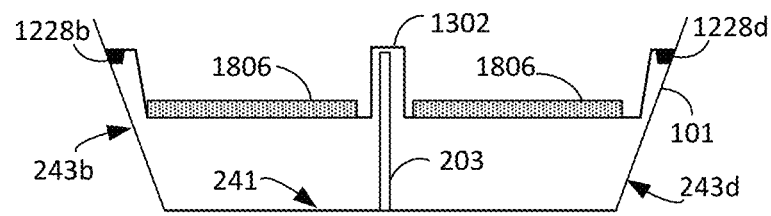
FIG. 18C shows a configuration one embodiment of a removable growing structure in which an inner tray is fitted within the tray.

FIG. 18C shows a configuration with the inner tray 1302 fitted within the tray 101. The inner tray 1302 is supported by ridges 1228b, 1228d. The inner tray 1302 fits over top of the lateral barrier 203, in one embodiment. Optionally, the lateral barrier 203 could be used to support the inner tray 1302. Hydroponic mats 1816 may be placed within the inner tray 1302. Water that is re-circulated through the hydroponic system 100 reaches the hydroponic mats 1816. There may be holes in the bottom of the inner tray 1302 to assist in allowing the water to reach the hydroponic mats 1816. In one embodiment, the configuration of FIG. 18C is used after the microgreens have grown roots. The roots of the microgreens are thus allowed to contact the water that re-circulates through the hydroponic system 100.

Figure 18D:
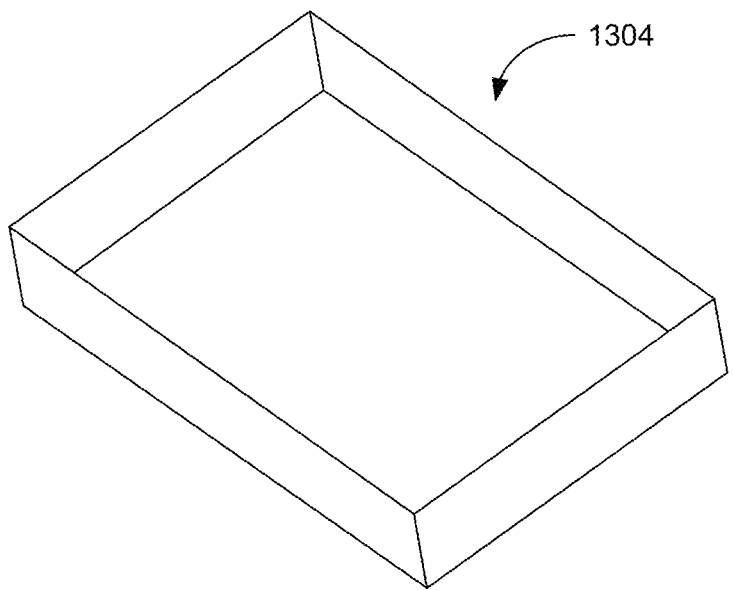
FIG. 18D shows one embodiment of the outer box of FIGS. 18A and 18B from another perspective.
Figure 18E:
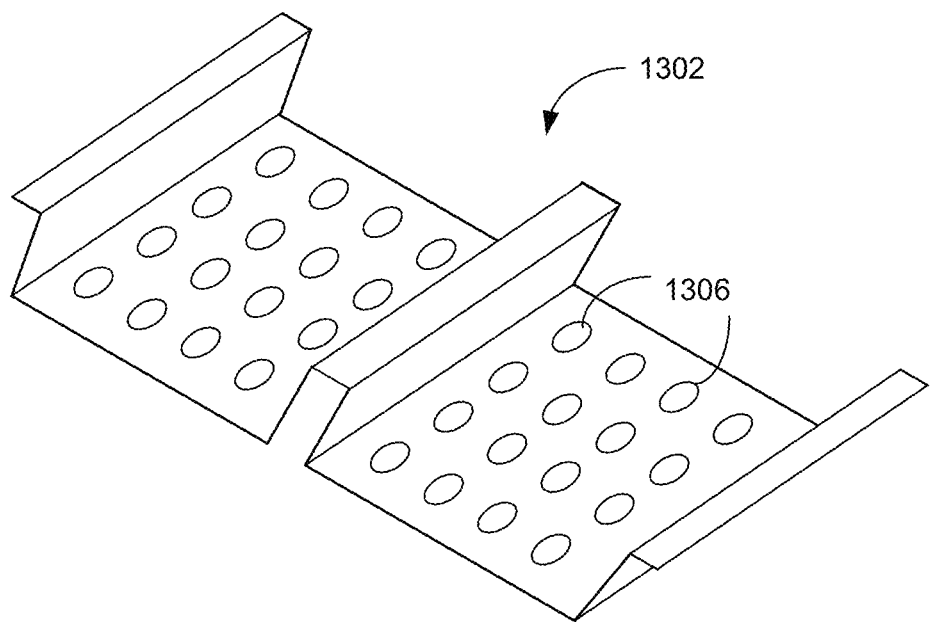
FIG. 18E shows one embodiment of the inner tray of FIGS. 18A-18C from another perspective.

FIG. 18D shows one embodiment of the outer box 1304 from another perspective. FIG. 18E depicts one embodiment of the inner tray 1302 from another perspective. FIG. 18E shows openings 1306 in the bottom of the inner tray 1302. The openings 1306 may allow water that is re-circulated in the hydroponic system 100 to reach hydroponic mats in the inner tray 1302 (the hydroponic mats are not depicted in FIG. 18E).

Figure 18F:
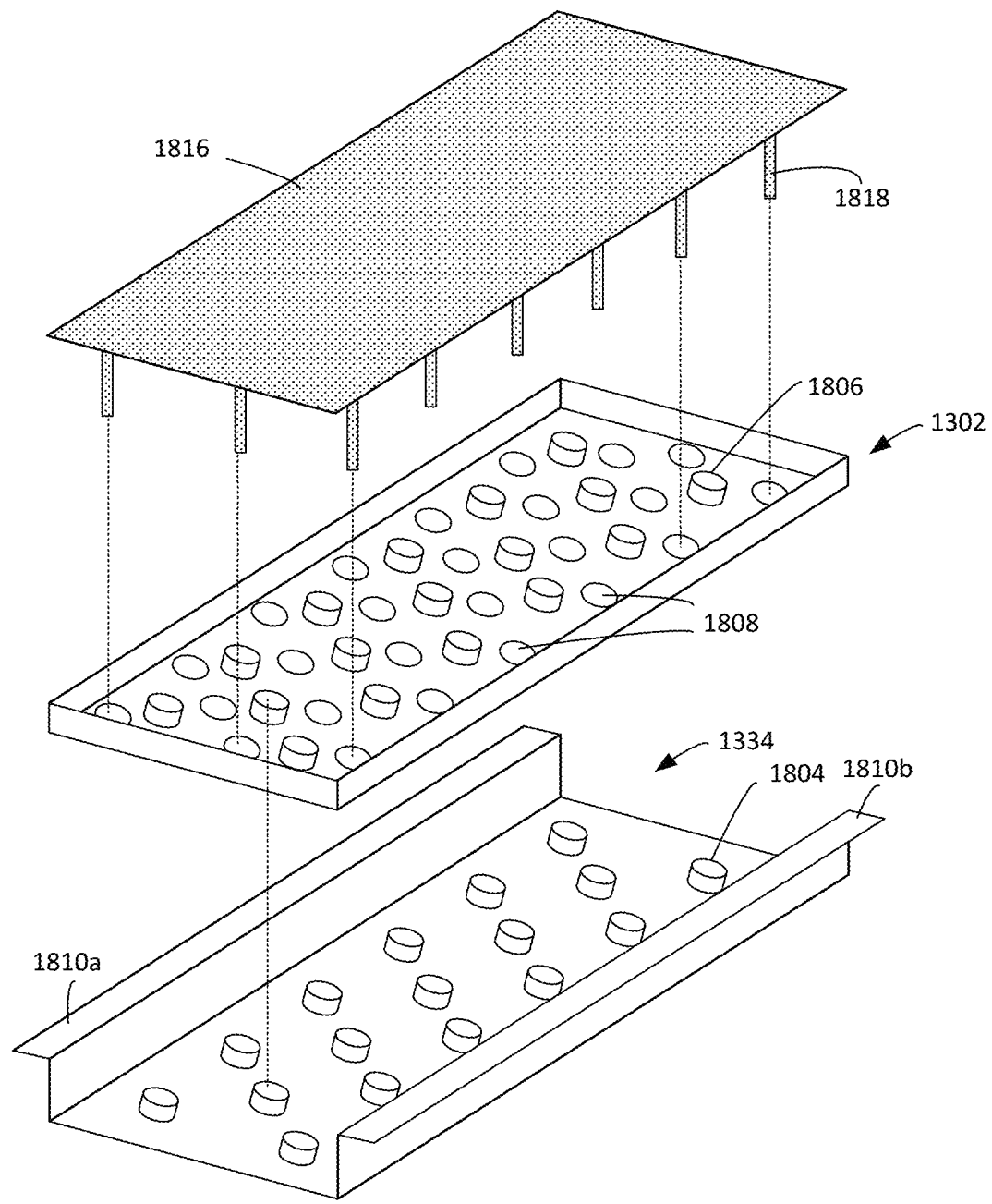

FIG. 18F is an exploded diagram of one embodiment of a removable growing structure that may be used to grow micro-greens or the like. The diagram depicts further details of one embodiment of the inner tray 1302 and the outer tray 1334 of FIGS. 13E-13H. A hydroponic growing mat 1816 is also depicted.

The outer tray 1334 has a first projection 1810a and second projection 1810b. One of the projections 1810 may rest on one of the ridges 1218a or 1218c. The other projection may rest on the lateral barrier 203. Thus, the outer tray 1334 may be supported within tray 101, as well as removed from tray 101. The outer tray 1334 has a number of first raised elements 1804. The inner tray 1302 has a corresponding number of second raised elements 1806, which are hollow to allow the inner tray to mesh with the outer tray 1334. The inner tray 1302 has a number of holes 1808 that allow water in the outer tray to enter the inner tray 1302.

The hydroponic growing mat 1816 may rest on the second raised elements 1806 of the inner tray 1302. The hydroponic growing mat 1816 has a number of wicks 1818 that are configured to wick water from the inner tray 1302.

Figure 19:
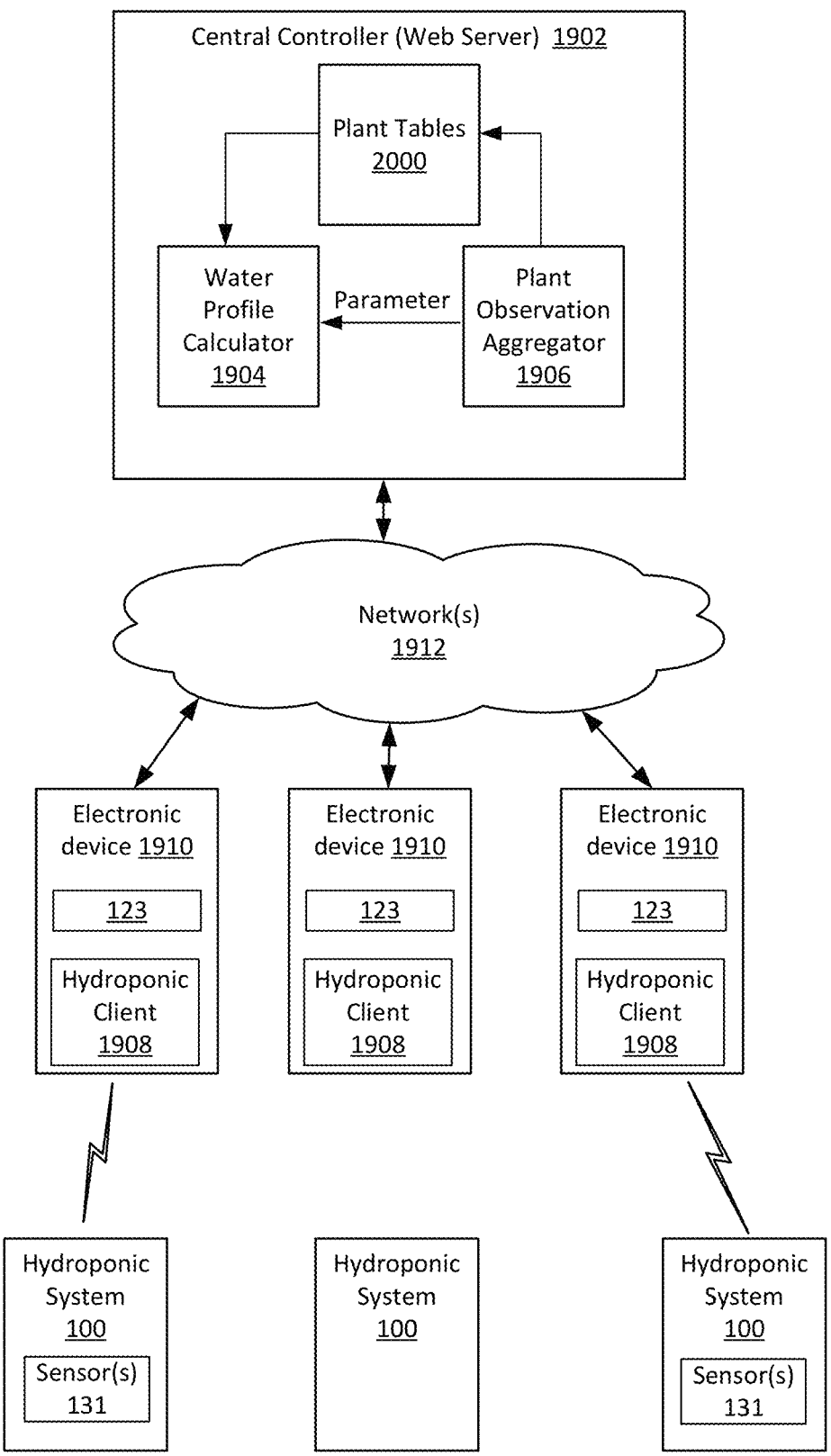
FIG. 19 is a diagram of an environment in which embodiments may be practiced.

FIG. 19 is a diagram of an environment in which embodiments may be practiced. FIG. 19 depicts several hydroponic systems 100, several electronic devices 1910, and a central controller 1902. The central controller 1902 may also be referred to herein as a "backend". The hydroponic systems 100 may be implemented by any of the hydroponic systems 100 disclosed herein, but are not limited thereto. In some embodiments, a hydroponic system 100 contains one or more sensors 131 to collect information about the water in the hydroponic system 100. Examples of the one or more sensors 131 include a pH sensor, a water level sensor, and an EC sensor. The hydroponic systems 100 may be configured to report the information collected by the sensors to an electronic device 1910. In one embodiment, wireless communication is used. For example, a hydroponic system 100 and an electronic device 1910 may each have Bluetooth capability. The one or more sensors 131 are not required, as a user could make measurements manually.

The electronic devices 1910 comprise a hydroponic client 1908, which may be software that is executed on the electronic device 1910. The electronic devices 1910 have a display/interface 123 that may be used to display information to a user, as well as allow the user to input information. The electronic devices 1910 could be a device such as, but not limited to, a smart phone, a laptop computer, a notepad computer, desktop computer, or a personal digital assistant. In one embodiment, the hydroponic clients 1908 are configured to collect information about the plants in the hydroponic systems 100 and report that information to the central controller 1902. In one embodiment, the hydroponic client 1908 receives information such as what types of plants are being grown in a hydroponic system 100, as well as the stages of plant growth. Examples of stages of plant growth include, but are not limited to, germination, mid growth, flower, fruit, and harvest. A user may provide this information by way of an interface provided in a display screen 123 of the electronic device 1910. In one embodiment, the hydroponic client 1908 receives plant observations by way of the interface. An example of a plant observation is how long it took a plant to reach a certain growth stage. Another example plant observation is leaf condition (e.g., leaf color, leave drop). The hydroponic client 1908 is configured to provide the information it collects to the central controller 1902. For example, each electronic device 1910 and the central controller 1902 may communicate by means of one or more communication networks 1912 such as the Internet. The one or more networks 1912 allow a particular computing device to connect to and communicate with another computing device. The one or more communication networks 1912 may include one or more wireless networks and/or one or more wireline networks. The one or more networks 1912 may include a secure network such as an enterprise private network, an unsecure network such as a wireless open network, a local area network (LAN), a wide area network (WAN), and/or the Internet. Each network of the one or more networks 1912 may include hubs, bridges, routers, switches, and wired transmission media such as a wired network or direct-wired connection.

The central controller 1902 stores plant tables 2000, which contain information such as nutrient needs of plants, target pH, target amount of light, etc. In one embodiment, there is a separate table for each of several plant growth stages. The water profile calculator 1904 is configured to calculate a water profile for a hydroponic system 100 based on the information received from an electronic device 1910, as well as information in the plant tables 2000. The central controller 1902 provides the water profile to the electronic device 1910, such that the hydroponic client 1908 can either control the hydroponic system 100 to achieve the water profile, or provide instructions to a user as to what nutrients and/or pH adjustments to make to achieve the water profile. Note that an electronic device 1910 can also have a water profile calculator 1904, wherein the electronic device 1910 could calculate the water profile without the assistance of the central controller 1902.

The central controller 1902 has a plant observation aggregator 1906 that is configured to aggregate the plant the observations from the electronic devices 1910. The central controller 1902 is configured to modify the information in the plant tables 2000, in an embodiment. For example, the plant observation aggregator 1906 could modify the nutrient needs of a certain type of plant, based on the collected observations. The plant observation aggregator 1906 is further configured to determine a value for a parameter that is used by the water profile calculator 1904. For example, based on the plant observations, the plant observation aggregator 1906 may determine that the time that it takes a certain type of plant to reach a certain growth stage should be adjusted from 60 days to 58 days. This may cause the water profile calculator 1904 to access a different plant table 2000, in some cases.

A net impact is that this change in parameter value may result in a different water profile from the water profile calculator 1904 for a given set of data. For example, the data may include the amount of time that has passed since a given type of plant (e.g., tomato plant) was started in a hydroponic system 100. The plant may have different nutrient requirements after it reaches this growth stage. Thus, the change from 60 days 58 days to reach the growth stage means that the water profile will change at 58 days instead of at 60 days. Therefore, by aggregating plant observations from many users the accuracy of the water profile can be improved.

The central controller 1902 may be implemented with a computer system having a processor and non-transitory memory. The water profile calculator 1904 and plant observation aggregator 1906 may be implemented by software that is stored in the non-transitory memory and executed on the processor. In one embodiment, the central controller 1902 is referred to as a web server.

FIG. 20 is table 2000 that defines example conditions and nutrient needs of various types of plants that might be grown in a hydroponic system 100. The table 2000 is for one particular growth stage. There may be a similar table for other growth stages. For example, table 2000 could be for the harvest stage. There may be similar tables for germination, mid-growth, flower, and fruit stages. The table 2000 has a row for each of numerous types of plants (which may also be referred to as "crops"). The rank multiplier is a factor that indicates how much weight is given to the plant in that row during a calculation of a water profile for a hydroponic system 100 that contains multiple types of crops, and will be discussed in more detail below. The pH is a target water pH for the plant in that row, for this stage of plant growth. This example is simplified in that different plants may have a different target pH. The EC (electrical conductivity) is a maximum water EC for the plant in that row, for this stage of plant growth. This example is simplified in that different plants may have a different target EC. Note that the pH and the EC refer to the water that re-circulates in the hydroponic system 100.

The columns labeled "A", "B", and "C" are for different plant nutrient mixtures. Each nutrient mixture provides a different mix of plant nutrients. In one embodiment, one of the plant nutrient mixtures contains at least one plant nutrient not found in the other two plant nutrient mixtures. For example, one of the plant nutrient mixtures may contain magnesium, whereas the other two do not. In one embodiment, two of the plant nutrient mixtures contain the same plant nutrients, but the concentrations of at least some of the plant nutrients are different. For example, one of the mixtures may provide a much larger amount of potassium than the other. In one embodiment, the plant nutrient mixtures are hydroponic nutrient solutions. A hydroponic nutrient solution is a concentrated aqueous solution that contains plant nutrients.

In one embodiment, two of the plant nutrient mixtures provide Fe, N, Ca, and K. However, the concentration (in ppm) of at least some of these plant nutrients is different. For example, the concentration of N and Ca might be higher in nutrient mixture A than in nutrient mixture C; however, the concentration of K might be higher in nutrient mixture C. It is not required for all of the plant nutrients to have different concentrations. For example, the concentration of Fe might be the same in nutrient mixture A and nutrient mixture C.

In one embodiment, one the plant nutrient mixtures provides Mg, S, B, Cu, Zn, Mn, Mo, Na, K, and P. For example, nutrient mixture B might contain these plant nutrients, whereas plant nutrient mixture A and plant nutrient mixture C might not contain any of these. However, plant nutrient mixture A and/or plant nutrient mixture C could contain one or more of Mg, S, B, Cu, Zn, Mn, Mo, Na, K, and P.

There could be more than three different plant nutrient mixtures. In one embodiment, only two different plant nutrient mixtures are used. There are a multitude of ways that plant nutrient mixtures may be formulated such that each plant nutrient mixture provides a different mix of plant nutrients.

The values in the rows in the plant nutrient mixture columns may be referred to herein as "Nutrient Ratios." The Nutrient Ratio is expressed as A/B/C, in one embodiment. For example, the nutrient ratio in table 2000 for lettuce is 1/1/0. In this example, the nomenclature "Nutrient Ratio A" will be used to refer to the value of "A", "Nutrient Ratio B" will be used to refer to the value of "B", and "Nutrient Ratio C" will be used to refer to the value of "C." For example, for lettuce, Nutrient Ratio A has a value of 1, Nutrient Ratio B has a value of 1, and Nutrient Ratio C has a value of 0. As noted above, the plant nutrient mixtures in table 2000 are hydroponic nutrient solutions, in one embodiment. When the plant nutrient mixtures are hydroponic nutrient solutions, these nutrient ratios may be referred to as "ratios of hydroponic nutrient solutions."

The pH, EC, and "Nutrient Ratios" in table 2000 are one way to specify a water profile. The values in each row of table 2000 are one example of a water profile for each crop. In some embodiments, a single water profile is determined for all of the crops in a hydroponic system 100.

The column labeled "lights" indicates a target amount of light for the plant in that row. The value is a number of hours of light per day, in one embodiment. The nature of the light (e.g., intensity, color) may also be specified.

FIG. 21 is a flowchart of one embodiment of a process 2100 of providing a water profile for plants in a hydroponic system 100. The process 2100 is implemented by the central controller 1902, in one embodiment. Step 2102 includes the central controller 1902 receiving plant observations from electronic devices 1910. The plant observations are provided by a user of a hydroponic system 100, in an embodiment. In one embodiment, the plant observations include data on how long it took a type plant to reach a certain growth stage. For example, the plant observations from one user may include data of how many days it took a tomato plant to reach the fruit stage. If the user has multiple tomato plants, the user might provide data for each plant. Another example observation is leaf conditions. For example, if a user notices that a plant has leaves that brown, this may be an indication of a problem with the water profile (e.g., the plant nutrients or pH). If many user's report such problems, this may be an indication that the central controller 1902 should change the water profile it provides, at least for hydroponic systems 100 that might be impacted by the foregoing problem with leaves turning brown.

Step 2104 includes the central controller 1902 modifying a technique for determining a water profile of one of more types of plants are determined based on the collective observations. One way in which the water profile may be specified is by table 2000 (or a similar table for other plant stages). With respect to table 2000, the water profile may include some or all of pH, EC, Nutrient Ratio A, Nutrient Ratio B, Nutrient Ratio C. The water profile could be specified in another manner, such as ppm of various plant nutrients. One way to modify the technique for determining the water profile is to change one or more values in table 2000 (or a similar table for other plant stages). Another way to modify the technique for determining the water profile is to change what table 2000 is selected. For example, the central controller may determine that, based on the collective observations, tomato plants are reaching the fruit stage sooner than expected. Thus, the central controller 1902 may access a different plant table 2000 to determine the nutrient needs of tomatoes. As another example, the collective observations may be that a certain type of plant being grown in hydroponic systems 100 are exhibiting brown leaves, which may be an indication that the nutrition for that plant is not correct. Thus, the central controller 1902 may modify the nutrient needs (e.g., the values in columns labeled "A", "B" and/or "C") in table 2000 to correct the nutrient problem.

Step 2106 includes providing a water profile for plants grown in a hydroponic system 100 to at least one of the electronic devices 1910 based on the modified technique for determining the water profile for the specified type of plant. The water profile may be specified in a number of ways. In one embodiment, the water profile is specified as a first amount of Nutrient mixture A, a second amount of Nutrient mixture B, and third amount of Nutrient mixture C. In this example, the amount of one or two of the nutrient mixtures may be zero. The water profile could be specified in terms of ppm of various plant nutrients. The water profile could be specified in terms of amounts of various salts that provide the plant nutrients.

FIG. 22 is a flowchart of one embodiment of a process 2200 of providing a water profile for plants grown in a hydroponic system 100. Process 2200 is implemented by a control circuit, in one embodiment. Any combination of control circuitry 121, electronic device 1910 and/or central controller 1902 may be considered to be a control circuit for performing functionality described herein. Steps 2204-2208 of process 2200 are implemented by the central controller 1902, in one embodiment. Steps 2204-2208 of process 2200 are implemented by the hydroponic client 1908 that executed on an electronic device 1910, in one embodiment.

Step 2202 includes re-circulating an aqueous nutrient solution in one or more trays 101 in a hydroponic system 100. Step 2202 includes re-circulating the water containing plant nutrients (e.g., an aqueous nutrient solution), using a water re-circulation system, in one embodiment.

Step 2204 includes accessing a list of different plants (or crops) in the tray(s) 101. The plants have different water profiles for optimum health, in one embodiment. For example, tomatoes may have different nutrient needs than lettuce (see FIG. 20). In one embodiment, the step 2204 also includes accessing a growth stage of at least some of the plants. The nutrient needs of at least some of the plants may depend on the growth stage.

Step 2206 includes determining a single water profile for the different plants in the hydroponic system 100. In some embodiments, step 2206 includes determining a weighted average of the nutrient needs of the various plants in the hydroponic system 100. Further details of embodiments of determining a single water profile are described below.

Step 2208 includes determining an adjustment to the aqueous nutrient solution based on the single water profile. In one embodiment, the central controller 1902 provides the water profile to an electronic device 1910 (that executes the hydroponic client 1908). In one embodiment, the hydroponic client 1908 has a user interface 123 that provides instructions for a user to make water adjustments. For example, the instructions tell the user how much of Nutrient A, Nutrient B, and/or Nutrient C to add to the water that is re-circulated in the hydroponic system 100. In one embodiment, the hydroponic client 1908 automatically makes the water adjustments by causing various nutrients to be added to the water that is re-circulated in the hydroponic system 100.

Figure 23:
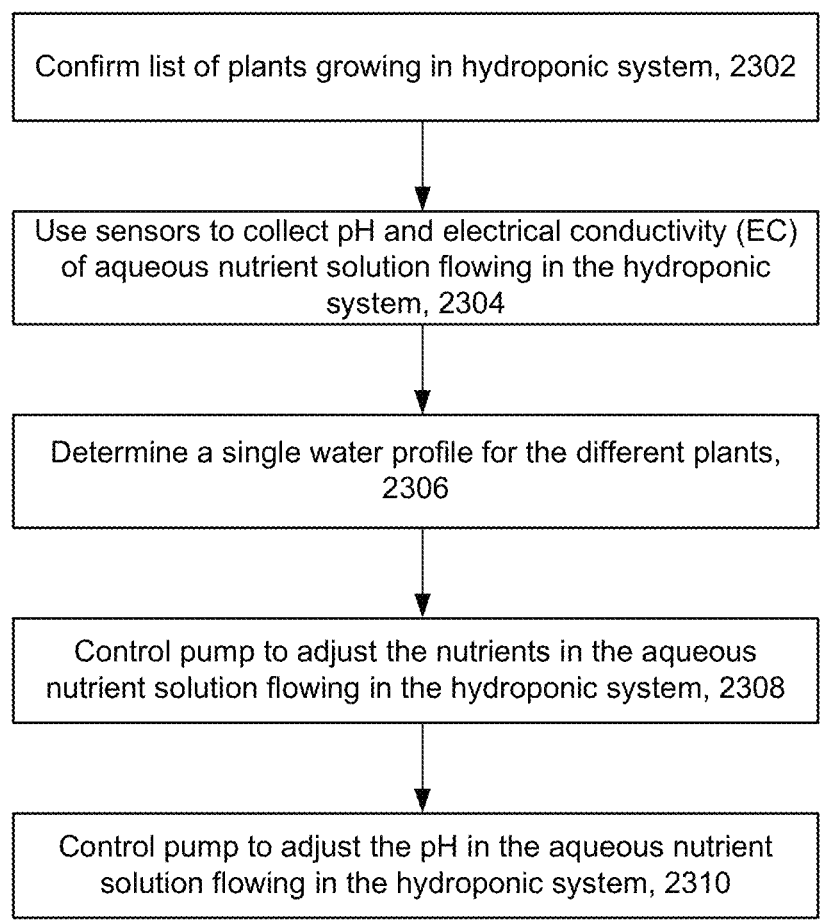
FIG. 23 is a flowchart of one embodiment of a process of automatically adjusting a water profile for plants grown in a hydroponic system.

FIG. 23 is a flowchart of one embodiment of a process 2300 of automatically adjusting a water profile for plants grown in a hydroponic system 100. The hydroponic system 100 includes a water re-circulation system that recirculates water that contains plant nutrients (e.g., an aqueous nutrient solution), in one embodiment. Process 2300 is one embodiment of process 2200. Process 2300 is implemented by the control circuit, in one embodiment.

Step 2302 includes confirming a list of different plants in the tray(s) 101. The plants have different water profiles for optimum health, in one embodiment. In one embodiment, step 2302 also includes accessing a growth stage of at least some of the plants.

Step 2304 includes using sensors 131 to collect pH and electrical conductivity (EC) of aqueous nutrient solution that is being re-circulated in the hydroponic system 100. In one embodiment, the hydroponic client 1908 sends a control instruction to control circuitry 121 in the hydroponic system 100 to collect the sensor data.

Step 2306 includes determining a single water profile for the different plants. Step 2306 is performed by the hydroponic client 1908, in one embodiment. In one embodiment, the hydroponic client 1908 sends information to the central controller 1902, which determines the water profile and sends the water profile to the hydroponic client 1908.

Step 2308 includes controlling a pump in the hydroponic system 100 to adjust the nutrients in the aqueous nutrient solution that is being re-circulated in the hydroponic system 100. For example, the hydroponic client 1908 sends a control instruction to control circuitry 121 in the hydroponic system 100. In response the control circuitry 121 controls a pump in the hydroponic system 100 to add a certain amount of Nutrient A, Nutrient B, and/or Nutrient C to the water that is re-circulated in the hydroponic system 100. In one embodiment, Nutrient A, Nutrient B, and/or Nutrient C are accessed from reservoir 133.

Step 2310 includes controlling a pump in the hydroponic system 100 to adjust the pH of the aqueous nutrient solution that is being re-circulated in the hydroponic system 100. For example, the hydroponic client 1908 sends a control instruction to control circuitry 121 in the hydroponic system 100. In response the control circuitry 121 controls a pump in the hydroponic system 100 to add a certain amount pH adjustment solution to the water that is re-circulated in the hydroponic system 100. In one embodiment, the pH adjustment solution is accessed from reservoir 133.

FIGS. 24A-24E depict screen shots of one embodiment of a user interface that may be used to assist a user in controlling the water profile in the hydroponic system 100. The user interface may be presented on a display screen 123 of an electronic device 1910. The hydroponic client 1908 controls the presentation of the user interface, and receives user input by way of the user interface, in one embodiment. FIGS. 24A-24E will be discussed in connection with FIG. 25.

Figure 25:
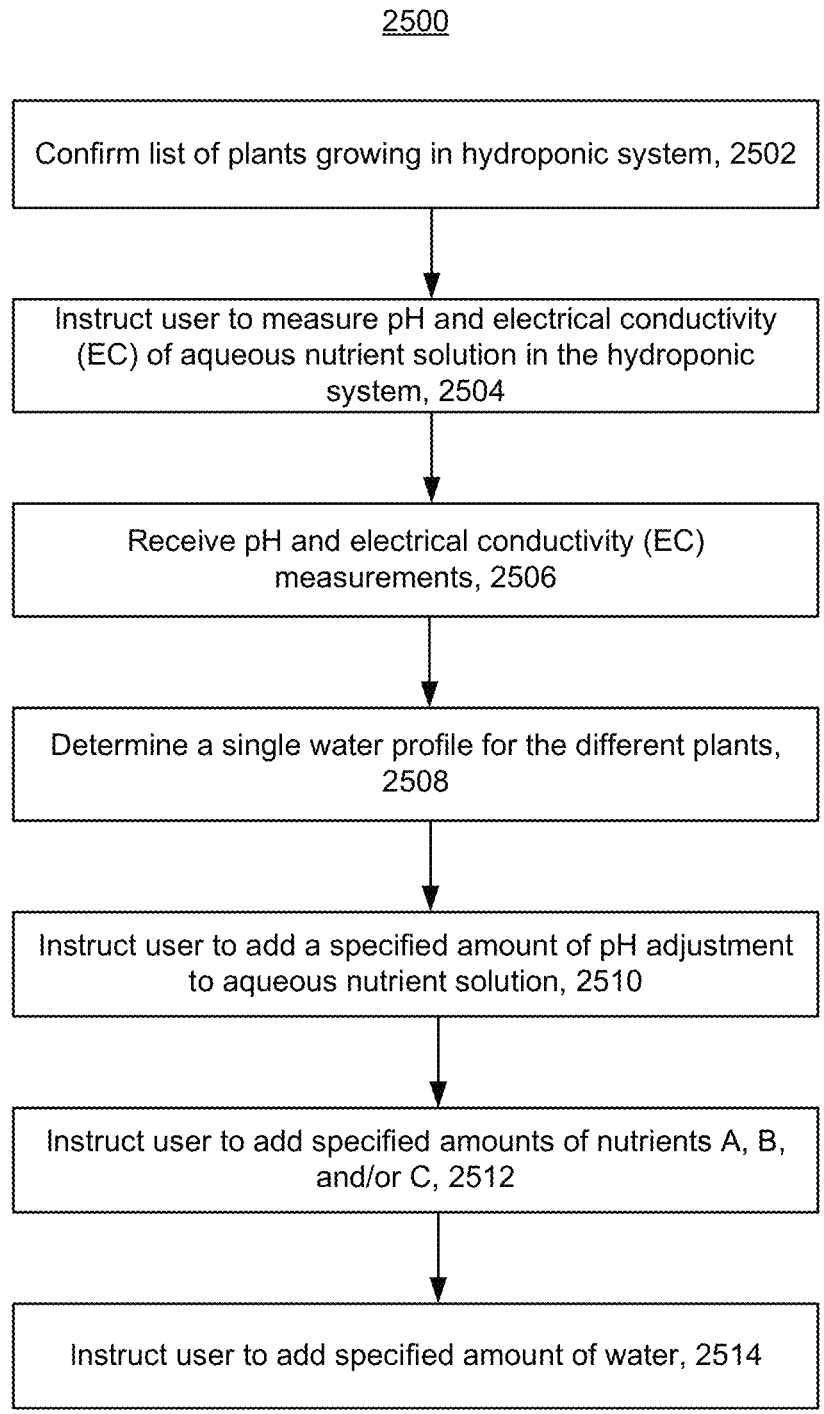
FIG. 25 is a flowchart of one embodiment of a process of adjusting a water profile for plants grown in a hydroponic system.

FIG. 25 is a flowchart of one embodiment of a process 2500 of adjusting a water profile for plants grown in a hydroponic system 100. The hydroponic system 100 includes a water re-circulation system that recirculates water that contains plant nutrients (e.g., an aqueous nutrient solution), in one embodiment. Process 2500 is one embodiment of process 2200. Process 2500 is implemented by the control circuit, in one embodiment.

Figure 24A:
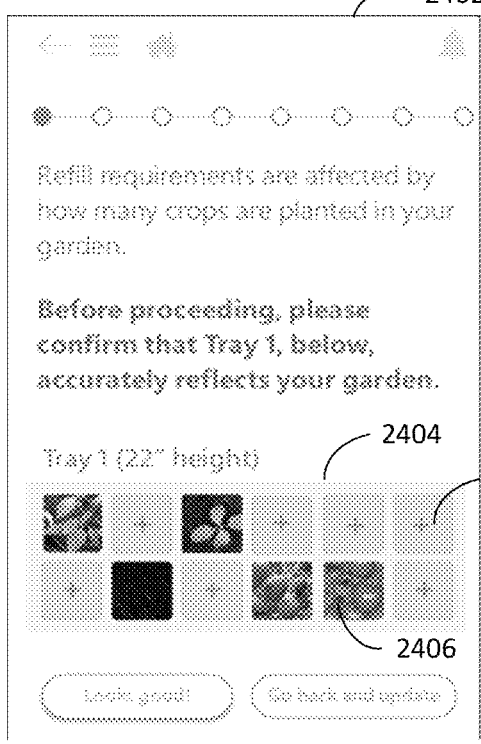
FIGS. 24A-24E depict screen shots of one embodiment of a user interface that may be used to assist a user in controlling the water profile in the hydroponic system.

Step 2502 includes confirming a list of different plants in the tray(s) 101. In one embodiment, the screenshot 2402 of FIG. 24A is presented on a display screen 123 of an electronic device 1910. The screenshot 2402 has a graphic 2404 that represents a tray 101 in the hydroponic system 100. The graphic 2404 shows various plants that are being grown in the tray 101. There are some images 2406 that represent a plant, as well as its location in the tray. The user could indicate that more plants in in the tray by clicking on an "add" icon 2408. Note that the plants have different target water profiles for optimum health, in one embodiment.

Figure 24B:
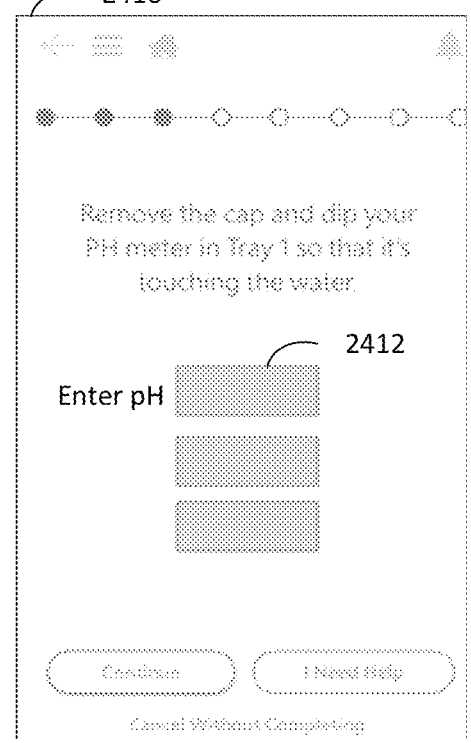
Figure 24C:
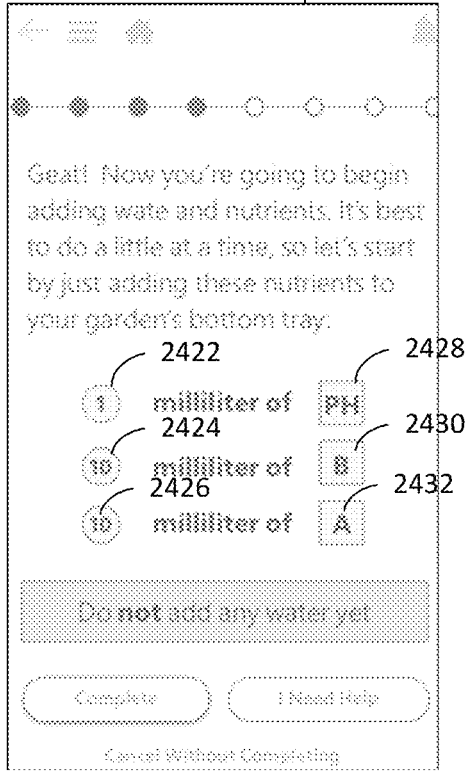

Step 2504 includes instructing the user to measure the pH and the EC of the aqueous nutrient solution that is being re-circulated in the hydroponic system 100. FIG. 24B depicts a screenshot 2410 that is displayed on a display screen 123 of the electronic device 1910 to instruct the user to measure the pH, in one embodiment. A similar screen may be used to instruct the user to measure EC. The user may thus manually measure the pH and EC with, for example, hand held meters. The user may enter the pH in field 2412.

Step 2506 includes receiving the pH and EC measurements. For example, the hydroponic client 1908 accesses the pH measurement from field 2412. The EC measurement may be obtained in a similar manner.

Step 2508 includes determining a single water profile for the different plants. Step 2508 is performed by the hydroponic client 1908, in one embodiment. In one embodiment, the hydroponic client 1908 sends information to the central controller 1902, which determines the water profile and sends the water profile to the hydroponic client 1908.

Step 2510 includes instructing the user to add specific amounts of pH adjustment to the aqueous nutrient solution that is being re-circulated in the hydroponic system 100. With reference to the screen shot 2420 of FIG. 24C, fields 2422 and 2428 indicate that 1 milliliter (ml) of pH adjustment solution should be added to the aqueous nutrient solution that is being re-circulated in the hydroponic system 100.

Step 2512 includes instructing the user to add specific amounts of Nutrient A, Nutrient B, and/or Nutrient C to the water that is re-circulated in the hydroponic system 100. With reference to the screen shot 2420 of FIG. 24C, fields 2424 and 2430 indicate that 10 milliliters (mls) of Nutrient B solution should be added to the aqueous nutrient solution that is being re-circulated in the hydroponic system 100. With reference to the screen shot 2420 of FIG. 24C, fields 2426 and 2432 indicate that 10 milliliters (mls) of Nutrient A solution should be added to the aqueous nutrient solution that is being re-circulated in the hydroponic system 100.

Figure 24D:
Figure 24E:
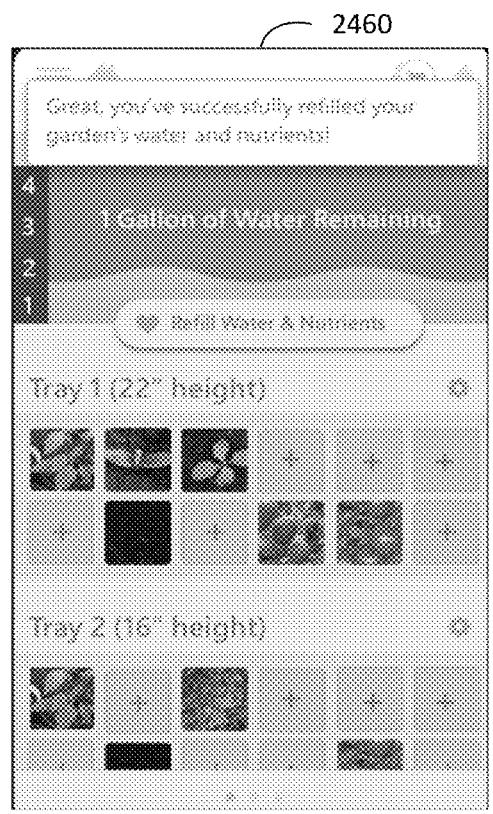

Step 2514 includes instructing the user to add a specific amount of water to the water that is re-circulated in the hydroponic system 100. This water could be tap water, bottled water, reverse osmosis (RO) water, etc. FIG. 24D shows a screen shot 2450 telling a user to add 1 gallon of water to the hydroponic system 100. In this example, the water is added to the bottom tray; however, the water could be added elsewhere. FIG. 24E shows a screenshot 2460 telling the user that the water and nutrients have been successfully refilled.

Figure 26:
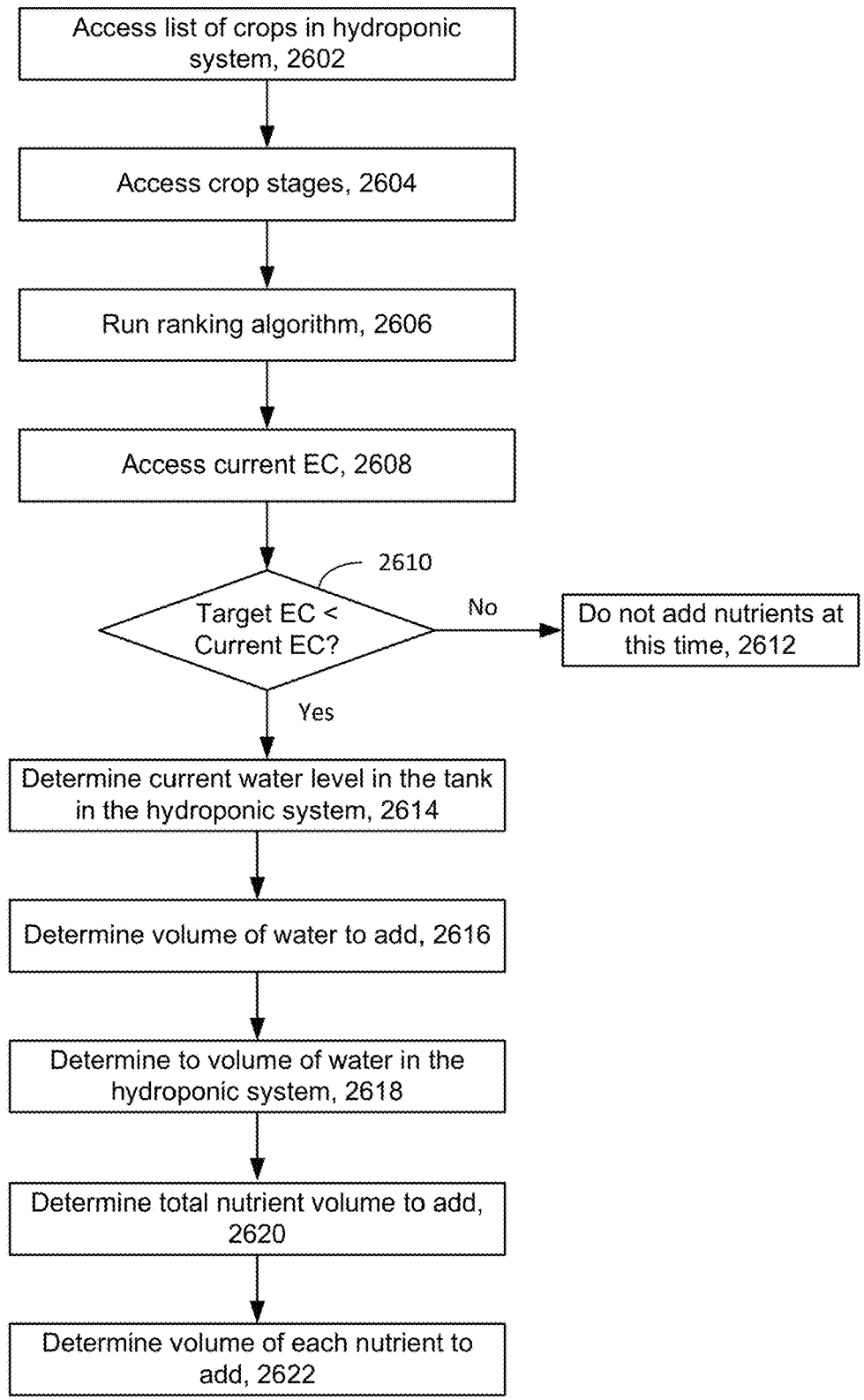
FIG. 26 is a flowchart of one embodiment of a process of determining an amount of nutrients to add to the hydroponic system.

FIG. 26 is a flowchart of one embodiment of a process 2600 of determining an amount of nutrients to add to the hydroponic system 100. The process 2600 may be used in one embodiment of any of steps 2206, 2306, and/or 2508. Process 2500 is implemented by the control circuit, in one embodiment.

Step 2602 includes a list of crops (or plants) in the hydroponic system 100. The user may enter/modify a list of crops at any time. The list of crops may be stored for future reference. In one embodiment, list is stored on the electronic device 1910. In one embodiment, the list is stored on the central controller 1902. In one embodiment, the screen 2402 in FIG. 24A is used to confirm/modify the list of crops.

Step 2604 includes accessing crop stages. The crop stages are determined based on days from germination or planting, in one embodiment. For example, the user may provide the date that a specific crop was planted in the hydroponic system 100. This information can be provided at any time. In one embodiment, this date is stored with the list of crops.

Step 2606 includes running a ranking algorithm. The ranking algorithm is used to determine what nutrients to add based on assigning different weights to different plants. The ranking algorithm determines a relative amount of each of Nutrient A, Nutrient B, and Nutrient C, in one embodiment. For example, the ranking algorithm may determine that the relative amounts of the three nutrients respectively should be: 0.5/1/0.25. Herein the value in this relationship is referred to as its "Nutrient Ratio." For example, Nutrient A may be assigned a Nutrient Ratio of 0.5, Nutrient B may be assigned a Nutrient Ratio of 1.0, and Nutrient C may be assigned a Nutrient Ratio of 0.25.

Figure 27:
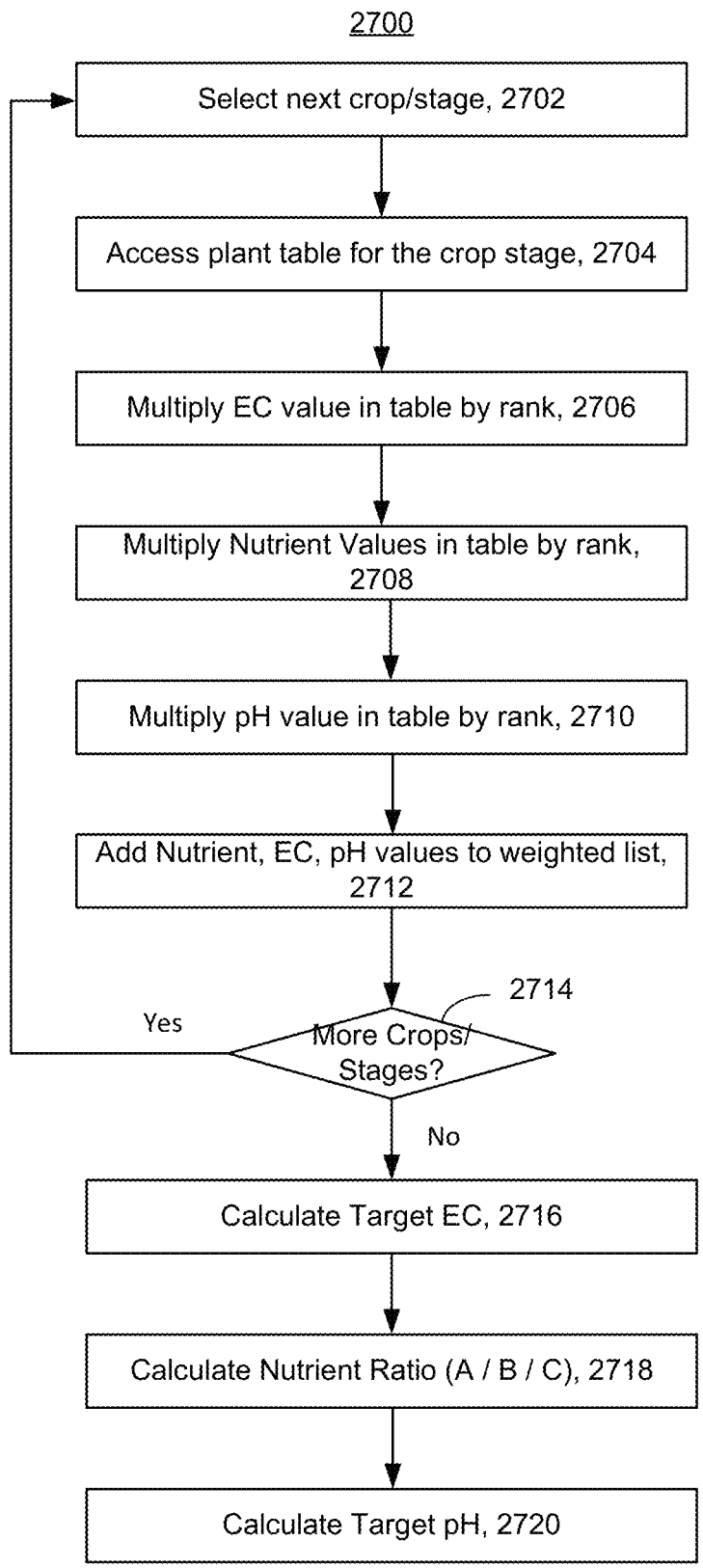
FIG. 27 is a flowchart of one embodiment of a process of a ranking algorithm.

Each crop is assigned a rank multiplier, in one embodiment. With reference to FIG. 20, each crop has a rank multiplier of 2 for the crop stage in that table 2000. However, different crops could have different rank multipliers for the same crop stage. Also, the rank multiplier for a given crop depends on the crop stage, in one embodiment. The ranking algorithm also determines a target EC, in one embodiment. One embodiment of a ranking algorithm is depicted in FIG. 27.

Step 2608 includes access the current EC of the water in the hydroponic system 100. This may be accessed automatically by the hydroponic client 1908, as in step 2304 of FIG. 23. This may be accessed based on user input, as in step 2504 of FIG. 25.

Step 2610 includes a determination of whether the target EC is less than the current EC. Note that the target EC is determined by the ranking algorithm, in one embodiment. If the target EC is less than the current EC, then the process continues at step 2614. However, if the target EC is not less than the current EC, then no nutrients are added to the hydroponic system 100 at this time (step 2612).

Step 2614 includes determining the current water level in tank 111 of the hydroponic system 100. Step 2614 may include accessing a measurement of the water level in the tank 111. In one embodiment, water level sensor 125 is used to monitor the current water level in the tank 111. In one embodiment, the user observes the water level in the tank 111 and reports it in an interface, such as the interfaces in FIGS. 24A-24E.

Step 2616 includes determining a volume of water to add to the hydroponic system 100. In one embodiment, this is based on the level in the tank 111. If the level in the tank 111 is at a sufficient level, then it is not required that any water be added. In one embodiment, a calculation is made of the difference between a "full level" in the tank 111, and the present level. The user is instructed to add enough water to reach the full level, in one embodiment.

Step 2618 includes determining the total water volume in the hydroponic system 100. In one embodiment, the volume of water in each tray 101 is known based on the physical configuration of the tray (e.g., length, width, water level due to dam height). The total water volume in the hydroponic system 100 may be determined by adding the water volume in each tray 101 and the tank 111.

Step 2620 includes determining a total volume of nutrient to add to the hydroponic system 100. In one embodiment, a weighted average equation is used to determine the total volume of nutrient to add. Equation 1 is an example weighted average equation.

$$Vol_n = \frac{\frac{EC_s * Vol_s + EC_w \cdot Vol_w}{EC_f} - Vol_s - Vol_w}{\sum ratios - \frac{EC_A + EC_B + EC_C}{EC_f}} \quad \text{Eq. 1}$$

In Equation 1, $Vol_n$ is the total volume of nutrient to add. In Equation 1, $EC_s$ is the current EC of the water in the system 100 (before adding water or nutrients), $Vol_s$ is the total water volume in the hydroponic system 100 (before adding water or nutrients), $EC_w$ is the EC of the water that is added to the system 100, $Vol_w$ is the water volume added to the system 100. In Equation 1, the summation of the ratios refers to the summation of the nutrient ratios that were determined by the ranking algorithm. $EC_A$, $EC_B$, and $EC_C$ are EC change constants. These change constants are based on the EC of the Nutrients A, B, and C. In Equation 1, $EC_F$ is the target EC, which is provided by the ranking algorithm.

Step 2622 includes determining a volume of each nutrient to add to the hydroponic system 100. In one embodiment, this is determined by multiplying the volume of nutrient to add ($Vol_n$) by the respective nutrient ratios, as indicated by Equations 2-4. The nutrient ratios are provided by the ranking algorithm of FIG. 27, in one embodiment.

Nutrient Volume $A = Vol_n *$ Nutrient Ratio $A$     Eq. 2

Nutrient Volume $B = Vol_n *$ Nutrient Ratio $B$     Eq. 3

Nutrient Volume $C = Vol_n *$ Nutrient Ratio $C$     Eq. 4

FIG. 27 is a flowchart of one embodiment of a process 2700 of a ranking algorithm. The process 2700 may be used in one embodiment of step 2606 in FIG. 26. Process 2700 is implemented by the control circuit, in one embodiment. Process 2700 in general loops through a calculation in which one crop/stage is processed at a time. A crop/stage refers to a crop in the hydroponic system 100 at a specific stage of development. If a type if crop (e.g., tomatoes) have plants at two or more stages of development in the hydroponic system 100, each stage can be processed in a separate loop. The crops and their stages may be learned in steps 2602 and 2604 of process 2600.

Step 2702 includes selecting first crop/stage in the hydroponic system 100. Based on the stage, an appropriate plant table 2000 is selected, in step 2704. For example, a fruit stage table 2000 is selected if the plant is at a fruit stage.

Step 2706 includes multiplying the EC value in the plant table 2000 by the rank multiplier for this crop. Table 2000 shows an example in which each crop has a rank multiplier. Step 2708 includes multiplying nutrient values in the plant table 2000 by the rank multiplier for this crop. The nutrient values are listed in the columns labeled "A", "B", and "C." Thus, this produces a value for each Nutrient. Step 2710 includes multiplying the pH value in the plant table 2000 by the rank multiplier for this crop. The amount of the crop in the hydroponic system 100 may also be factored into the calculations in steps 2706-2710. For example, the number of tomato plants, the number of net cups containing tomato plants, the number of lids containing tomato plants, or some other measure may be factored in as another multiplier in steps 2706-2710.

Step 2712 includes adding the nutrient, EC, and pH values from steps 2706-2710 to a weighted list. Step 2714 is a determination of whether there are more crop/stages to process. The process then returns to step 2702 to process the next crop/stage. Each time through the values for the nutrient, EC, and pH values from steps 2706-2710 are summed with the existing values. Thus, the weighted list produces a sum of the values for each crop/stage.

After all crop/stages have been processed, step 2716 is performed. Step 2716 includes calculating a target EC. In one embodiment, the target EC is the arithmetic mean of the values from step 2706. The mean may be determined from the weighted list of step 2712. The target EC may be used in step 2610 of process 2600. The target EC may also be used in step 2620 of process 2600.

Step 2718 includes calculating Nutrient Ratios (e.g., Nutrient Ratio A, Nutrient Ratio B, Nutrient Ratio C). In one embodiment, the Nutrient Ratios are the arithmetic means of the values from step 2708. The mean may be determined from the weighted list of step 2712. The Nutrient Ratios may be used in steps 2620 and 2622 of process 2600.

Step 2718 includes calculating a target pH. In one embodiment, the target pH is the arithmetic mean of the values from step 2710. The mean may be determined from the weighted list of step 2712.

Figure 28:
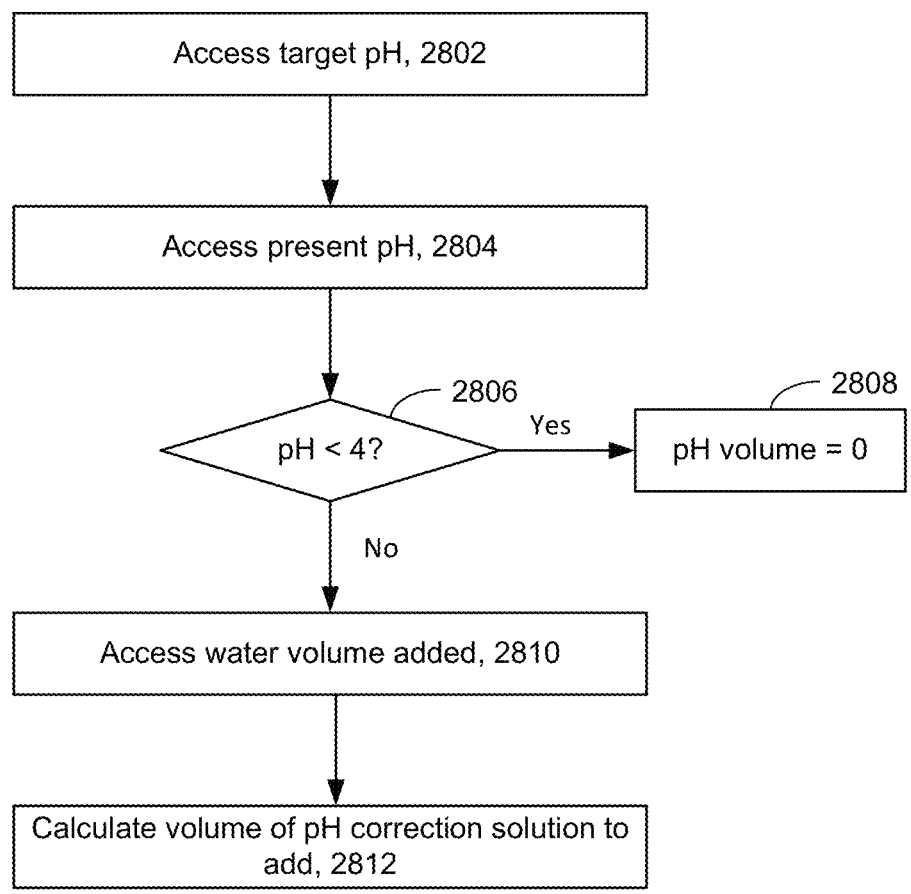
FIG. 28 is a flowchart of one embodiment of a process of pH correction for a hydroponic system.

FIG. 28 is a flowchart of one embodiment of a process 2800 of pH correction. For example, the process determines an amount of pH correction solution to add to the hydroponic system 100. Process 2800 is implemented by the control circuit, in one embodiment. Step 2802 includes accessing a target pH. In one embodiment, the target pH is taken from step 2720 of process 2700. Step 2804 includes accessing the present pH of the water in the hydroponic system 100. The present pH could have been determined in step 2304 of process 2300, or 2504 of process 2500. If the present pH is less than 4 (step 2806 =yes), then no pH correction is performed. Thus, the volume of pH correction solution is set to zero, in step 2808. If the pH is not less than 4, then the process goes on to step 2810. In step 2810, the water volume added (or to be added) to the hydroponic system 100 is accessed. The water value to add may be determined in step 2616 of process 2600.

Step 2812 is a determination of the pH correction solution to add to the water in the hydroponic system 100. In one embodiment, the volume of water that is added is divided by a factor to determine the volume of pH correction solution to add. The factor will depend on the impact of the pH correction solution.

Figure 29:
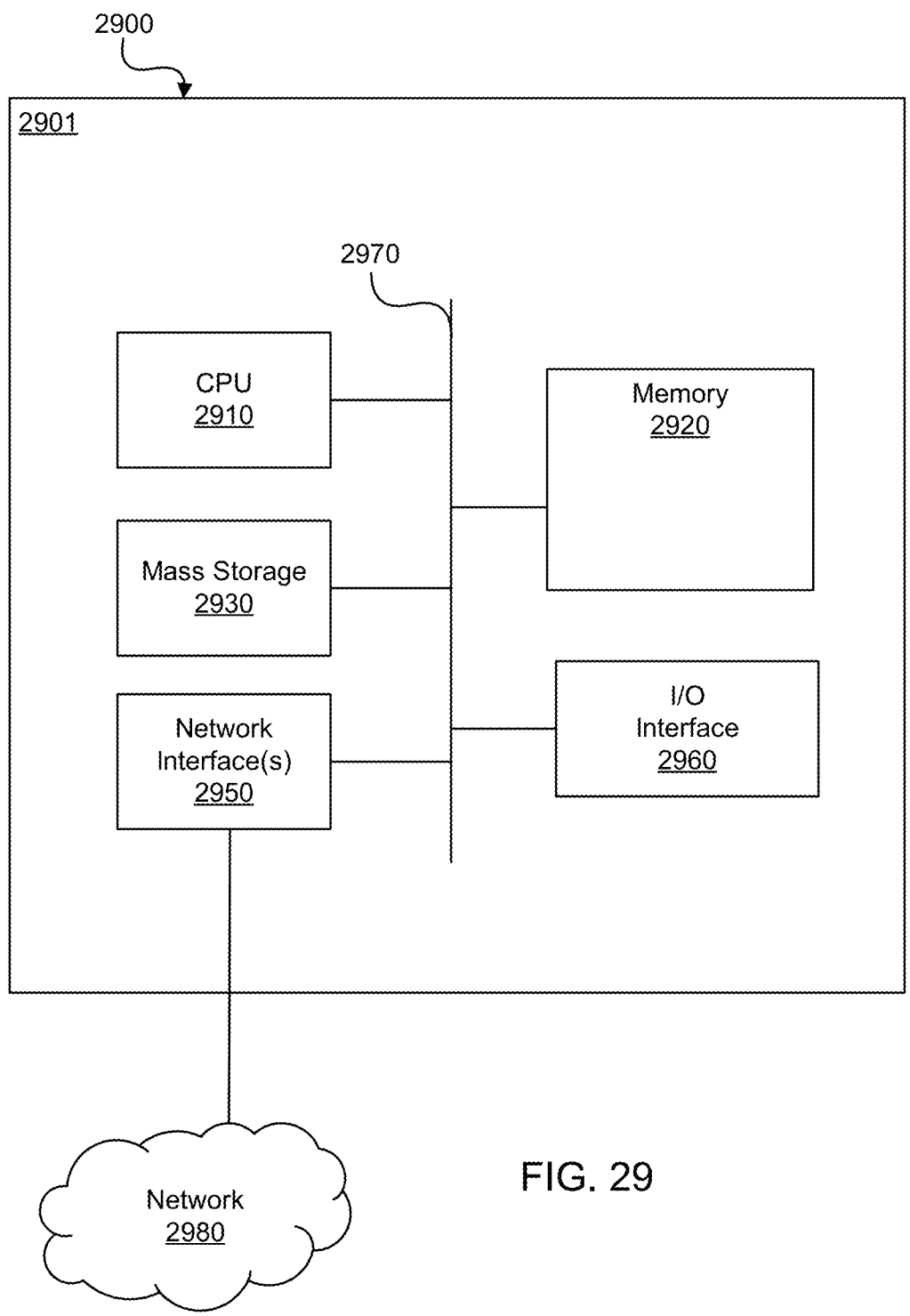
FIG. 29 is a high-level block diagram of a computing system that can be used to implement various embodiments.

FIG. 29 is a high-level block diagram of a computing system 2900 that can be used to implement various embodiments. The computing system 2900 may be used to implement electronic device 1910 or central controller 1902. The computing system 2900 is used to implement all or a part of control circuitry 121, in one embodiment. In one example, computing system 2900 is a network system 2900. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 2901 equipped with one or more input/output devices, such as network interfaces, storage interfaces, and the like. The processing unit 2901 may include a central processing unit (CPU) 2910, a memory 2920, a mass storage device 2930, and an I/O interface 2960 connected to a bus 2970. The bus may be one or more of any type of several bus architectures including a memory bus or memory controller, a peripheral bus or the like.

The CPU 2910 may comprise any type of electronic data processor. The CPU 2910 may be configured to implement any of the schemes described herein, using any one or combination of steps described in the embodiments. The memory 2920 may comprise any type of system memory such as static random access memory (SRAM), dynamic random access memory (DRAM), synchronous DRAM (SDRAM), read-only memory (ROM), a combination thereof, or the like. In an embodiment, the memory 2920 may include ROM for use at boot-up, and DRAM for program and data storage for use while executing programs. In embodiments, the memory 2920 is non-transitory.

The mass storage device 2930 may comprise any type of storage device configured to store data, programs, and other information and to make the data, programs, and other information accessible via the bus. The mass storage device 2930 may comprise, for example, one or more of a solid state drive, hard disk drive, a magnetic disk drive, an optical disk drive, or the like.

The processing unit 2901 also includes one or more network interfaces 2950, which may comprise wired links, such as an Ethernet cable or the like, and/or wireless links to access nodes or one or more networks 2980. The network interface 2950 allows the processing unit 2901 to communicate with remote units via the network 2980. For example, the network interface 2950 may provide wireless communication via one or more transmitters/transmit antennas and one or more receivers/receive antennas. In an embodiment, the processing unit 2901 is coupled to a local-area network or a wide-area network for data processing and communications with remote devices, such as other processing units, the Internet, remote storage facilities, or the like.

The components depicted in the computing system of FIG. 29 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

A first embodiment disclosed herein includes a hydroponic system comprising a tray having a drain opening in a bottom of the tray. The hydroponic system comprises a water re-circulation system configured to re-circulate water containing plant nutrients through the hydroponic system. The water re-circulation system is configured to provide the water containing the plant nutrients to the tray. The tray is configured to convey the water along the bottom the tray to the drain opening, the drain opening configured to drain the water from the tray. The hydroponic system comprises different types of removable growing structures that are configured to provide corresponding different vertical distances between a top of a hydroponic growing medium and the bottom of the tray.

In a second embodiment, in furtherance of the first embodiment, the different types of removable growing structures comprise: a first removable growing structure comprising a first lid having a first gap between a top surface of the first lid and the bottom of the tray; and a second removable growing structure comprising a second lid having a second gap between a top surface of the second lid and the bottom of the tray, wherein the second gap is larger than the first gap.

In a third embodiment, in furtherance of either of the first or second embodiments, the first lid comprises a first opening configured to house a plant in which roots of the plants are constantly bathed by the water that is conveyed along the bottom of the tray; and the second lid comprises a second opening configured to house a root vegetable in which the root vegetable grows to maturity without touching the water that is conveyed along the bottom of the tray.

In a fourth embodiment, in furtherance of any of the first to third embodiments, the hydroponic system further comprises a pump configured to pump a portion of the water that is conveyed along the bottom of the tray to top-water the root vegetable in the second lid.

In a fifth embodiment, in furtherance of any of the first to fourth embodiments, the hydroponic system further comprises a plurality of light emitting diodes (LEDs) configured to provide light to plants in the different types of removable growing structures, wherein the pump is configured to be powered by light from the LEDs.

In a sixth embodiment, in furtherance of any of the first to fifth embodiments, the hydroponic system further comprises a wick configured to draw the water that is conveyed along the bottom of the tray to top-water the root vegetable in the second lid.

In a seventh embodiment, in furtherance of any of the first to sixth embodiments, the hydroponic system further comprises a first net cup configured to hold a first length of hydroponic growing medium; a second net cup configured to hold a second length of hydroponic growing medium, the second length is longer than the first length; the first opening in the first lid is configured to receive the first net cup; and the second opening in the second lid is configured to receive the second net cup.

In an eighth embodiment, in furtherance of any of the first to seventh embodiments, the tray is a base tray, the different types of growing structures comprise an inner tray configured to fit within the base tray. The inner tray has openings to allow the water that is re-circulated in the hydroponic system to enter the inner tray.

In a ninth embodiment, in furtherance of any of the first to eighth embodiments, the inner tray is configured to house a hydroponic mat.

In a tenth embodiment, in furtherance of any of the first to ninth embodiments, the different types of removable growing structures are configured to fit within the tray at the same time.

In an eleventh embodiments, in furtherance of any of the first to tenth embodiments, the different types of removable growing structures comprise: a first net cup configured to hold a first length of hydroponic growing medium; and a second net cup configured to hold a second length of hydroponic growing medium, the second length is longer than the first length.

In a twelfth embodiments, in furtherance of any of the first to eleventh embodiments, the different types of removable growing structures comprise one or more lids configured to fit into the tray, the one or more lids comprise a first opening and a second opening that are each the same vertical distance above the water that is conveyed along the bottom of the tray; the first net cup comprises a first ridge configured to secure the first net cup into the first opening such that the first length of hydroponic growing medium contacts the water that is conveyed along the bottom of the tray; and the second net cup comprises a second ridge configured to secure the second net cup into the second opening such that the second length of hydroponic growing medium contacts the water that is conveyed along the bottom of the tray.

An embodiment includes a hydroponic apparatus comprising: a tray comprising a bottom surface and a drain opening in the bottom surface at a first end of the tray, the tray configured to route aqueous hydroponic nutrient that enters the first end of the tray along the bottom surface to a second end of the tray and back to the drain opening, the drain opening configured to drain the aqueous hydroponic nutrient from the tray, wherein the aqueous hydroponic nutrient flows along the bottom of the tray; a first lid configured to fit in the tray above the aqueous hydroponic nutrient that flows along the bottom of the tray, the first lid having a first opening configured to receive a first plant growing receptacle, the first lid configured to fit into the tray such that there is a first gap between the first opening and the aqueous hydroponic nutrient that flows along the bottom of the tray; and a second lid configured to fit in the tray above the aqueous hydroponic nutrient that flows along the bottom of the tray, the second lid having a second opening configured to receive a second plant growing receptacle, the second lid configured to fit into the tray such that there is a second gap between the second opening and the aqueous hydroponic nutrient that flows along the bottom of the tray.

An embodiment includes a hydroponic apparatus comprising: a first tray comprising a bottom surface and a drain opening in the bottom surface at a first end of the tray, the tray configured to route aqueous hydroponic nutrient that enters the first end of the first tray along the bottom surface to a second end of the first tray and back to the drain opening, the drain opening configured to drain the aqueous hydroponic nutrient from the first tray, wherein the aqueous hydroponic nutrient flows along the bottom of the first tray; a lid configured to fit in the first tray above the aqueous hydroponic nutrient, the lid having one or more openings each configured to receive a plant growing receptacle; and a second tray configured to fit in the first tray such that a lower surface of the second tray is below the aqueous hydroponic nutrient that flows along the bottom of the first tray, the lower surface of the second tray having a plurality of openings to allow the aqueous hydroponic nutrient to enter the second tray.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hydroponic system comprising:
a tray having a drain opening in a bottom surface of the tray;
a water re-circulation system configured to re-circulate water containing plant nutrients through the hydroponic system, the water re-circulation system configured to provide the water containing the plant nutrients to the tray, the tray configured to convey the water along the bottom surface of the tray to the drain opening, the drain opening configured to drain the water from the tray; and
different types of removable growing structures that are configured to provide corresponding different vertical distances between a top of a hydroponic growing medium and the bottom surface of the tray, the different types of removable growing structures comprising a first removable growing structure comprising a first lid and a second removable growing structure comprising a second lid, the first removable growing structure and the second removable growing structure configured to each fit into the tray at the same time, the first lid having a first surface that is a first distance above the bottom surface of the tray, the first surface having a first opening configured to receive a first plant growing receptacle, the second lid having a second surface that is a second distance above the bottom surface of the tray that is different from the first distance, the second surface having a second opening configured to receive a second plant growing receptacle.

2. The hydroponic system of claim 1, wherein:
the first opening is configured to house a plant in which roots of the plants are constantly bathed by the water that is conveyed along the bottom surface of the tray; and
the opening is configured to house a root vegetable in which the root vegetable grows to maturity without touching the water that is conveyed along the bottom surface of the tray.

3. The hydroponic system of claim 2, further comprising:
a pump configured to pump a portion of the water that is conveyed along the bottom surface of the tray to top-water the root vegetable in the second lid.

4. The hydroponic system of claim 3, further comprising:
a plurality of light emitting diodes (LEDs) configured to provide light to plants in the different types of removable growing structures, wherein the pump is configured to be powered by light from the LEDs.

5. The hydroponic system of claim 2, further comprising:
a wick configured to draw the water that is conveyed along the bottom surface of the tray to water the root vegetable in the second lid.

6. The hydroponic system of claim 1, further comprising:
a first net cup configured to hold a first length of hydroponic growing medium;
a second net cup configured to hold a second length of hydroponic growing medium, the second length is longer than the first length;
the first opening in the first lid is configured to receive the first net cup; and the second opening in the second lid is configured to receive the second net cup.

7. The hydroponic system of claim 1, wherein the tray is a base tray, and further comprising:
an inner tray configured to fit within the base tray at the same time as the first lid and the second lid, the inner tray having openings to allow the water that is re-circulated in the hydroponic system to enter the inner tray.

8. The hydroponic system of claim 7, wherein:
the inner tray is configured to house a hydroponic mat.

9. The hydroponic system of claim 1, further comprising a first net cup configured to hold a first length of hydroponic growing medium, the first net cup comprises a first ridge configured to secure the first net cup into the first opening such that the first length of hydroponic growing medium contacts the water that is conveyed along the bottom surface of the tray; and
a second net cup configured to hold a second length of hydroponic growing medium, the second length is longer than the first length, the second net cup comprises a second ridge configured to secure the second net cup into the second opening such that the second length of hydroponic growing medium contacts the water that is conveyed along the bottom surface of the tray.

10. A hydroponic apparatus comprising:
a tray comprising a bottom surface and a drain opening in the bottom surface at a first end of the tray, the tray configured to route aqueous hydroponic nutrient that enters the first end of the tray along the bottom surface to a second end of the tray and back to the drain opening, the drain opening configured to drain the aqueous hydroponic nutrient from the tray, wherein the aqueous hydroponic nutrient flows along the bottom surface of the tray, wherein the tray comprises a structure configured to control a level of the aqueous hydroponic nutrient;
a first lid configured to fit in the tray above the aqueous hydroponic nutrient that flows along the bottom surface of the tray, the first lid having a first opening configured to receive a first plant growing receptacle, the first lid configured to fit into the tray such that there is a first distance between the first opening and the aqueous hydroponic nutrient that flows along the bottom surface of the tray; and
a second lid configured to fit in the tray above the aqueous hydroponic nutrient that flows along the bottom surface of the tray, the second lid having a second opening configured to receive a second plant growing receptacle, the second lid configured to fit into the tray such that there is a second distance between the second opening and the aqueous hydroponic nutrient that flows along the bottom surface of the tray, wherein the second distance is different than the first distance, wherein the first lid and the second lid are configured to fit in the tray at the same time.

11. The hydroponic apparatus of claim 10, wherein:
the first lid is configured to allow growth of a plant in the first plant growing receptacle while allowing roots of the plant to contact the aqueous hydroponic nutrient that flows along the bottom surface of the tray; and
the second lid configured to allow a root vegetable to grow to maturity in the second plant growing receptacle without the root vegetable contacting the aqueous hydroponic nutrient that flows along the bottom surface of the tray.

12. The hydroponic apparatus of claim 11, further comprising:
a pump configured to pump a portion of the aqueous hydroponic nutrient that flows along the bottom surface of the tray to top-water the root vegetable in the second lid.

13. The hydroponic apparatus of claim 12, further comprising:
a plurality of light emitting diodes (LEDs) configured to provide light to the root vegetable in the second lid, wherein the pump is configured to be powered by light from the LEDs.

14. The hydroponic apparatus of claim 11, further comprising:
a wick configured to draw a portion of the aqueous hydroponic nutrient that flows along the bottom surface of the tray to water the root vegetable in the second lid.

15. The hydroponic apparatus of claim 10, wherein:
the first plant growing receptacle comprises a first net cup configured to hold a first length of soil-less growing medium; and
the second plant growing receptacle comprises a second net cup configured to hold a second length of hydroponic growing medium, the second length is longer than the first length.

16. A hydroponic apparatus comprising:
a first tray comprising a bottom surface and a drain opening in the bottom surface at a first end of the first tray, the first tray configured to route aqueous hydroponic nutrient that enters the first end of the first tray along the bottom surface to a second end of the first tray and back to the drain opening, the drain opening configured to drain the aqueous hydroponic nutrient from the first tray, wherein the aqueous hydroponic nutrient flows along the bottom surface of the first tray;
a lid configured to fit in the first tray above the aqueous hydroponic nutrient, the lid having one or more openings each configured to receive a plant growing receptacle; and
a second tray configured to fit in the first tray such that a top surface of the second tray is below the aqueous hydroponic nutrient that flows along the bottom surface of the first tray, the top surface of the second tray having a plurality of openings to allow the aqueous hydroponic nutrient to enter the second tray, wherein the lid and the second tray are configured to fit in the first tray at the same time.

17. The hydroponic apparatus of claim 16, wherein the second tray is configured to receive a hydroponic growing mat over the plurality of openings.

18. The hydroponic apparatus of claim 16, wherein the lid is configured to allow growth of a plant in the plant growing receptacle while allowing roots of the plant to constantly bathe in the aqueous hydroponic nutrient that flows along the bottom surface of the first tray.

19. The hydroponic apparatus of claim 16, wherein the lid is configured to allow a root vegetable to grow to maturity in the plant growing receptacle without the root vegetable contacting the aqueous hydroponic nutrient that flows along the bottom surface of the first tray.

* * * * *